(12) United States Patent
Adderly et al.

(10) Patent No.: US 11,244,113 B2
(45) Date of Patent: *Feb. 8, 2022

(54) EVALUATING EVIDENTIAL LINKS BASED ON CORROBORATION FOR INTELLIGENCE ANALYSIS

(71) Applicant: International Business Machines Corporation, Armonk, NY (US)

(72) Inventors: Darryl M. Adderly, Morrisville, NC (US); Corville O. Allen, Morrisville, NC (US); Robert K. Tucker, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 1885 days.

This patent is subject to a terminal disclaimer.

(21) Appl. No.: 14/547,202

(22) Filed: Nov. 19, 2014

(65) Prior Publication Data

US 2016/0140445 A1 May 19, 2016

(51) Int. Cl.
  *G06F 40/30* (2020.01)
  *G06N 5/02* (2006.01)
  *G06F 16/33* (2019.01)
  *G06F 16/9032* (2019.01)
  *G06F 16/36* (2019.01)

(52) U.S. Cl.
  CPC .......... *G06F 40/30* (2020.01); *G06F 16/3346* (2019.01); *G06F 16/367* (2019.01); *G06F 16/90332* (2019.01); *G06N 5/022* (2013.01)

(58) Field of Classification Search
  CPC ... G06N 5/02; G06F 17/2235; G06F 17/2785; G06F 17/3053; G06F 17/30787; G06F 17/30734; G06F 17/30976

USPC ......................................................... 706/46
See application file for complete search history.

(56) References Cited

U.S. PATENT DOCUMENTS

| | | | |
|---|---|---|---|
| 5,749,736 A * | 5/1998 | Griswold | G09B 7/00 434/322 |
| 5,835,900 A | 11/1998 | Fagg, III et al. | |
| 7,149,756 B1 | 12/2006 | Schmitt et al. | |
| 7,152,065 B2 | 12/2006 | Behrens et al. | |

(Continued)

OTHER PUBLICATIONS

Zhuge, et al., "Autonomous semantic link networking model for the Knowledge Grid", Concurrency and Computation: Practice and Experience, Concurrency computat.: Pract. Exper. 2007; 19:1065-1085 (Year: 2007).*

(Continued)

*Primary Examiner* — Tsu-Chang Lee
(74) *Attorney, Agent, or Firm* — Stephen J. Walder, Jr.; Diana R. Gerhardt

(57) ABSTRACT

Mechanisms for evaluating an evidential statement in a corpus of evidence are provided. A first evidential statement for which corroboration is sought is received and a corpus of evidence data is processed to determine a measure of corroboration of the first evidential statement by other evidence data in the corpus of evidence data. An indication of trustworthiness of the first evidential statement is generated based on the measure of corroboration of the first evidential statement by the other evidence data in the corpus of evidence data. A representation of the indication of the trustworthiness of the first evidential statement is output in association with the first evidential statement.

21 Claims, 16 Drawing Sheets

(56) References Cited

U.S. PATENT DOCUMENTS

| | | | |
|---|---|---|---|
| 7,430,504 B2 | 9/2008 | Vanderwende et al. | |
| 7,493,333 B2 | 2/2009 | Hill et al. | |
| 7,565,615 B2 | 7/2009 | Ebert | |
| 7,630,947 B2 | 12/2009 | Pandya et al. | |
| 7,752,198 B2 | 7/2010 | Canright et al. | |
| 7,921,031 B2 | 4/2011 | Crysel et al. | |
| 8,041,743 B2 | 10/2011 | Armstrong et al. | |
| 8,275,803 B2 | 9/2012 | Brown et al. | |
| 8,280,838 B2 | 10/2012 | Ferrucci et al. | |
| 8,370,278 B2 | 2/2013 | Vadlamani et al. | |
| 8,478,769 B2 | 7/2013 | Goldfarb | |
| 8,601,030 B2 | 12/2013 | Bagchi et al. | |
| 8,650,031 B1* | 2/2014 | Mamou | G10L 15/08 704/235 |
| 8,666,730 B2 | 3/2014 | Todhunter et al. | |
| 8,700,620 B1 | 4/2014 | Lieberman | |
| 8,700,621 B1 | 4/2014 | Choi et al. | |
| 8,738,365 B2 | 5/2014 | Ferrucci et al. | |
| 8,738,617 B2 | 5/2014 | Brown et al. | |
| 8,751,578 B2 | 6/2014 | Marcucci et al. | |
| 8,756,245 B2 | 6/2014 | Imielinski et al. | |
| 8,769,417 B1 | 7/2014 | Robinson et al. | |
| 8,942,986 B2 | 1/2015 | Cheyer et al. | |
| 9,037,580 B2 | 5/2015 | Brown et al. | |
| 9,304,672 B2 | 4/2016 | Mital et al. | |
| 9,311,294 B2 | 4/2016 | Allen et al. | |
| 2004/0015869 A1 | 1/2004 | Herriot et al. | |
| 2004/0193514 A1 | 9/2004 | Kasravi et al. | |
| 2005/0154701 A1 | 7/2005 | Parunak et al. | |
| 2006/0053382 A1 | 3/2006 | Gardner et al. | |
| 2006/0111915 A1 | 5/2006 | Li et al. | |
| 2006/0217818 A1* | 9/2006 | Fujiwara | G06N 20/00 700/16 |
| 2007/0250502 A1 | 10/2007 | Canright et al. | |
| 2008/0133552 A1 | 6/2008 | Leary | |
| 2008/0208801 A1 | 8/2008 | Friedlander et al. | |
| 2008/0221923 A1 | 9/2008 | Shogan | |
| 2008/0249968 A1 | 10/2008 | Flinn et al. | |
| 2009/0024606 A1 | 1/2009 | Schilit et al. | |
| 2009/0024615 A1 | 1/2009 | Pedro et al. | |
| 2009/0043812 A1 | 2/2009 | Rigdon | |
| 2009/0099998 A1 | 4/2009 | Verspoor et al. | |
| 2009/0192968 A1 | 7/2009 | Tunstall-Pedoe | |
| 2009/0287678 A1 | 11/2009 | Brown et al. | |
| 2010/0070448 A1* | 3/2010 | Omoigui | H01L 27/1463 706/47 |
| 2010/0280989 A1 | 11/2010 | Mehra et al. | |
| 2011/0040796 A1 | 2/2011 | Shockro et al. | |
| 2011/0066587 A1 | 3/2011 | Ferrucci et al. | |
| 2011/0125734 A1 | 5/2011 | Duboue et al. | |
| 2011/0131244 A1 | 6/2011 | Padovitz et al. | |
| 2012/0078062 A1 | 3/2012 | Bagchi et al. | |
| 2012/0078636 A1* | 3/2012 | Ferrucci | G06F 17/30654 704/270.1 |
| 2012/0078837 A1 | 3/2012 | Bagchi et al. | |
| 2012/0137367 A1 | 5/2012 | Dupont et al. | |
| 2012/0150874 A1* | 6/2012 | Sweeney | G06F 17/2785 707/749 |
| 2012/0158742 A1 | 6/2012 | Kulack et al. | |
| 2012/0191684 A1 | 7/2012 | Epstein | |
| 2012/0318866 A1 | 12/2012 | McIntyre | |
| 2013/0006641 A1 | 1/2013 | Brown et al. | |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0066886 A1 | 3/2013 | Bagchi et al. | |
| 2013/0144893 A1 | 6/2013 | Voigt et al. | |
| 2013/0151532 A1 | 6/2013 | Hoyer | |
| 2013/0246321 A1 | 9/2013 | Pandit et al. | |
| 2013/0254182 A1* | 9/2013 | Tunstall-Pedoe | G06F 17/30654 707/713 |
| 2013/0254305 A1 | 9/2013 | Cheng | |
| 2013/0268519 A1* | 10/2013 | Cucerzan | G06F 17/30864 707/723 |
| 2014/0032378 A1* | 1/2014 | Damnjanovic | G06Q 30/06 705/28 |
| 2014/0045163 A1 | 2/2014 | Chen | |
| 2014/0046653 A1 | 2/2014 | Gopalakrishnan et al. | |
| 2014/0057241 A1 | 2/2014 | Rapp et al. | |
| 2014/0087356 A1 | 3/2014 | Fudemberg | |
| 2014/0108095 A1 | 4/2014 | Tetreault et al. | |
| 2014/0149132 A1 | 5/2014 | DeHaan et al. | |
| 2014/0164298 A1* | 6/2014 | Goranson | G06N 5/02 706/12 |
| 2014/0172879 A1 | 6/2014 | Dubbels et al. | |
| 2014/0280353 A1 | 9/2014 | Delaney et al. | |
| 2014/0280952 A1* | 9/2014 | Shear | H04L 47/70 709/226 |
| 2014/0343923 A1 | 11/2014 | Heilman et al. | |
| 2015/0019571 A1 | 1/2015 | Baker et al. | |
| 2015/0227295 A1 | 8/2015 | Meiklejohn et al. | |
| 2015/0278691 A1 | 10/2015 | Xia et al. | |
| 2015/0325134 A1 | 11/2015 | Candeub et al. | |
| 2015/0037901 A1 | 12/2015 | Allen et al. | |
| 2016/0012119 A1 | 1/2016 | Franceschini et al. | |
| 2016/0140439 A1 | 5/2016 | Adderly et al. | |
| 2016/0140446 A1 | 5/2016 | Adderly et al. | |
| 2016/0140453 A1 | 5/2016 | Adderly et al. | |
| 2016/0147875 A1 | 5/2016 | Adderly et al. | |
| 2016/0148093 A1 | 5/2016 | Adderly et al. | |
| 2017/0124158 A1 | 5/2017 | Mirhaji | |
| 2018/0039696 A1 | 2/2018 | Zhai et al. | |

OTHER PUBLICATIONS

Zhuge et al., "Communities and Emerging Semantics in Semantic Link Network: Discovery and Learning", IEEE Transactions on Knowledge and Data Engineering, vol. 21, No. 6, Jun. 2009 (Year: 2009).*

Marupaka, et al., "Connectivity and thought: The influence of semantic network structure in a neurodynamical model of thinking", Neural Networks 32 (2012) 147-148 (Year: 2012).*

List of IBM Patents or Patent Applications Treated as Related, Oct. 12, 2016, 2 pages.

"Frequent subtree mining", Wikipedia, accessed from the Internet on Aug. 24, 2016, 3 pages.

Barzilay, Regina, "Graph-based Algorithms in NLP", MIT, Nov. 2005, 57 pages.

Hinton, Geoffrey et al., "Lecture 4a, Learning to predict the next word", Neural Networks for Machine Learning, Fall 2015, Accessed from the internet on Aug. 24, 2016, www.cs.toronto.edu/~tijmen/csc321//slides/lecture_slides_lec4.pdf, 34 pages.

Lehmann, Jens et al., "DL-Learner Manual", http://dl-learner.org/Resources/Documents/manual.pdf, Feb. 8, 2016, pp. 1-20.

Molla, Diego, "Learning of Graph-Based Question Answering Rules", Workshop on TextGraphs, at HLT-NAACL 2006, New York City, NY, Jun. 2006, 8 pages.

Nastase, Vivi et al., "A Survey of Graphs in Natural Language Processing", Natural Language Engineering 1(1):1-32, Cambridge University Press, Sep. 15, 2015, 32 pages.

Nastase, Vivi et al., "Matching Syntactic-Semantic Graphs for Semantic Relation Assignment", Workshop on TextGraphs, at HLT-NAACL, Jun. 2006, 8 pages.

Trim, Craig, "NLP-driven Ontology Modeling: The Mechanics and Value of an Ontology Model", IBM developerWorks, IBM Corporation, Nov. 14, 2012, 5 pages.

Trim, Craig, "Ontology-driven NLP", IBM developerWorks, IBM Corporation, May 18, 2012, 3 pages.

Welty, Chris et al., "Query Driven Hypothesis Generation for Answering Queries over NLP Graphs", Lecture Notes in Computer Science, vol. 7650, ISWC 2012, Nov. 2012, 15 pages.

List of IBM Patents or Patent Applications treated as Related (Appendix P), 2 pages.

"Intelligence Grading Systems", 4Knowledge, http://4knowledge-za.blogspot.com/2009/05/intelligence-grading-systems.html, May 2, 2009, 3 pages.

(56) References Cited

OTHER PUBLICATIONS

"MLR3C14000—Appendix 3: The National Intelligence Model (5x5x5)", MLR3C—Money Laundering Regulation: Compliance Manual, HM Revenue & Customs, http://www.hmrc.gov.uk/manuals/mlr3cmanual/mlr3c14000.htm, last updated Aug. 2, 2013, accessed from the Internet on Aug. 18, 2014, 2 pages.

Aldabe, Itziar et al., "Ariklturri: An Automatic Question Generator Based on Corpora and NLP Techniques", ITS Jun. 2006, LNCS 4053, Jun. 26-30, 2006, 11 pages.

High, Rob, "The Era of Cognitive Systems: An Inside Look at IBM Watson and How it Works", IBM Corporation, Redbooks, Dec. 12, 2012, 16 pages.

Lindberg, David et al., "Generating Natural Language Questions to Support Learning On-Line", Long paper from the Proceedings of 14th European Workshop on Natural Language Generation, Sophia, Bulgaria, Aug. 2013, 10 pages.

Mccord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

Ferrucci, et al., "Building Watson: An Overview of the DeepQA Project", Association for the Advancement of Artificial Intelligence, Fall 2010, pp. 59-79.

Getoor, Lise et al., "Link Mining; A Survey", SIGKDD Explorations, vol. 7, Issue 2, Dec. 2005, pp. 3-12.

Su, Qi et al., "A Research on the Text Reliability Based on Evidentiality", International Journal of Computer Processing of Languages, vol. 23, No. 2, May 2011, pp. 201-214.

Su, Qi et al., "Evidentiality for Text Trustworthiness Detection", Proceedings of the 2010 Workshop on NLP and Linguistics: Finding the Common Ground, Association for Computational Linguistics. ACL 2010, pp. 10-17.

Weichselbraun, Albert et al., "Discovery and Evaluation of Non-Taxonomic Relations in Domain Ontologies", International Journal of Metadata Semantics and Ontologies, Aug. 2009, 10 pages.

Myers, Brad A., "Graphical User Interface Programming", Computer Science Handbook, pp. 48-1-48-29, Jun. 2004, 30 pages.

La Rocca, Gianfranco, "Knowledge Based Engineering: Between AI and CAD. Review of a Language Based Technology to Support Engineering Design", Advanced Engineering Informatics 26, pp. 159-179, Feb. 2012.

\* cited by examiner

INFORMATION CONCEPT: JOHN (PERSON)
LINK TYPE: ACQUAINTANCES

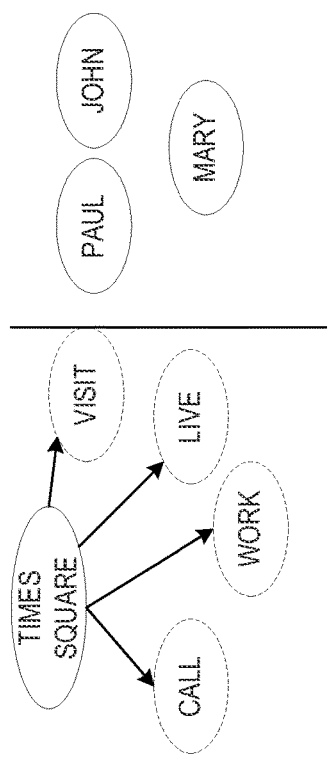

| LINK | QUESTION TEMPLATE | ROUTE |
|---|---|---|
| KNOW | Does <Person A> know <Person B>? | SIMPLE |
| KNOW | What type of relationship does <Person A> have with <Person B>? | SCENARIO |
| CALL | Does <Person A> call <Person B>? | SIMPLE |
| CALL | Does <Person B> call <Person A>? | SIMPLE |
| VISIT | Does <Person A> visit <Location A>? | SIMPLE |
| VISIT | How likely is <Person A> to visit <Location A>? | SCENARIO |

*FIG. 5*

INFORMATION CONCEPT: JOHN (PERSON)
LINK TYPE: ACQUAINTANCES

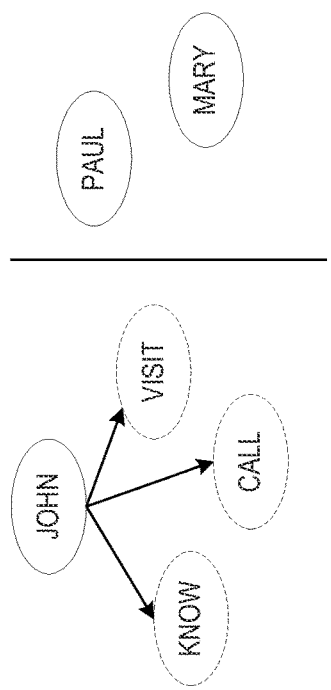

| LINK | QUESTION TEMPLATE | ROUTE |
|---|---|---|
| WORK | Does <Person A> work in <Location A>? | SIMPLE |
| WORK | Who are the people that work in <Location A>? | SIMPLE |
| LIVE | Who are the people currently living in <Location A>? | SIMPLE |
| VISIT | Does <Person A> visit <Location A>? | SIMPLE |
| CALL | Does <Person A> call <Person B> in <Location A>? | SCENARIO |
| CALL | Does <Person B> call <Person A> in <Location A>? | SCENARIO |
| VISIT | How likely is <Person A> to visit <Location A>? | SCENARIO |

*FIG. 6*

EVALUATING EVIDENTIAL LINKS BASED ON CORROBORATION FOR INTELLIGENCE ANALYSIS

BACKGROUND

The present application relates generally to an improved data processing apparatus and method and more specifically to mechanisms for evaluating evidential links based on corroboration for intelligence analysis.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the Watson™ system available from International Business Machines (IBM®) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment a method, in a data processing system comprising a processor and a memory, for evaluating an evidential statement in a corpus of evidence is provided. The method comprises receiving, by the data processing system, a first evidential statement for which corroboration is sought and processing, by the data processing system, a corpus of evidence data to determine a measure of corroboration of the first evidential statement by other evidence data in the corpus of evidence data. The method further comprises generating, by the data processing system, an indication of trustworthiness of the first evidential statement based on the measure of corroboration of the first evidential statement by the other evidence data in the corpus of evidence data. Moreover, the method comprises outputting, by the data processing system, a representation of the indication of the trustworthiness of the first evidential statement in association with the first evidential statement.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 shows an example of hypothetical ontological link question generation with regard to an information concept of a person in accordance with one illustrative embodiment;

FIG. 6 shows an example of hypothetical ontological link question generation with regard to a location information concept in accordance with one illustrative embodiment;

DETAILED DESCRIPTION

Figure 1:
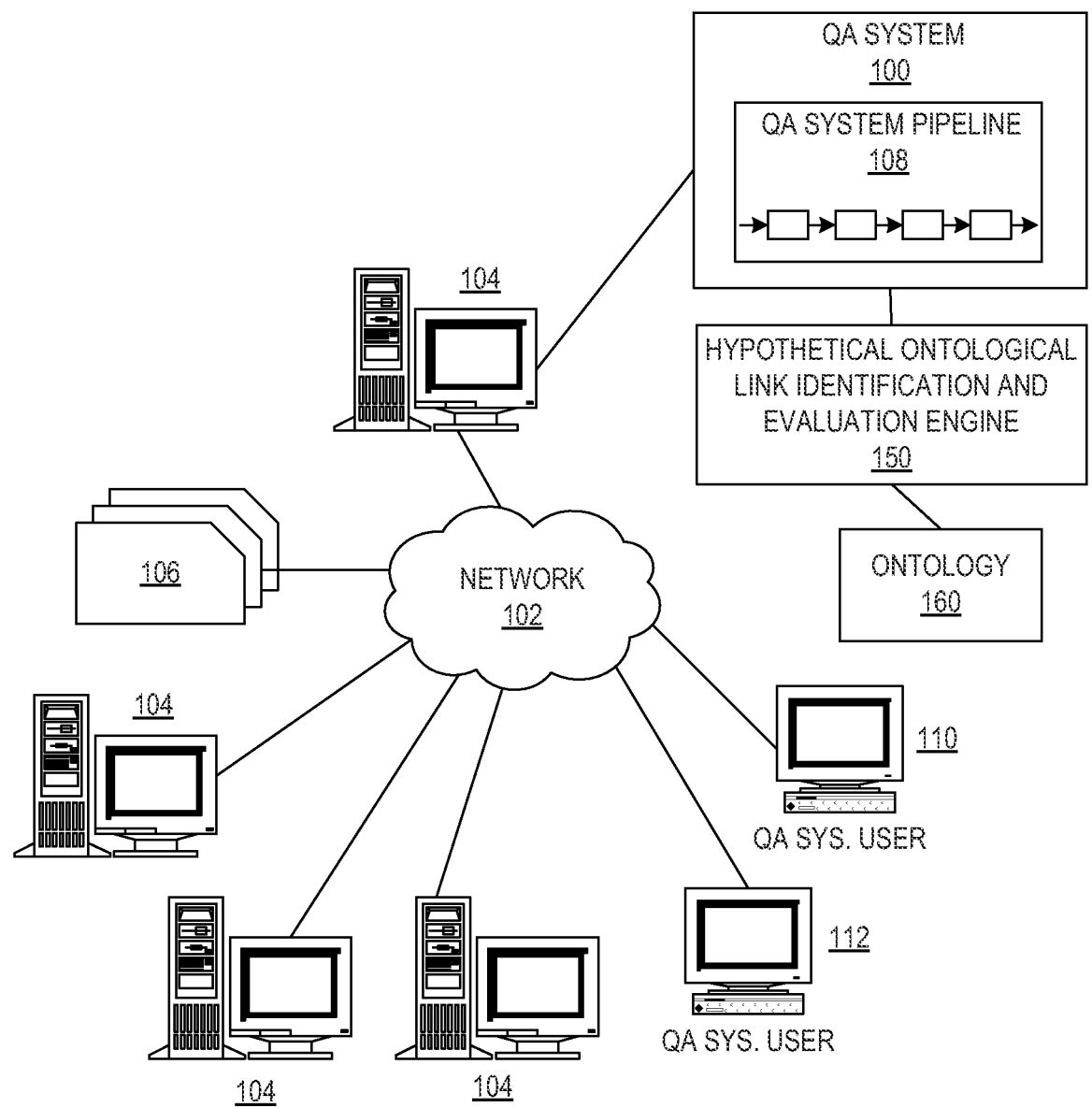
FIG. 1 depicts a schematic diagram of one illustrative embodiment of a question/answer creation (QA) system in a computer network.

The illustrative embodiments provide mechanisms for intelligence gathering and analysis using a Question Answering (QA) system. Intelligence gathering and analysis tasks often center around identifying and evaluating correspondence between instances of concepts, such as people, places, events, property, etc. described in an ontology using information obtained from various data sources. For example, intelligence gathering and analysis tasks may attempt to determine whether a person A knows a person B, whether person A was involved in event C, or the like. Generally, such intelligence gathering and analysis may have assistance from computing systems to assist in the gathering and analysis operations, but the determination of the ontological relationships between concepts is still much a manual process requiring human intervention to generate such ontological relationships. This can be time consuming and haphazard since the human analyst must first identify possible ontological relationships and then sift through information and find evidence that supports or refutes the ontological relationships.

For example, assume that a human analyst is investigating a crime and is building a profile of the crime which involves identifying a number of information concepts (also referred to herein simply as "concepts") including suspects, a witness, and an incident, e.g., a robbery at location A. In order to build this profile and investigate the crime, the analyst first acquires and enters the information about these information concepts, along with any known correlations between these information concepts, into a database. The analyst now asks himself/herself a number of questions about additional links such as:

1) Does the suspect known the witness?
2) Was the suspect involved in other similar incidents in the past?
3) Does the suspect have accomplices?
4) Has the witness witnessed similar incidents in the past?

In order to answer such questions, the human analyst must search information sources, read and appraise the content of the information sources to identify evidence, evaluate the evidence to determine its veracity, gather additional evidence from individuals directly, from locations directly, or the like, to answer these questions. It can be seen that this would be a time consuming process that often times requires a degree of expertise in intelligence gathering and analysis to know the correct questions to ask and the ways in which to gather and analyze the information to answer these questions.

The illustrative embodiments provide mechanisms for automatically identifying hypothetical ontological relationships between information concepts based on automated analysis of evidential support for these hypothetical ontological relationships found in association with existing actual ontological relationships and information concepts. These ontological relationships are hypothetical in nature in that there is no direct evidence explicitly specifying the ontological relationship exists in the ontology. For example, there may not be any direct evidence that suspect A knows suspect B, but there may be circumstantial or indirect evidence that supports this hypothetical ontological relationship that suspect A knows suspect B. However, there may be evidence that suspect A knows suspect C, suspect B knows suspect D, and suspect D has been seen in the company of suspect C at the same location. From this circumstantial evidence, one may determine that suspect D and suspect C know each other and since suspect D knows suspect B and suspect A knows suspect C, there is some amount of evidence that gives a probability that suspect A may know suspect B. By identifying possible hypothetical ontological relationships, the mechanisms of the illustrative embodiment assist the human analyst who may not have identified those possible relationships and may inform the analyst of other, previously not thought of, hypothesis about the situation being analyzed.

In identifying hypothetical ontological relationships between instances of defined information concepts, the mechanisms of the illustrative embodiments may determine, from an initial set of valid ontological relationships or links between specified instances of information concepts (e.g., people, places, things, events, etc.), the hypothetical ontological relationships (or links) that are to be investigated, e.g., for either all instances or chosen instances of information concept object (also referred to as entities herein), potential hypothetical relationships are identified using the defined ontology. Having identified a hypothetical ontological relationship to investigate, through analysis of other evidence associated with the various instances of information concepts and specifying various other types of ontological relationships between the instances of information concepts, indirect or inferential evidential support (e.g., circumstantial evidence) for the hypothetical ontological relationship is identified and evaluated. Based on such identification and evaluation of indirect or inferential support, one or more scores or measures of confidence in the hypothetical ontological relationship are calculated. These scores may then be used to evaluate whether or not the hypothetical ontological relationship is likely to be an actual ontological relationship and a corresponding output to the human analyst is generated.

The mechanisms of the illustrative embodiments may be implemented, for example, in a question answering (QA) system, such as the IBM Watson™ QA system available from International Business Machines (IBM) Corporation of Armonk, N.Y. In such an embodiment, the QA system is configured to implement the intelligence gathering and analysis mechanisms of the illustrative embodiments so as to identify and evaluate hypothetical ontological relationships or links between instances of pre-defined information concepts (persons, places, things, events, etc.) in an ontology. With the mechanisms of the illustrative embodiments, instances of information concepts are designated and then, based on a set of valid ontological relationships or links in an ontology, a set of questions related to hypothetical ontological relationships between instances of information concepts are generated and processed via the QA system. This set of questions may be determined based on an initial user input into the QA system designating the one or more instances of information concepts of interest and a particular type of hypothetical ontological relationship that is to be evaluated, e.g., does person A know person B? Alternatively, the hypothetical ontological relationship and instances of information concepts of interest may be automatically identified from an analysis of an ontology and determination of possible hypothetical relationships between instances of information concepts specified in the ontology, e.g., identifying instances of information concepts that do not have actual ontological relationships and, based on types of the instances of information concepts and actual links of the instances of information concepts with other instances of information concepts, and the types of these links, what other types of ontological links are likely to be present even though they are not explicitly included in the existing ontology.

The set of questions for investigating the hypothetical ontological relationship may be chosen based on the information concept type(s), ontological relationship type (link type), and the like. The questions may be selected by an automated engine that has been trained using machine learning techniques to identify the type of questions to be asked when the ontological relationship being investigated involves certain information concept types and link types, e.g., for information concepts of a "person" type and a link type of "knows" a set of questions is selected that includes the questions, is person A related to person B? does person A work with person B? does person A live close to person B? did person A go to a same school as person B?, etc. In such a machine learning technique, an initial set of questions for a particular combination of information concept type and link type may be set manually and may be evaluated over time through automated mechanisms to add to or remove questions from the set based on user feedback, identification of a particular question's relative contribution to a higher or lower score for a hypothetical ontological relationship, etc. These questions may be formulated as a set of templates that may be customized to the particular information concepts of interest, e.g., a template of "Does Person A live with Person B?" may be customized to "Does John Smith live with Mary Stewart?"

It should be appreciated that in this situation, the human analyst need only input or select the instances of information concepts of interest (hereafter referred to simply as "information concepts") and an overall theory or ontological relationship that the analyst wishes to evaluate, e.g., "John Smith (information concept A—person) committed (ontological relationship) the robbery (information concept B—event) of Al's Electronics (information concept C—location)" or more simply "John Smith (information concept A) knows (ontological relationship) Mary Stewart (information concept B)." In other illustrative embodiments, a more open ended intelligence gathering approach is facilitated where the human analyst need only specify an information concept of interest and ask the system to identify all ontological relationships of a particular type with this information concept, e.g., "I want to know all of John Smith's (information concept) acquaintances (ontological relationship)." Based on the specification of an information concept and a hypothetical ontological relationship type, the system automatically retrieves the set of questions (and templates) corresponding to that information concept type and hypothetical ontological relationship type, and evaluates the questions via the QA system.

In some illustrative embodiments, mechanisms are provided for pruning the set of questions, or question templates, that are retrieved for use in evaluating a hypothetical ontological link between information concepts. This pruning serves to take a set of questions or question templates and filter these to a sub-set of questions or question templates based on the characteristics of the particular instances of information concepts and hypothetical ontological link being evaluated. For example, a general set of question templates for a hypothetical ontological link of "located at" and information concepts of "person" and "location" may be retrieved. This general set of question templates may then be further pruned or filtered to a specific sub-set of question templates using characteristics for a particular "person" and "location" and category of "located at" hypothetical ontological link, e.g. "John Jones" "frequents" "Al's Electronics." For example, knowing that Al's Electronics is a retail electronics store, it may be time consuming and of little benefit to evaluate questions about whether or not John Jones has lunch at Al's Electronics but it would be more poignant to ask whether John Jones has bought items at Al's Electronics. Thus, the "eats at" question may be filtered from the set of question templates while the "has bought items at" question would be included in the sub-set of question templates. Various characteristics of the information concepts and hypothetical ontological link may be compared against corresponding characteristics associated with the different question templates to thereby identify which question templates are most appropriate for the particular instances of information concepts and hypothetical ontological link to thereby generate a sub-set of question templates for evaluation.

In evaluating the automatically generated set of questions, or sub-set of questions, the QA system analyzes one or more corpora of evidential data to generate candidate answers to the question and identifies evidence supporting and/or refuting the hypothetical ontological relationship (hereafter referred to as "hypothetical links") between information concepts corresponding to the question being answered. For example, if the question is whether person A knows person B, then evidence from the corpora may be evaluated to determine a confidence associated with an answer of "yes" person A knows person B, and evidence to determine a confidence associated with an answer of "no" person A does not know person B. The results of these evaluations of the corpus of evidence to support/refute different hypothetical links may be used to update the ontology to replace hypothetical links with actual links when the confidence of an answer meets or exceeds a predetermined criterion.

In evaluating the evidence in the corpora, various aspects of the evidence may be evaluated to generate a confidence score for an answer to the question and ultimately, a score for the hypothetical ontological link. For example, the source of the evidence may be graded with regard to the veracity of the source with subsequent curating of the evidence in the corpora based on an evaluation of the source's veracity. In evaluating the veracity of a source, corroborating evidence from other sources may be used to elevate a grading of the source. Correspondence of language in statements from the source with statements made by other sources may be used to increase/decrease the grading of the source, e.g., if the statements are exactly the same or primarily the same, as determined from a threshold level of sameness, then it is likely that the statements are copies of an original statement or indicative of a collaboration of the sources giving the source a lower grading of veracity. Previous use of the source to generate correct answers to questions may also be determined, such as through a machine learning process, and used to evaluate the source of evidence. User specified input indicative of whether the user trusts the source of the evidence may also be used to grade the source. Characteristics of the type of the source may also be used to grade the source, e.g., a police person may be given a higher grading than a felon. Various weight values may be associated with these different source grading characteristics to generate a value indicative of the grading of the source with regard to the source's veracity that can be attributed to the evidence provided by that source.

Based on the grading of a source, the corpora used to evaluate hypothetical ontological links may be managed so as to remove sources of evidence in the corpora whose grading does not meet a minimum acceptable level and/or to adjust the weighting values associated with a source based on a determined grading of the source. Thus, for sources whose grade is relatively higher, a weighting value for those sources will be relatively higher compared to other sources in the corpora to thereby provide a relatively higher measure of reliability and confidence in the evidence provided by those sources. Moreover, for higher graded sources, such as sources that exceed a predetermined threshold of reliability, additional evidence from those sources may be actively sought and added to the corpora for use in evaluation hypothetical ontological links and sets of questions. For example, if a source, such as a particular witness, is determined to be highly reliable, additional evidence from that witness may be ingested into the corpora being used to evaluate the hypothetical ontological link.

Sources whose grade is relatively lower will have a weighting value that is relatively lower leading to a lower measure of reliability and confidence in the evidence provided by those sources. Sources whose grade does not meet a minimum threshold level may have all of the evidence provided by those sources removed from the corpora such that it is not used to evaluate questions and provide supporting evidence for calculating confidence scores in answers to questions. It should be appreciated that such corpora management or curating operations may be performed on a temporary basis, e.g., for one hypothetical ontological link evaluation or set of questions being evaluated, or may be performed on a permanent basis, e.g., for a plurality of hypothetical ontological link evaluations and multiple sets of questions being evaluated.

As mentioned above, in grading the source of evidence in the corpora, corroborating evidence may be used as one measure of the veracity of the source. Corroborating evidence may also be used when generating the confidence score for a particular answer to a question in the set of questions, or sub-set of questions. That is, if two statements are made by two different sources and these statements corroborate one another, then the evidence provided by these statements tends to be more reliable and a relative scoring or weighting of the score associated with the evidence may be increased. Negative corroboration may also be evaluated where two statements directly contradict one another in which case the scoring or relative weighting of the evidence provided by the contradictory statements is reduced. Of course other factors may add to or detract from this level of corroboration including the grading of the sources of the statements as well as the level of direct correspondence of the language used in these statements. Moreover, the definiteness or certainness of the language used in the statements may also be used to evaluate the level of corroboration.

All of these factors, or a subset comprising one or more of these factors, may be used to evaluate evidence in support of, or against, a particular answer to a question being correct or not. This scoring of confidence in an answer to a question may be used to generate a confidence score for a particular hypothetical ontological link or, as discussed in greater detail hereafter, a sub-link that is one part of the hypothetical ontological link. As discussed hereafter, multiple such scores, associated with multiple heterogeneous sub-links, may be aggregated to generate a score for the hypothetical ontological link as a whole. This aggregation may likewise be weighted with different scores for different types of sub-links being weighted differently.

As a result of the scoring of the hypothetical ontological link using the mechanisms of the illustrative embodiments, the hypothetical ontological link may have its status upgraded to an actual link within the ontology. That is, if the score for the hypothetical ontological link meets or exceeds a predetermined threshold for inclusion in the ontology as an actual link, then the ontology may be modified to include the hypothetical ontological link as an actual link. This may in turn cause an automated identification of additional hypothetical ontological links and corresponding sets of questions for evaluation, i.e. additional lines of questioning. Thus, not only do the mechanisms of the illustrative embodiments evaluate hypothetical ontological links that are either automatically identified by the mechanisms of the illustrative embodiments or specified by a user, the mechanisms of the illustrative embodiments further determine additional hypothetical ontological links and lines of questions to be evaluated. A notification of these additional hypothetical ontological links and lines of questions may be provided to a user for selection of which ones the user wishes pursue.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. For purposes of the following description of illustrative embodiments, it will be assumed that the data processing environment used to implement the mechanisms of the illustrative embodiments, or with which the mechanisms of the illustrative embodiments are associated, is a Question Answering (QA) data processing system environment with the question answering logic being provided via a trained QA system, such as the IBM Watson™ QA system available from IBM Corporation of Armonk, N.Y. While a QA system will be used as an example for describing the illustrative embodiments, it should be appreciated that any knowledge system which operates on a corpus of evidence to support/refute ontological relationships between information concepts in an ontology may be used without departing from the spirit and scope of the illustrative embodiments. Moreover, it should be appreciated that the following description of a QA system is only intended to present examples and is not intended to assert or imply any limitation with regard to the environments in which aspects or embodiments of the present invention may be implemented. Many modifications to the depicted environments may be made without departing from the spirit and scope of the present invention.

Figure 2:
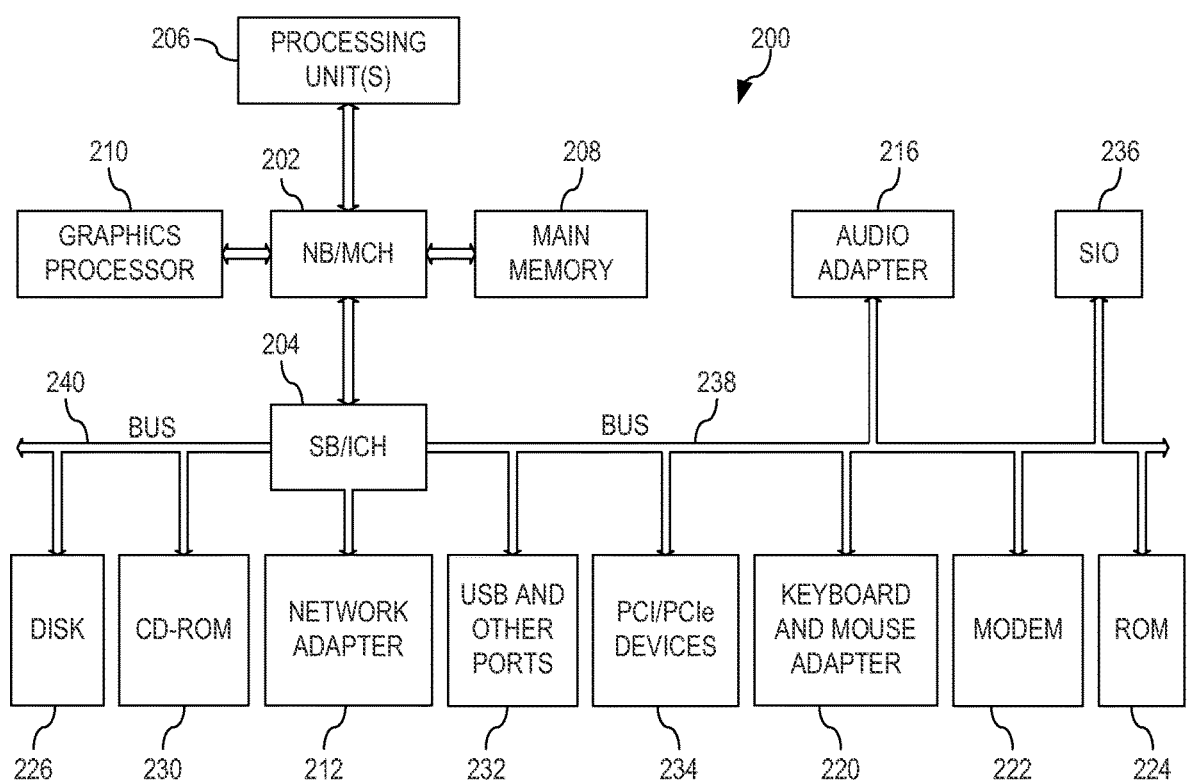
FIG. 2 is a block diagram of an example data processing system in which aspects of the illustrative embodiments are implemented.
Figure 3:
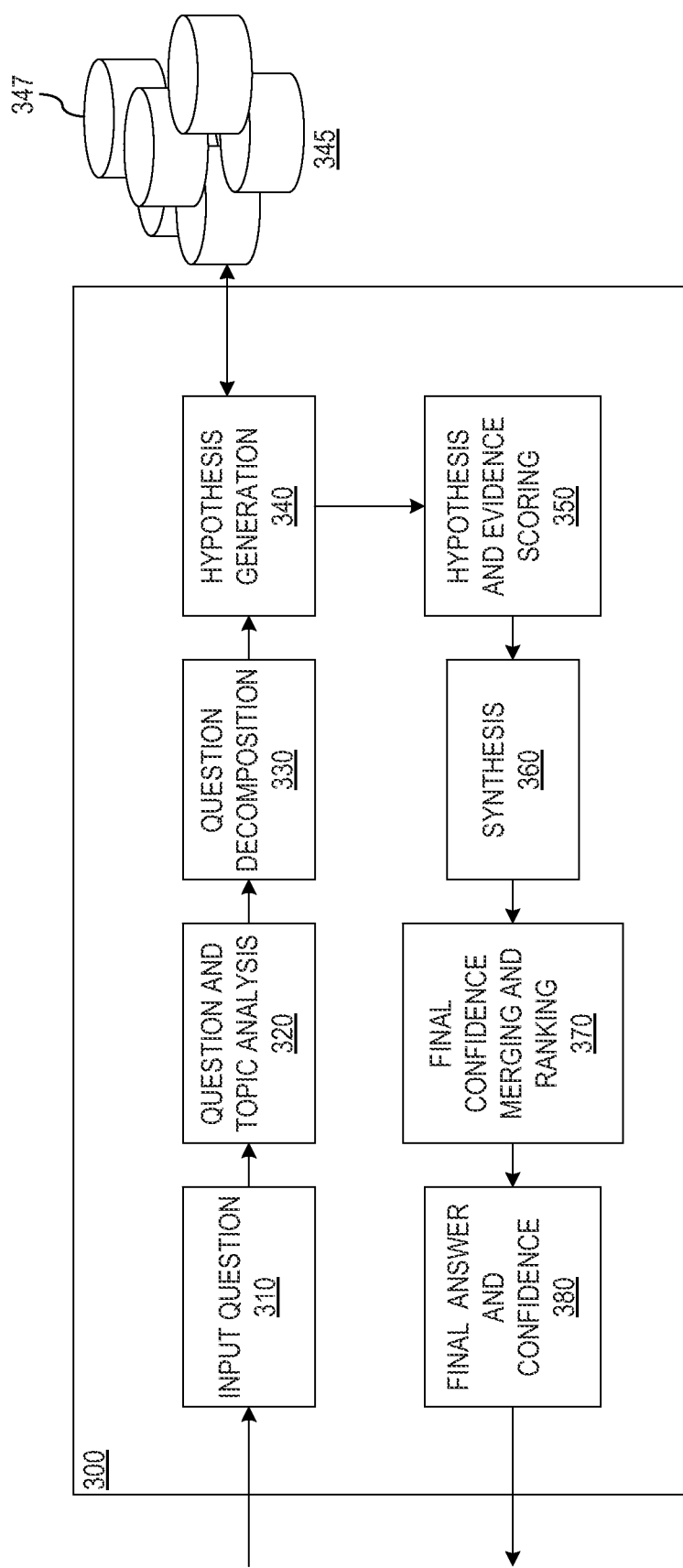
FIG. 3 illustrates a QA system pipeline for processing an input question in accordance with one illustrative embodiment.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to identifying hypothetical links between information concepts within an ontology, evaluating those hypothetical links between information concepts with regard to supporting evidence from one or more corpora, and generating an output of the results of such evaluations so as to inform a user of potential links between information concepts and/or updates to the ontology.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with the mechanisms of the illustrative embodiments, the QA system 100 operates in conjunction with, or may have integrated into the QA system 100, a hypothetical ontological link identification and evaluation engine 150 to evaluate an ontology of information concepts, identify other hypothetical ontological links that could possibly exist within the ontology, and then evaluate those hypothetical ontological links to determine the amount of evidential support for or against those hypothetical ontological links being valid actual ontological links. In doing so, the hypothetical ontological link identification and evaluation engine 150 operates on an ontology data structure 160 that specifies a plurality of instances of information concept entities of the same or various different types and their known ontological links of the same or various types.

The ontology 160 is analyzed and evaluated to determine the possibly hypothetical ontological links between information concept entities. A hypothetical ontological link is then evaluated to determine the type(s) of information concept entities associated with the hypothetical link and the type(s) of the hypothetical link between the information concept entities. The type(s) of information concept entities and the type of the hypothetical link are used to retrieve one or more sets of questions for evaluating the hypothetical ontological link. These questions are then submitted to the QA system 100 for evaluation against the evidence provided in the corpus or corpora to thereby generate candidate answers to the questions and determine a confidence in these candidate answers. The confidence in the candidate answers serves to provide a measure of evaluation for the hypothetical ontological link with regard to whether the hypothetical ontological link is more or less likely to be an actual ontological link within the ontology even though the ontology did not originally include that link explicitly. The operation for identifying hypothetical ontological links and evaluating them will be described in greater detail hereafter.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

The illustrative embodiments utilize the QA system of FIGS. 1-3 to answer questions for evaluating a hypothetical ontological link. As such, the QA system pipeline 300 may be utilized to receive an input question regarding the hypothetical ontological link and evaluate the input question against the corpus 347 or corpora 345 to generate candidate answers and evidential support for/against the candidate answers. The candidate answers and their evidential support are used to generate a final answer to the question and corresponding confidence value. The final answers to each of the questions presented for a particular hypothetical ontological link are then used to generate a confidence score for the hypothetical ontological link itself through a link scoring operation that takes into consideration the type and characteristics of the hypothetical ontological link, the type and characteristics of the information concept objects associated with the hypothetical ontological links, the type and characteristics of any sub-links of the hypothetical ontological link, and the type and characteristics of the evidential support for/against the sub-links and hypothetical ontological link being actual valid links. In generating such confidence scores, or simply "scores", for these sub-links and hypothetical ontological links, collaboration of evidence, grading of sources, certainty of statements in the evidence, and the like, may be evaluated to adjust the weightings and relative scorings of evidence in support of or against a candidate answer being correct and/or the scoring of a particular sub-link and/or the hypothetical ontological link as a whole.

Multiple types of sub-links between the same information concepts may be aggregated along with their corresponding confidence scores to determine an aggregate score for the hypothetical ontological link between the information concepts as a whole, e.g., hypothetical ontological links of types "person A calls person B", "person A meets with person B," "person A texts with person B" and the like may be combined to determine a value for the overall hypothetical ontological link that "person A knows person B" or "person A is an acquaintance of person B." This aggregate score for the overall hypothetical ontological link between the information concepts may be used to determine whether the hypothetical ontological link is an actual link that should be represented within the ontology.

Figure 4:
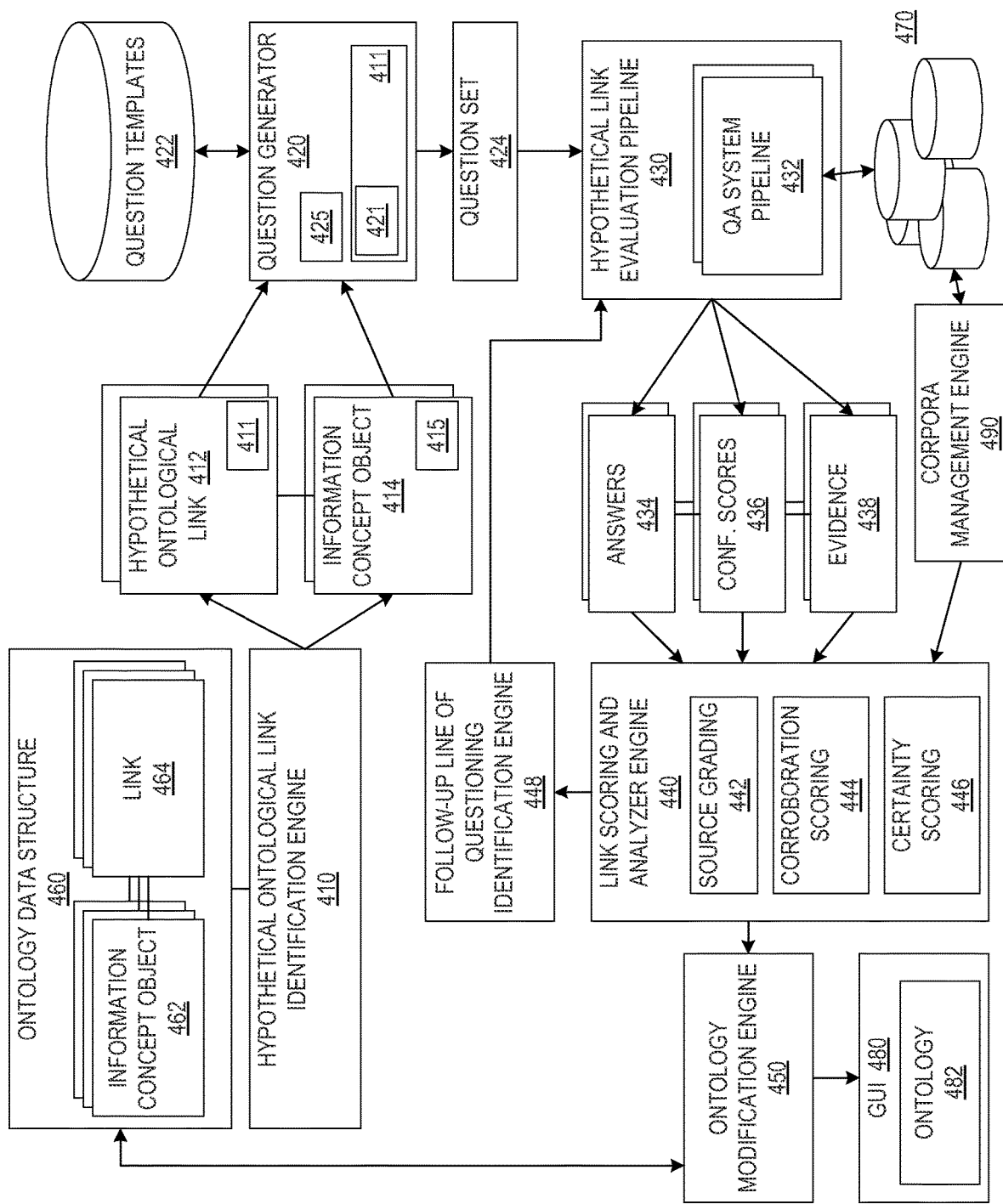
FIG. 4 is an example block diagram illustrating the primary operational elements of a hypothetical ontological link identification and evaluation engine in accordance with one illustrative embodiment.

FIG. 4 is an example block diagram illustrating the primary operational elements of a hypothetical ontological link identification and evaluation engine in accordance with one illustrative embodiment. As shown in FIG. 4, the primary operational elements comprise a hypothetical ontological link identification engine 410, a question generator 420, one or more hypothetical link evaluation pipelines 430, a link scoring and analyzer engine 440, and ontology modification engine 450. The hypothetical ontological link engine 410 operates on an ontology data structure 460 that comprises information concept objects 462 and links 464 between information concept objects. These information concept objects 462 and links 464 have associated attributes including a type with the type being one of a plurality of pre-defined types, e.g., a person, a place, a type of thing, a type of event, etc. Types may be specified at any desired granularity depending upon the particular implementation.

The hypothetical ontological link identification engine 410 operates automatically through analysis of the ontology 460 to determine possible hypothetical ontological links between information concept objects 462 of the ontology 460, i.e. links that are not present in the actual links 464 of the ontology 460 (i.e. links that do not explicitly exist in the evidential data) but may have a likelihood of existing in actuality and may be added to the ontology 460. In automatically identifying such hypothetical ontological links, the hypothetical ontological link identification engine 410 is configured with logic to evaluate various types of information concept objects 462, their actual links 464, and determine through inference other types of links that may exist.

For example, the logic of the hypothetical ontological link identification engine 410 may analyze the links (also referred to herein as "relationships") between an information concept object for "John Smith" and other individuals, events, locations, and the like, specified as other information concept objects 462 in the ontology 460. For example, through analysis it may be determined that John Smith knows Jane Jones. In addition, the information concept objects 462 with which the John Smith object has a link may be analyzed to determine links 464 that they have to other information concept objects 462. For example, it may be determined that Jane Jones knows Carl Carter. Further analysis may determine that John Smith does not have a link to Carl Carter and thus, since John Smith knows Jane Jones, and Jane Jones knows Carl Carter, but there is no indication that John Smith knows Carl Carter, there is a possibility that John Smith knows Carl Carter but this is not reflected in the ontology 460. As a result, the hypothetical ontological link identification engine 410 may generate a hypothetical ontological link between John Smith and Carl Carter for further evaluation. It should be appreciated that this can be done with any types of information concept objects 462, any combination of types of information concept objects, and for any types of links between any combination of one or more types of information concept objects.

Alternatively, a user may provide a manual input of one or more information concept objects of interest and a type of link associated with the one or more information concept objects of interest and/or with other information concept objects in the ontology 460. The manual input may be a free-form input from the user via a user interface, a selection of one or more information concept objects of interest from a representation of the ontology 460 via a user interface, a selection of one or more link types from a listing of pre-defined link types, or the like. For example, a user may manually input an identifier of an information concept object 462 corresponding to "John Smith" and an identifier of a type of link of "acquaintances." In response, the logic of the hypothetical ontological link identification engine 410 determines the hypothetical links of the specified type between the information concept object 462 corresponding to John Smith and other information concept objects 462 having a type that correlates with the type of the hypothetical links, e.g., a link type of "acquaintances" corresponds to information concept objects of a "person" type whereas a link type of "goes to" or "frequents" may correspond to information concept objects of a "place" type.

All of the possible hypothetical ontological links of the specified type associated with the identified information concept object(s) are identified using the ontology 460. Moreover, rather than specifying a single information concept object and a hypothetical link type, the user may specify the hypothetical link type and the two or more information concept objects of interest, e.g., "John Smith" (information concept object 1 of type: person) "frequents" (hypothetical ontological link type having associated person and location information concept objects) "Al's Electronics" (information concept object 2 of type: location).

It should be appreciated that the hypothetical ontological link may be a generic link between information concepts indicating that there is some link between the information concepts but without a specific type or category. Based on the information concepts that are being linked, however, it may be determined that the hypothetical ontological link is likely one of a plurality of types and each possible sub-link type may be evaluated using the mechanisms of the illustrative embodiments. For example, a link between person A and person B is likely of a generic type "knows." However, there may be many ways that person A may know person B and each possible way would need to be explored to determine whether person A knows person B. For example, person A may be "related to" person B, person A may "work with" person B, person A may "be an acquaintance of" person B, person A may have "called" person B, etc. Each of these types of interactions represent types of links between person A and person B which together indicate whether person A knows person B in some capacity. Each of these types of links may be evaluated and the combination of the evaluations may be used to ultimately determine whether person A knows person B. Similar hypothetical ontological links and sub-links may exist for other generic types of links between information concepts in an ontology 460.

Whether using the automatic identification of hypothetical ontological links from analysis of the ontology 460 or using the manual entry of such hypothetical ontological links of interest, the hypothetical ontological link identification engine 410 outputs the hypothetical ontological links 412 and information concept objects 414 of these hypothetical ontological links to the question generator 420. Thus, for example, a user may input that the user wishes to know if person A knows person B in the ontology 460. From this input, the hypothetical ontological link identification engine 410 determines, based on configured logic and associated data structures, that there are a set of hypothetical ontological links 412 that correspond to the particular types of information concepts (person A and person B) that should be evaluated, e.g., person A is related to person B, person A works with person B, person A is acquainted with person B, etc. Each of these hypothetical ontological links 412 is input to the question generator 420 to generate a set of questions for each hypothetical ontological link 412.

The question generator 420 identifies the types of the information concept objects 414 and hypothetical ontological links 412. For a particular hypothetical ontological link 412, the question generator 420 retrieves a corresponding set of hypothetical link question templates for that particular hypothetical ontological link type and/or a combination of that particular hypothetical ontological link type and the types of the specified information concept objects 414, from the hypothetical link question template database 422. For example, if the hypothetical ontological link type is "know" and the information concept objects 414 include a particular person or person, a set of question templates for the hypothetical ontological link type may be retrieved.

In some illustrative embodiments, the set of hypothetical link question templates may be further pruned according to particular characteristics of the information concept objects associated with the hypothetical ontological link so as to identify a sub-set of the hypothetical link question templates that are specific to the particular combination of information concept objects being evaluated. For example, if the initial set of hypothetical link question templates for a hypothetical ontological link of John robbing Al's Electronics includes a large set of question templates, some of which are directed to robberies of other types of locations, such as a bank, personal residence, or the like, these questions may be less relevant than other question templates directed to robberies of retail establishments. Thus, by looking at the characteristics of Al's Electronics information concept object, one of which may be the type of location being a retail establishment, then the characteristics of the information concept object may be matched to corresponding characteristics of question templates in the set of hypothetical link question templates to thereby filter the set of hypothetical link question templates to a sub-set that is relevant to the particular characteristics of the information concept objects associated with the hypothetical ontological link, or sub-link, being evaluated.

The question templates, or sub-set of question templates, may then be populated with information regarding the selected information concept objects and/or other information concept objects of a particular type within the ontology 460. For example, if a question template is of the type "Does <person A> know <person B>?" this template may be populated with the selected information concept object 414 for "John Smith" as "<person A>" with the information concept objects for other persons in the ontology 460 being used to populate the second variable field of "<person B>" such that multiple actual questions of this same template type are generated and evaluated, e.g., "Does John Smith know Mary Adams?", "Does John Smith know Paul Portage?", etc. Moreover, multiple templates may be retrieved and each may be the source for generating a set of questions for different combinations of information concept objects that may be evaluated by the question answering system. For example, in addition to the above template, a second template of the type "What type of relationship does <person A> have with <person B>?" may also be retrieved and used to generate a set of questions for evaluation.

The sets of questions 424 may then be output to one or more hypothetical ontological link evaluation pipelines 430. The hypothetical ontological link evaluation pipelines 430 may each comprise a QA system pipeline 432, such as the QA system pipeline 300 in FIG. 3, which is used to evaluate questions input to the QA system pipeline 432. Each QA system pipeline 432 may be trained for processing particular types of hypothetical ontological links and the question generator 420 may route the output questions 424 to the appropriate QA system pipeline 432 of the hypothetical ontological link evaluation pipelines 430, e.g., a first QA system pipeline may be trained to evaluate hypothetical ontological links of a sub-type of "is related to" while another second QA system pipeline may be trained to evaluate hypothetical ontological links of the sub-type "acquaintance", etc.

The QA system pipelines 432 evaluate the input questions against one or more corpora 470 in the manner previously described above with regard to FIG. 3. As shown in FIG. 4, the one or more corpora 470 may comprise data of different types and from different sources that provide evidence for evaluating relationships (links) between information concept objects 462 in the ontology 460. In one illustrative embodiment, these sources of information provide annotated call logs, social website data, electronic communication data, position determination system data (GPS, cellular network triangulation information, etc.), crime investigation data, criminal record data, and the like. There may be different corpora for different QA system pipelines 432 such that not all of the QA system pipelines 432 may access the same set of data in the corpora, e.g., one QA system pipeline may utilize telephone records in the corpora while another does not and instead utilizes position determination system data as part of its corpora.

Mechanisms of the illustrative embodiments may curate the one or more corpora 470 based on an evaluation of the sources of content (evidence) in the one or more corpora 470. As mentioned above, the sources of content may be evaluated to determine the veracity of the sources and a relative weighting to be attributed to content (evidence) provided by those sources, or even if evidence from those sources should be removed from further consideration and evaluation. This curation of the one or more corpora 470 may result in a temporary or permanent modification of the one or more corpora with regard to the relative weightings attributed to the sources and the corresponding evidence and/or the removal of evidence from the one or more corpora 470 based on the source being removed. In some illustrative embodiments, if a source is sufficiently highly rated, e.g. above a predetermined threshold, then additional content (evidence) from that source may be requested and added to the one or more corpora 470.

The one or more corpora 470 may be evaluated by the QA system pipeline 432 to generate answers to the input questions that are indicative of whether a particular hypothetical ontological link is more or less likely to be an actual ontological link in the ontology 460. In addition, the evidence in support of, or refuting, the answer (collectively referred to herein as "supporting evidence") to the input questions may be maintained in association with the answer for further evaluation by the link scoring and analyzer engine 440 as described hereafter. That is, the QA system pipelines 432 output answers 434 to the input questions, the corresponding confidence scores 436 associated with the answers, and supporting evidence 438 to the link scoring and analyzer engine 440. The link scoring and analyzer engine 440 combines the confidence scores of the answers to generate a base score for the hypothetical ontological link. In addition, the link scoring and analyzer engine 440 may comprise additional logic for analyzing features of the supporting evidence for each of the answers to the input questions to thereby adjust these base scores based on the results of this additional analysis.

For example, when performing link scoring, the link scoring and analyzer engine 440 may evaluate the time of day in the supporting evidence represent an interaction of the information concepts that supports a hypothetical ontological links 412, a duration of the interaction, a frequency of the interactions, whether the information concepts were co-located, a type of activity involved in the interactions, a direction of the interaction (e.g. person A called person B or person B called person A), and the like. These evidential characteristics may be specific to the type of evidence being evaluated, e.g., if the evidence is call records, characteristics of frequency and duration of calls, direction of calls, and the like, may be evaluated whereas for evidence of a location system, characteristics such as geographic coordinate distances, frequency of co-location, time of day of co-location, and the like, may be evaluated.

Thus, for example, if supporting evidence shows that John Smith called Jane Jones (direction of call characteristic) at 9 p.m. (time of day characteristic) on Tuesday (day of week characteristic) and the call lasted approximately 30 minutes (duration of call characteristic), it can be deduced that John Smith and Jane Jones have a more personal relationship than just a work relationship since the time of the call was after work hours. As another example, if the time of the call is greater than a predetermined threshold amount of time, e.g., 20 minutes, then it may be determined that the relationship is of a greater level of personal relationship than if the duration were only 5 minutes. Moreover, if John Smith and Jane Jones call each other more than a predetermined number of times within a prescribed time interval and at times of the day that were after work hours, then it can be determined that there is closer relationship between the persons than if the calls were more infrequent and during working hours. Furthermore, if there is supporting evidence that John Smith and Jane Jones were both located in the same location frequently and at times of day that were after work hours, and for relatively long periods of time, it can be determined that John Smith and Jane Jones have a personal relationship with one another. This information may be used to categorize the type of hypothetical ontological link between the information concepts, e.g., a link of "knows" may be associated with two information concepts but may be further classified into a class of "acquaintance" as a category of the hypothetical ontological link of "knows."

As noted above, in some instances a hypothetical ontological link between information concepts in the ontology 460 may comprise a plurality of sub-links of different types, e.g., person A knows person B may comprise sub-links of person A calls person B, person A is related to person B, person A works with person B, etc. For each such sub-link separate link scores may be generated by the link scoring and analyzer engine 440 based on scoring logic taking into account link type, link and evidential characteristics, weightings associated with the various components of the scoring, i.e. link type, link and evidential characteristics, etc. The link scoring and analyzer engine 440 may aggregate these scores for these heterogeneous sub-links to generate a score for the overall hypothetical ontological link. Thus, a first score for person A calling person B may be generated, a second score for person A being related to person B may be generated, a third score for person A working with person B may be generated, and these scores may be combined in accordance with a determined formula or mathematical algorithm, e.g., a decaying sum or the like, to generate an overall score for the hypothetical ontological link that person A knows person B.

The aggregation of scores from various heterogeneous sub-links may be weighted according to the particular type and characteristics of the sub-links. Thus, for example, a sub-link of the type "calls" may be more heavily weighted when evaluating a hypothetical ontological link of the type "knows" than for a hypothetical ontological link of the type "frequents." That is, if the hypothetical ontological link were John "frequents" Al's Electronics, and there are sub-links that John calls Mary, that Mary has been located at Al's Electronics, that Mary calls Fred, and that John is co-located with Mary on multiple occasions, the weighting of the sub-links of John calls Mary and Mary calls John will have relatively lower weight for this hypothetical ontological link than one that is evaluating whether John knows Fred since John calling Mary is less likely to be indicative of John frequenting Al's Electronics than it is indicative of John knowing Fred.

As another example, assume that an original ontology is generated based on an initial set of information that includes information concept objects and links between the information concept objects. Moreover, further assume that a corpus of information includes telephone records, position information for individuals as may have been obtained from a positioning system, surveillance information indicating logs of events observed by surveillance personnel, electronic communication records from computing systems, e.g., electronic mail servers, internet service providers, etc. From automated analysis of an original ontology, through user input specifying a hypothetical link of interest, or a combination of these approaches, a hypothetical link of interest of "Mary" "knowing" "Fred" may be selected for evaluation. This hypothetical link may be comprised of a plurality of sub-links including, for example, Mary being "related to" Fred, Mary "calling" Fred, Mary being "co-located" with Fred, etc., all of which provide some measure of whether Mary truly "knows" Fred or not. Thus, the sub-links may be of a plurality of different types.

In order to evaluate these hypothetical sub-links that make up the overall hypothetical link that Mary "knows" Fred, evidence from the corpus may be analyzed to identify actual evidential links between the information concept objects. For example, call records may be analyzed to identify calls between Mary and other information concept objects including any calls to Tom, Fred, or other individuals associated with either Tom or Fred that may be indicative of Mary knowing someone that is associated with Tom or Fred. Assume, for example, that in these call logs, a record of a telephone call is found from Mary to Tom. The call record will have various characteristics associated with it which may be evaluated for scoring purposes to thereby score a sub-link between Mary and Tom that Mary "knows" Tom and to categorize the sub-link type into a particular category, e.g., Mary "knows" Tom and this "knows" sub-link is categorized as an "acquaintance."

Through analysis of these various types of sub-links between the information concept objects for Mary, Tom, and Fred, various scores may be associated with particular types of sub-links between the individuals indicative of types of relationships between these individuals, e.g., "calls", "visits", "knows", etc. The sub-links may be heterogeneous in type and may have various levels of weighting that are indicative of their relative importance to inferring the hypothetical ontological link between information concept objects. That is, for a hypothetical ontological link of the type "knows," a sub-link of the type "calls" may be more indicative of a "knows" relationship than a sub-link of the type "co-location". Of course, the characteristics of the particular sub-links are also more or less inferential of the hypothetical ontological link as well. Thus, if a "co-location" sub-link is present between Mary and Fred, but this co-location is at a work or business location, and happens frequently on work days of the week between the hours of 9 a.m. and 5 p.m., this is less likely to indicate that Mary knows Fred than if the location were a home location or residence location, occurs frequently, and tends to be during evening hours and morning hours and on weekends, i.e. just because Mary may work in the same location as Fred does not necessarily mean that Mary knows Fred but if Mary is often located at a residential location during non-business hours, then this is more indicative of a "knows" relationship and in fact is more indicative of Mary being related to Fred in some way since related individuals tend to often spend non-business hours together in residential locations.

These actual sub-links may have different scores based on the evidential support for these sub-links from the corpus in support of, or refuting, the sub-link as being a valid link. The scores may then be aggregated to generate an aggregate score of the evidential support for the various sub-links which is then attributed to an aggregate hypothetical link between two information concept objects. The aggregation of these scores may further be based on a weighting of the various sub-links based on the sub-link type and pre-determined weights generated through machine learning or user specification in configuration parameters for the link scoring and analyzer engine 440.

For example, if the hypothetical ontological link is that Mary "knows" Fred, the various sub-links between the connected information concept objects, e.g., Mary, Tom, and Fred in this case, may be evaluated with regard to Mary and Fred to determine what the aggregate score would be for Mary "knows" Fred. This aggregation of the score may take different forms dependent upon the particular type of hypothetical link being evaluated. Thus, for example, the hypothetical link "knows" may aggregate sub-links of "calls" and "visits" differently than a hypothetical link of "is related to". In generating the aggregate scores, various weights may be applied to the scores of the sub-links based on various pre-defined criteria. For example, a higher weighting may be associated with sub-links that are directly related to one or more of the particular information concepts associated with the hypothetical link, e.g., in the example above, sub-links of the various types that have one or both of Mary and Fred will be given a higher weight than sub-links that do not include Mary or Fred, and in fact sub-links that involve both Mary and Fred may be given an even greater weighting. In addition, based on the particular hypothetical link being evaluated, different types of sub-links may be given greater weightings according to the predetermined criteria, e.g., for a hypothetical link between Mary and Fred of a "related to" type may more heavily weight "calls" sub-links than "co-location" sub-links.

Moreover, the particular characteristics of the particular sub-links may be used to adjust these weights. Thus, for example, while a "co-location" sub-link may in general be given less weight than a "calls" sub-link, characteristics of a particular "co-location" sub-link may dynamically modify this weighting due to the particular type of co-location involved. For example, if the co-location is at a personal residence, and the personal residence is associated with one of the information concept objects, e.g., Mary, then the co-location sub-link may be more indicative of the hypothetical ontological link of Mary knows Fred, than if the co-location sub-link is associated with a business location. As a result, for the particular hypothetical ontological link of Mary knows Fred, the co-location sub-link between Mary and Fred may have its weighting for the aggregate scoring of the hypothetical ontological link dynamically increased due to the characteristics of the co-location sub-link being more indicative of a personal relationship between Mary and Fred. In a similar way, the particular characteristics of a sub-link, e.g., location, time of day, frequency of action, direction of action, etc., may be less indicative of a hypothetical ontological link being supported by the inferences of the sub-links in which case the weights of these sub-links may be dynamically reduced.

The pre-determined criteria may be specified by configuration parameters that are learned using machine learning techniques or specified by human users and stored in association with particular sub-link and hypothetical ontological link types in configuration parameters or data structures associated with the link scoring and analyzer engine 440. For example, an entry in such configuration parameters or data structures may include a listing of the sub-link types and corresponding characteristics that are more or less indicative of the sub-link and/or hypothetical ontological link being an actual link of the particular type. Thus, for example, for an entry corresponding to a hypothetical ontological link of the type "is related to", sub-link types of "calls" and "co-location" may be listed with corresponding base weights associated with these types of sub-links. For each sub-link, a listing of characteristics of that particular type of sub-link may be provided with corresponding adjustment factors either increasing or decreasing the base weight being provided, e.g., for a "calls" sub-link, characteristics of the type "evening hours" and "long duration" may be associated with increase weight adjustments for a hypothetical ontological link of the type "is related to". Thus, if a hypothetical ontological link of "is related to" is being evaluated, and a sub-link of the type "calls" is identified, the corresponding base weight may be assigned to the calculated score for that "calls" link. The characteristics of the sub-link may be further evaluated to determine if the "calls" link is indicative of calls in evening hours and for long durations. If so, then the weight associated with the sub-link "calls" may be increased since calls of long duration and in evening hours are more indicative of a "is related to" relationship or link. It should be appreciated that these characteristics of the sub-links are determined through analysis of the evidential support in the corpus or corpora that provide the factual basis for determining the characteristics of these sub-links.

The score for the overall hypothetical ontological link 442 is output to the ontology modification engine 450 which then determines whether to modify the ontology 460 based on the score for the hypothetical ontological link 442. In determining whether to modify the ontology 460, the ontology modification engine 450 may compare the score of a hypothetical ontological link to a threshold to determine if the score meets or exceeds the threshold, i.e. if there is sufficient evidence and confidence in the hypothetical ontological link as being an actual link between the information concepts to warrant addition of the hypothetical ontological link as an actual link in the ontology 460. If the score meets or exceeds the threshold, then the ontology modification engine 450 may update the ontology 460 to include the hypothetical ontological link as an actual link in the ontology 460. Evidence in support of the addition of this link may be maintained throughout this process, e.g., evidence obtained from search and analysis of the information content from the one or more corpora 470 when answering the questions associated with the hypothetical ontological link, and may be associated with the newly added link in the ontology. This evidence may be used to evaluate the support and reasoning for the addition of the link to the ontology 460 as well as provide insight into other links of the ontology 460.

A user may be presented with notifications of the identification and evaluation of hypothetical ontological links, and may be presented with a representation 482 of the updated ontology 460, via a graphical user interface 480. The user may interact with the ontology 460, such as via graphical user interface elements or the like, to drill down into the evidence associated with various links of the ontology 460. This provides greater insight to the user of the reasoning for certain links and provides a basis upon which additional hypothetical links may be evaluated. For example, having determined that a person, John Smith, knows Carl Carter through the mechanisms previously described, additional types of hypothetical ontological links may be evaluated by the user, e.g., the user may then request that the system of the illustrative embodiments evaluate hypothetical ontological links between Carl Carter and a particular event, e.g., a robbery of Al's Electronics, since it may be known that John Smith is a suspect in the event and the link to Carl Carter indicates a possibility that Carl Carter may have also been involved in the event. In this way, additional lines of questioning are identified in an automated manner and may be presented to a user for determination as to whether to pursue such questioning and additional hypothetical link evaluations, as will be described in greater detail hereafter.

For example, having determined that a hypothetical ontological link between two information concept objects has sufficient evidential support to warrant a modification to the ontology to include the hypothetical ontological link as an actual link in the ontology, or that the hypothetical ontological link meets a predetermined threshold of evidential support to warrant further investigation (even though it may be not be sufficient to warrant modification of the ontology), additional hypothetical ontological links may be automatically generated based on an assumption that the initial hypothetical ontological link is an actual link in the ontology. For example, in the scenario above, there may not have been a previous connection between John Smith and Carl Carter in the ontology and thus, there was no reason to question Carl Carter about a robbery at Al's Electronics. However, now that a link between Carl Carter and John Smith has been evaluated and determined to have sufficient evidence to warrant further investigation, as determined from a comparison of the score associated with the link between Carl Carter and John Smith to one or more threshold score criteria for further investigation, then it now becomes prudent to investigate whether Carl Carter possibly has a link to the robbery of Al's Electronics. Such a follow-up hypothetical ontological link may be automatically identified or manually entered by a user in a similar manner as previously described above but with the modified ontology as a basis or a virtually modified ontology in which the initial hypothetical ontological link between John Smith and Carl Carter is assumed to be an actual link for purposes of follow-up hypothetical ontological link investigation but without formally modifying the ontology. In some illustrative embodiments, follow-up hypothetical ontological links may be automatically identified and a listing of such hypothetical ontological links may be presented to a user for selection of one or more of these to investigate further. In response to a user selection of such a hypothetical ontological link from the listing, the above processes may be repeated with this new hypothetical ontological link being the basis for the operation and the previously evaluated hypothetical ontological link being utilized to provide supporting evidence as if the previously evaluated hypothetical ontological link were an actual link in the ontology.

Thus, in some illustrative embodiments, the evaluation of the hypothetical ontological link in the ontology comprises the operations of: performing, by a Question and Answer (QA) system, an initial analysis of the ontology to identify a set of information concept entities and links between information concept entities in the ontology; generating, by the QA system, the hypothetical link between a first information concept entity and a second information concept entity in the ontology based on the initial analysis of the ontology; and processing, by the QA system, one or more natural language questions corresponding to the hypothetical link. The processing of the one or more natural language questions by the QA system may comprise generating answer results directed to a plurality of links between a plurality of information concept entities. Moreover, the evaluation of the hypothetical ontological link may further comprise aggregating, by the QA system, the answer results across the plurality of links between the plurality of information concept entities to determine an aggregate answer result for the hypothetical link and generating, by the QA system, an indication of whether or not the hypothetical link is a valid link between the first information concept entity and the second information concept entity based on the aggregate answer result for the hypothetical link.

In these illustrative embodiments, the answer results directed to the plurality of links may comprise a plurality of numerical scores where each score is indicative of evidential support for a corresponding link in the plurality of links. The plurality of links may comprise a plurality of links having heterogeneous link types between a plurality of different information concept entities. The answer results directed to the plurality of links may comprise a plurality of numerical scores, where each score is indicative of evidential support for a corresponding link in the plurality of links, and where each score is calculated based on a weight value associated with a link type of the corresponding link.

The answer results may be determined, for each link in the plurality of links at least by, for example, determining a weight value based on the link type and one or more characteristics of at least one of the link or information concept entities associated with the link and applying the weight value to an evidence score associated with the link to generate a score for the link. The one or more characteristics may comprise characteristics of the link, where the characteristics of the link comprise at least one of a location associated with the link, a time of day associated with the link, a frequency of action associated with the link, or a direction of action associated with the link. Determining the weight value based on the link type and one or more characteristics of at least one of the link or information concept entities associated with the link may comprise correlating a characteristic of the link with a link type characteristic associated with a link type of the link based on a data structure correlating characteristics with types of links, retrieving an adjustment value associated with the link type characteristic, and adjusting the weight value based on the retrieved adjustment value.

In some illustrative embodiments, evaluating the hypothetical ontological link may further comprise determining, by the QA system, whether or not to modify the ontology based on the aggregate answer result, and, in response to determining to modify the ontology, modifying the ontology to include the hypothetical link as an actual link in the ontology to generate an updated ontology. Generating, by the QA system, an indication of whether or not the hypothetical link is a valid link between the first information concept entity and the second information concept entity based on the aggregate answer result for the hypothetical link may further comprise outputting a graphical user interface representation of the updated ontology. The graphical user interface representation may comprise graphical user interface elements for drilling down into information about supporting evidence for the hypothetical link in the updated ontology.

It should be noted that, just as hypothetical links between information concepts may be identified by identifying sub-links, scoring them, and then aggregating the scores to identify a score for the link as a whole, a reverse approach may also be utilized to classify or categorize a hypothetical ontological link into a category of the particular type of hypothetical ontological link. For example, a hypothetical ontological link may have a general type of "knows" between two person information concepts. However, as noted above, there may be many different ways that person A "knows" person B such that the particular "knows" relationship may be categorized. For example, person A may have a personal relationship with person B, an acquaintance relationship, a professional relationship, etc. Scoring of the hypothetical ontological link may take into consideration various characteristics of the evidence used to generate the score for the hypothetical ontological link, and/or the sub-links that aggregate to form the hypothetical ontological link, including, for example, time of day of communications, location, type of location (e.g., personal residence, business location, etc.), duration of engagements (e.g., lives, works, plays, patronizes), types of activity at the location, e.g., credit card charges, work activities, etc. All of this information may be analyzed and scored to generate a score for various classifications of the hypothetical ontological link to thereby determine that, while the hypothetical ontological link may be generally that person A "knows" person B, the category of this "knows" relationship is either "personal," "acquaintance," "professional", or the like. Similar types of categorizations of various other types of hypothetical ontological links may likewise be made based on other types of characteristics of the hypothetical ontological links.

A user may be presented with notifications of the identification and evaluation of hypothetical ontological links, and may be presented with a representation 482 of the updated ontology 460, via a graphical user interface 480. The user may interact with the ontology 460, such as via graphical user interface elements or the like, to drill down into the evidence associated with various links of the ontology 460. This provides greater insight to the user of the reasoning for certain links and provides a basis upon which additional hypothetical links may be evaluated. For example, having determined that a person John Smith knows Carl Carter through the mechanisms previously described, additional types of hypothetical ontological links may be evaluated by the user, e.g., the user may then request that the system of the illustrative embodiments evaluate hypothetical ontological links between Carl Carter and a particular event, e.g., a robbery of Al's Electronics, since it may be known that John Smith is a suspect in the event and the link to Carl Carter indicates a possibility that Carl Carter may have also been involved in the event.

Thus, the mechanisms of the illustrative embodiments provide the ability to automatically identify and evaluate hypothetical ontological links between information concepts. This provides a tool for analysts to explore possible links between information concepts as well as allows the system to automatically inform analysts of possible links between information concepts that the analysts may not have previously contemplated. In addition, the mechanisms of the illustrative embodiments provide identification and evaluation of hypothetical ontological links so as to give insight to analysts as to additional types of hypothetical ontological links to investigate, i.e. additional lines of questioning to investigate.

As touched upon above, the mechanisms of the illustrative embodiments utilize various question generation techniques and link scoring techniques to evaluate hypothetical ontological links. With regard to question generation, as noted above, based on the characteristics of the hypothetical ontological link and information concept objects in question, a particular set of question templates corresponding to these characteristics may be selected. Moreover, as noted above, one technique that may be utilized to customize the set of question templates actually used to evaluate the hypothetical ontological link includes question set pruning With regard to scoring, various techniques for generating a score for a hypothetical ontological link may be utilized individually or in combination including aggregation of sub-link scores, link scoring based on corroboration of evidence, link scoring based on certainty of statements within the evidence, and the like. Furthermore, as noted above, the mechanisms of the illustrative embodiments facilitate modifying the corpora based on an evaluation of the veracity of the sources and the generation of different lines of questioning based on the evaluation of a previous line of questioning, e.g., a previously evaluated hypothetical ontological link. Each of these will be described in greater detail hereafter.

Question Set Pruning

As mentioned above, question sets may be established in the question templates database 422 for particular combinations of types of hypothetical ontological links and information concepts. For example, assuming that a hypothetical ontological link involves two information concepts A and B, and a relationship between these two information concepts C, a triplet of (A, B, C) may be correlated to a particular set of question templates T. Hence the question templates database 422 may comprise entries specifying (A, B, C, T) where T may comprise a plurality of question templates. Thus, for example, an entry in the question templates database 422 may be of the type (person 1, person 2, knows, question set 1) indicating a hypothetical ontological link of person 1 knows person 2 and the corresponding question set 1 being the set of question templates to use to evaluate this hypothetical ontological link. It should be appreciated that such entries may be used for sub-links of a hypothetical ontological link as well to evaluate the sub-links which are then aggregated to generate a score for the hypothetical ontological link as a whole.

The set of question templates may be generic in nature for general types of information concepts and hypothetical ontological links. Thus, the set of question templates may cover a wide variety of hypothetical ontological links and information concepts of particular types. These sets of question templates may be further filtered and pruned so as to generate a sub-set of question templates that is further customized to the particular information concepts and hypothetical ontological links being evaluated. To do so, question set pruning logic 425 of the question generator 420 may further evaluate characteristics 411 and 415 of the specific information concept objects 414 and hypothetical ontological link 412 and compare these characteristics to characteristics 421 associated with question templates in an initially selected set of question templates 423 to thereby select question templates within the initially selected set of question templates to be included in a sub-set of question templates that is customized to the particular information concept objects 414 and hypothetical ontological link 412. This subset of question templates may then be populated with specific information about the specifically selected information concept objects 414 and hypothetical ontological link 412 to generate question set 424 for evaluation.

For example, these characteristics 415 of information concepts 414 may include the occupation of the persons involved, a classification of the person involved as being a victim, witness, bystander, suspect, or the like, a classification of a location as being a retail establishment, financial institution, business location, residential location, or the like, or any other characteristic that may be used to differentiate one question template from another as to its applicability to a particular type of information concept object (instance of an information concept). The same is true for the hypothetical ontological link characteristics 411. For example, a hypothetical ontological link may have a characteristic 411 of a type of relationship between the information concepts, e.g. a general hypothetical ontological link of "located at" between a person and a location may have characteristics of "lives at", "works at", "frequents", "shops at", and the like.

These characteristics 411 and 415 may be used by the question set pruning logic 425 of the question generator 420 to select question templates, from an initial set of question templates 423, that correspond to a general classification of the information concept objects 414 and hypothetical ontological link 412, that are specific to the particular characteristics 411 and 415 of the information concepts and hypothetical ontological link. The characteristics 411 and 415 are compared against the characteristics 421 of the question templates 423 to identify matches between the characteristics 411 and 415, and the characteristics 421. For those question templates in the initial set of question templates 423 that have a matching characteristic, the question template is selected for inclusion in a sub-set of question templates that is used to generate question set 424. Thus, for example, an initial set of question templates specific to a person 1 knowing person 2 may be selected from the question templates 422 and may then be pruned or filtered by the question set pruning logic 425 of the question generator 420 to a sub-set of question templates corresponding specifically to a suspect being related to a witness, e.g., a question template included in the sub-set may be of the type "person 1 was incarcerated with person 2" in this situation whereas this question template may not be included in a sub-set for a hypothetical link of information concepts of a witness and a bystander.

In some illustrative embodiments, the specification of a hypothetical ontological link between information concepts is characterized as a scenario that is selected by a user or automated mechanism. For example, the scenario may be that John Smith robbed Al's Electronics which is then represented as a hypothetical ontological link between the information concept object "John Smith" and the information concept object "Al's Electronics" with a hypothetical ontological link type of "robbed". From this scenario and the designation of a person information concept and a location information concept, a set of corresponding question templates may comprise question templates for questioning about a variety of different types of robberies of different types of locations by different types of persons. The pruning of the initial set of questions 423 by the question set pruning logic 425 of the question generator 420 may compare characteristics 411 and 415 to characteristics 421 of the question templates. For example, the initial set of questions 423 may comprise questions regarding the robbery of a financial institution which may have very different set of facts and characteristics from a robbery of a retail establishment, e.g., electronic funds or physical money is generally the target of a robbery of a financial institution while a robbery of a retail establishment often involves stealing of physical items or physical money.

Thus, in the above scenario of John Smith robbing Al's Electronics, since Al's Electronics is a retail electronics store, an investigator would not be interested in whether or not John Smith accessed a computer network of Al's Electronic store because that is less likely to provide any information about whether John actually robbed Al's Electronics or not (although in some cases this may be of interest if there is evidence that a security system were overridden or the like). However, a question about whether John was present in Al's Electronics on or about the time of the robbery would be much more pertinent since the robbery of Al's Electronics is most likely directed to the physical removal of property from the premises of Al's Electronics. Thus, question templates 423 directed to questioning about the physical presence of John Smith at Al's Electronics will have characteristics 421 that match characteristics of Al's Electronics and John Smith whereas question templates directed to accessing computer networks remotely will not have characteristics that match Al's Electronics and/or John Smith.

It should be appreciated that multiple characteristics may be evaluated and a degree of matching may be evaluated to determine whether to include a question template in the sub-set of question templates. Thresholds for matching may be established to provide criteria by which to determine whether to include the question template in a sub-set of question templates. Thus, for example, a degree of matching threshold may require a plurality of characteristics to be matched for the question template to be included in the sub-set of question templates, or certain more important characteristics. Weights may be associated with different characteristics to specify a relative importance of one characteristic to another when performing such matching for question set pruning Hence, sub-sets of question may be generated that are more specific and pertinent to the particular hypothetical ontological link and information concept objects being evaluated.

Thus, in addition to the other mechanisms of the illustrative embodiments for evaluating hypothetical ontological links in an ontology, the mechanisms of the illustrative embodiments may further provide for the customization of sets of questions for evaluating a particular hypothetical ontological link, or sub-link, through a pruning of filtering process to identify question templates that are specific to the particular link and information concept entities being evaluated. Hence, in some illustrative embodiments, a process for generating a set of questions to evaluate a link between concept entities comprises receiving a set of evidential data specifying a plurality of information concept entities, generating a hypothetical link between at least two information concept entities in the plurality of information concept entities (where the hypothetical link represents a scenario involving the at least two information concept entities), retrieving a set of questions corresponding to the hypothetical link between the at least two information concept entities, and pruning or filtering the set of questions into a subset of questions based on the at least one of characteristics of the hypothetical link or characteristics of the at least two information concept entities. The operations further comprise processing the pruned or filtered set of questions based on a corpus of evidence to thereby generate a measure of support for or against the hypothetical link being an actual link between the at least two information concept entities and outputting a validity indication for the hypothetical link indicating whether or not the hypothetical link is an actual link between the at least two information concept entities.

The set of questions may be associated with a general scenario type associated with the hypothetical link and the pruned set of questions may be specific to the particular scenario of the hypothetical link. The set of questions may be generated by performing a lookup in a question template database of types of the information concept entities and a type of a relationship specified by the hypothetical link to identify a set of question templates corresponding to the types of information concept entities and type of relationship. Pruning the set of questions into a subset of questions based on the at least one of characteristics of the hypothetical link or characteristics of the at least two information concept entities may further comprise comparing characteristics of the hypothetical link or characteristics of the at least two information concept entities to characteristics associated with question templates in the set of question templates and selecting question templates, from the set of question templates, that have at least one characteristic that matches at least one characteristic of the hypothetical link or at least one characteristic of the at least two information concept entities.

The operations may further comprise populating fields of the selected question templates with information from at least one of the information concept entities or the hypothetical link to generate the pruned set of questions. The characteristics of the at least two information concept entities may comprise an occupation associated with each of the information concept entities, a classification of the information concept entity as being a victim, witness, bystander, or suspect, or a classification of a location represented by an information concept entity. The characteristics of the hypothetical link may comprise a type of relationship between the information concept entities represented by the hypothetical link.

Corpora Management Based on Grading of Sources

As mentioned above, another aspect of the mechanisms of the illustrative embodiments is the ability to manage the corpora used to evaluate hypothetical ontological links, and question sets associated with the evaluation of hypothetical ontological links, based on a grading of the sources of the content (evidence) present in the corpora 470. A corpora management engine 490 may be provided for this purpose. The corpora management engine 490 comprises logic for evaluating characteristics of sources of content in the corpora 470 and determining whether or not to modify weights associated with these sources, request and ingest additional content from these sources, and/or remove content from these sources, based on a grading of the sources. This corpora management engine 490 may then provide this weighting or results of source grading evaluation to the link scoring and analyzer engine 440 for use in scoring sub-links and/or the hypothetical ontological link as a whole, for example. The weightings based on the source grading may be combined with other scoring criteria to generate scores for links, such as corroboration scoring criteria, certainty of statements scoring criteria, and the like. The corpus management engine 490, depending on the grading of the sources may then either temporarily or permanently modify the corpora 470 being used to evaluate candidate answers to the question set 424 and/or the sub-links and hypothetical ontological link as a whole.

In grading the sources of content in the corpora 470, the corpora management engine 490 maintains various characteristics about various sources of content within the corpora and evaluates these characteristics. For example, current characteristics of the sources as well as results from previous utilizations of content from those sources may be evaluated to determine the veracity of the source and the likelihood that continued reliance on content from that source will give good results during question set 424 evaluation and scoring. As one example, if the source is a witness to a particular event, an evaluation of the person's occupation, previous content provided by the person (e.g., statements made regarding other events or the same event), the contribution of the previous content to a good result being generated by the mechanisms of the illustrative embodiments, and the like, may be evaluated to determine whether to give a current statement (piece of content or evidence in the corpora 470) by the witness a high or low weighting with regard to the grading of the reliability of the content and the credibility of the source. If the person were a police officer, then the credibility of the person's statements (content or evidence) would be more highly graded as reliable and credible. If the person previously provided good content/ evidence for previous evaluations, then the grading of the person as a source would be increased and, as a result, the content provided by that person would be more highly weighted as reliable and credible.

In one illustrative embodiment, the grading of sources performed by the corpora management engine 490 may make use of a source profile directory that maintains the various characteristics of the various sources. The source itself may be a human source, an electronic source, e.g., a database, web page, blog, or the like. Each source has a corresponding configurable source profile in the profile directory which details the attributes that are used to determine the grade of the source using one or more grading formula or equations. An example of a profile for a human being source may be of a type such as:

Name: John Doe
Role: Informant
Number of Engagements: 3
Truthful Information Count: 8
Occupation: Salesman
Age: 35
Address: 4 Acacia Avenue, London, UK
Previous Convictions: 1
Payout Count: $1000

Such a source profile can be generated, at least in part, manually by an investigator or other authorized user that is working with the informant. Moreover, this source profile may also be, at least partially, populated with information gathered automatically from other systems via network connections, such as a law enforcement database or other private or governmental computing system. For example, a user may manually enter part of the information of the source profile, e.g., a name, social security number, Media Access Control (MAC) address, Internet Protocol (IP) address, or other uniquely identifying attribute of the source, and this information may be used to perform a lookup operation automatically in network attached information systems to obtain additional information to populate the source profile.

It should be appreciated that the above example source profile is only an example and many modifications to the above example profile may be made without departing from the spirit and scope of the present invention. In fact, in actual operation, source profiles may contain many more fields for specifying many more attributes than that shown such that a more detailed profile may be established. Moreover, different source profile templates may be created for different types of sources, e.g., different templates for different human sources, e.g., witnesses, investigators, informants, etc. and different templates for different electronic sources of information, e.g., news websites, social media websites, and the like.

Each characteristic of the source may be evaluated in accordance with established logic in the corpora management engine 490 to ultimately generate a grading for the source and a weight to be applied to content/evidence provided by that source. The resulting grading/weight may be provided to the link scoring and analyzer engine 440 which may then utilize this grading/weight to further evaluate the evidence 438 when determining a final scoring for the hypothetical ontological link. That is, as one component of the scoring performed by the link scoring and analyzer engine 440, the grading of the source and its associated weight value for weighting supporting evidence 438 evaluations, may be included when generating a score for sub-links and the hypothetical ontological link. Other factors including corroboration, certainty of statements, and the like, may also be utilized as components of this scoring, as discussed hereafter.

In addition to providing the grading/weight of sources to the link scoring and analyzer engine 440, the corpora management engine 490 may further compare the grading of the source to one or more threshold criteria to determine if the grading of the source equals or falls below a first threshold indicative of a need to remove the source from the corpora 470, or if the grading of the source equals or exceeds a second threshold indicative of a desire to add additional content to the corpora 470 from this source. For example, if it is determined that the source's grading is so bad, i.e. has been determined to be not reliable or credible and actually detracts from the proper operation of the mechanisms of the illustrative embodiments, as to warrant removal of the source, then all content in the corpora 470 that is attributable to that source may be removed from the corpora 470. In one embodiment, this may involve the actual overwriting of the source's content in the corpora 470, marking the source's content as invalid, setting a weight associated with the source and the source's content to zero, or otherwise effectively removing the source's content from further consideration and evaluation by the mechanisms of the illustrative embodiments.

If, on the other hand, the source is determined to be highly reliable and credible through the grading mechanisms of the illustrative embodiments, then the corpora management engine 490 may output a request to obtain more content from that source. This request may be in the form of a notification to a user specifying the source and the grading of the source with information indicating a desire to obtain additional content from that source. This may serve as a notification to the user or investigator as to which sources provide reliable and credible information and may be the source of additional reliable and credible information. Alternatively, the request may be an automated request that is transmitted to the actual source so that the source may then provide additional content for ingestion into the corpora 470. For example, if the source is a particular location determination service, e.g., a particular global positioning system service, then additional location content may be ingested into the corpora 470 from that source for use in evaluating the current and future hypothetical ontological links. In this way, not only is the scoring of the sub-links and hypothetical ontological link influenced by the reliability and credibility of the sources of information in the corpora 470, but the corpora 470 itself may be managed to improve the operation of mechanisms of the illustrative embodiments using an improved corpora 470.

Thus, in addition to the other mechanisms of the illustrative embodiments, in some illustrative embodiments mechanisms are provided for evaluating the sources of evidence in the corpus to adjust weights associated with the evidence provided by those sources as well as manage and curate the corpus by adding additional evidence data from the source, eliminating evidence from the source, or maintaining the amount of evidence obtained from that source based on the determined grading of the source. Hence, in some illustrative embodiments, mechanisms are provided for evaluating an evidential statement in a corpus of evidence by receiving an evidential statement for determining a level of confidence in a hypothetical ontological link of an ontology, identifying a source of the evidential statement, determining a grading of a source of the evidential statement based on a source grading measurement value indicative of a degree of reliability and credibility of the source, generating an indication of trustworthiness of the evidential statement based on the source grading measurement value, and outputting a representation of the indication of trustworthiness of the evidential statement in association with the evidential statement. Grading the source of the evidential statement may comprise generating a weight value to be applied to confidence scores calculated for answers to questions generated based on evidential statements in the corpus associated with the source.

As noted above, these mechanisms may further manage a corpus of evidence data based on the grading of the source of the evidential statement. Managing the corpus may comprise one of maintaining an amount of evidence data from the source in the corpus, increasing the amount of evidence data from the source that is in the corpus, or decreasing the amount of evidence data from the source in the corpus. Managing the corpus of evidence data may comprise comparing the source grading measurement value to one or more predetermined threshold values and performing a corpus management operation based on results of the comparison. In response to the comparison indicating that the source grading measurement value is above a first threshold, the mechanisms of the illustrative embodiments may ingest addition evidence data from the source into the corpus. In response to the comparison indicating that the source grading measurement value is above a first threshold, the mechanisms of the illustrative embodiments may send a request to a user specifying the source and the source grading measurement value and a recommendation to obtain additional evidence data from the source. In response to the comparison indicating that the source grading measurement is below a second threshold, the mechanisms may remove evidence data associated with the source from the corpus. The corpus may be managed to temporarily modify the corpus being used to evaluate candidate answers to a question set used to evaluate a hypothetical ontological link of an ontology.

Determining the grading of the source may comprise evaluating current and historical characteristics of the source. The historical characteristics of the source may comprise information indicative of results from previous utilizations of evidence data from the source when evaluating answers to previously processed questions. The current and historical characteristics may be maintained in a source profile data structure of a source directory associated with the data processing system. The source profile data structure may store data indicating a number of previous uses of evidence data from the source and a number of previous positive uses of the evidence data from the source, for example.

Link Scoring Based on Corroboration

As mentioned above, the link scoring and analyzer engine 440 operates on the answers 434, their confidence scores 436, and the supporting evidence 438 to evaluate the sub-links, aggregate the scores of the sub-links, and generate a score for the hypothetical ontological link which may then be used by the ontology modification engine 450 to determine whether to promote the hypothetical ontological link 412 to an actual link 464 in the ontology data structure 460 or to eliminate the hypothetical ontological link 412 as a possible link in the ontology. As discussed above, one factor that may be utilized by the link scoring and analyzer engine 440 to generate the score for the hypothetical ontological link with regard to evaluating the supporting evidence 438 is the grading of the source of the evidence 438. The source grading component of the scoring may be performed by source scoring logic 442 of the link scoring and analyzer engine 440.

In addition, the sub-links and hypothetical ontological link 412 may further be scored in accordance with an evaluation of corroborating evidence and certainty of statements within the supporting evidence 438. These components may be evaluated by the corroboration scoring logic 444 and certainty scoring logic 446 of the link scoring and analyzer engine 440. It should be appreciated that while this logic 442-446 is shown as separate elements within link scoring and analyzer engine 440, this logic may be integrated with one another. Thus, in some embodiments, all of these factors may be evaluated for scoring while in others, subsets of these factors may be utilized when scoring sub-links and the hypothetical ontological link 412.

With regard to the scoring links based on the corroboration of evidence, the logic 444 evaluates statements in evidence 438 from the same and different sources to determine statement equivalence, i.e. similar facts/conclusions being specified in different statements. That is, an evidential statement for which corroboration is sought is received and the corpus of evidence data is processed to determine a measure of corroboration of the evidential statement by other evidence data in the corpus of evidence data. The measure of corroboration quantifies an evaluation of an amount of evidence, by one or more sources, preferably sources other than the source of the evidential statement being evaluated, in the other evidence data, that describes a same fact or conclusion as presented in the evidential statement. An indication of trustworthiness of the evidential statement is then generated based on the measure of corroboration of the evidential statement by the other evidence data in the corpus of evidence data. This indication of trustworthiness may be output in association with the evidential statement so as to indicate whether the evidential statement is able to be trusted. The indication of trustworthiness may further be used to modify scoring associated with the evidential statement.

In determining whether two or more statements are equivalent, and thus corroborate one another, the logic 444 analyzes various characteristics of the statements to determine if they ultimately are specifying the same or similar facts and/or conclusions. In so doing, for example, the logic 44 looks for sentence structure equality, lexical answer type (LAT) equality, focus equality, conclusion equality, time proximity of the statements, and the like. The sentence structure of one statement may be evaluated to determine the format of the statement and this format may be compared to a format of another statement to determine if the formats match significantly. Similar comparisons may be made with regard to LAT, focus, and conclusion. Various resources may be utilized when evaluating equality including synonym databases, antonym databases, dictionary data structures, and the like. Thus, a direct word-for-word equality is not necessary for a two statements to be considered equivalent, but rather an equivalence of the resulting facts and conclusions is what is necessary.

If two statements in the evidence 438 are determined to be sufficiently equivalent, i.e. an equivalency score generated by comparing the various characteristics of the statements to one another to determine the degree of matching which higher matching statements having higher equivalency scores, then further evaluation of the statements with regard to the grading of the sources of the statements (as described above), determination of relevance to the sub-link or hypothetical ontological link being evaluated, the source type, and time proximity may be performed. For example, if the statements are sufficiently equivalent, the corroboration scoring of the statements may be further modified based on the grading of the sources of the statements according to the reliability and credibility of these sources in the manner previously described above. For example, if one of the statements is made by a police officer, that police officer's statement may be given a greater corroboration score than it otherwise would have due to the source being a police officer who is assumed to be reliable and credible. Similarly, since the other statement, which may be made by another witness to the event, is corroborated by a statement from a police officer, the other statement from the witness may have its corroboration score increased as well. That is, the characteristics of one source of an equivalent statement may be used to affect the scoring of the other equivalent statement.

With regard to relevance, the statements may be evaluated for relevance to the particular sub-link or hypothetical ontological link for which they are being used as supporting evidence. Even though a statement may be corroborated by other statements by other sources, and may be supporting evidence for a particular sub-link, the statement may not in fact be relevant to the sub-link or hypothetical ontological link being evaluated. For example, a specific link type of "knows" between concept A (John) and concept B (Mary) can be evaluated by corroborated statements that concept A (John) visits concept B's (Mary's) place of worship, which is referred to as concept "X" (e.g., First Bible Church). This can be corroborated by statements from concept C (Texas Internal Revenue Service Office #435), e.g., a governmental tax collection agency computing system, or the like, that concept A (John) pays tithes at the same place of worship according to tax returns filed by concept A (John). A further corroborated evidence that may be obtained is that concept D (First Bank of Texas), e.g., a banking organization's computing system, corroborates that concept A (John) contributes to concept X (First Bible Church), e.g., as may be determined from bank statement information associated with concept A's (John's) banking accounts.

Although the link types corroborate payments which would give a confirmation for associated with concept X (First Bible Church), the corroboration from these link types have a smaller relevance to the "knows" link between John and Mary due to the nature of the link and the characteristics of concept X (First Bible Church). That is, just because John goes to the same church as Mary does not mean that John necessarily "knows" Mary. The relevance for a concept is higher if the concept has direct ownership or relation to the entity. For example, concept B (Mary) visits concept Z (John's Home), e.g., a residence of concept A (John), and concept Z (John's Home) is owned by concept A (John) would have a higher relevance score. Thus, the criteria for evaluating the relevance of a corroborating statement will include direct relationships, ownership characteristics, and containment characteristics, and the like, depending on the entity type. If a corroborated statement has a link type between two concepts, an evaluation of a second link type which uses the corroborated statements from the first link type will be reduced if there are no direct relationships, ownership characteristics, or containment characteristics from the interested concept to one of the concepts in the first link. Some illustrative embodiments can reduce the impact of corroborating evidence due to relevance evaluations by using a ratio to reduce the corroboration score value depending on a lack of a relevance criteria.

Another modifier that can be used is the characteristics of the entity and the probability of the link type occurring. For example a building size, population within the building, and the like of the building can be used to determine probability scores for locations. Regarding the evaluation of the time proximity of equivalent statements, the timing of the statements, e.g., author date or other date/time associated with the providing of the statements in the evidence, may be evaluated with regard to each other, the facts/conclusions that they are referencing, and with regard to the sub-links or hypothetical ontological link being evaluated. That is, if two statements are given at close to the same time and regarding a same event happening at a same time, then the statements are more corroborating than if the statements are given at different times and regarding different events happening at different times. For example, if one witness is interviewed on February $9^{th}$ and states "I saw John Smith driving the car on February $7^{th}$" and another witness is interview on March $5^{th}$ and states "I saw John Smith driving a truck on February $14^{th}$" these statements are less corroborating of one another than if the statements were made at closer times to one another regarding events that happened on the same day. Thus, timing characteristics of the statements may be evaluated to determine whether the time characteristics are more or less indicative of corroboration of the statements.

It should be noted that while closely matching statements tend to be more indicative of corroboration of the facts/conclusions identified in these statements, too high a similarity of statements may in fact be indicative of less corroboration and more collusion or copying of statements from one source to another. That is, if two witness are colluding with one another to compose a set of facts that are in fact not true, then they may agree upon a statement that each would make to support that false set of facts. As a result, highly similar statements would be provided by two separate sources. The mechanisms of the illustrative embodiments may identify such high levels of similarity in statements and in fact set thresholds indicating that if the corroboration score meets or exceeds this threshold, a warning notification may be output or associated with the sub-link or hypothetical ontological link being evaluated to thereby warn the user that potential collusion may be present. In addition, or alternatively, a reduction in score of the corresponding evidence may be made to thereby illustrate a lack of confidence in the statements even though they are highly corroborative of one another.

Thus, with the mechanisms of the illustrative embodiments, corroboration of statements in supporting evidence is evaluated to generate a corroboration score for the evidence which is then used to further score the sub-links and hypothetical ontological link to determine if the evidence is supporting of the hypothetical ontological link being an actual link in the ontology or not. The corroboration is one factor in determining the trustworthiness of the evidence along with credibility of the source of the evidence and certainty of the statements themselves.

For example, assume that there are three witnesses to an event. Witness A provides the statement "the driver of the car looked like John Smith". Witness B provides the statement "I saw John drive the truck". Witness C provides the statement "the car was driven by a young African American man." These statements may not, on their face be corroborating since they are not the exact same statement. However, through analysis of these statements the mechanisms of the illustrative embodiments may determine that truck and car are synonymous in most instances for the term "vehicle," both statements reference the name "John" and that "John" was the driver of the vehicle. Thus, the statements of Witnesses A and B are determined to in fact be referring to the same set of facts and are corroborating of one another. From analysis of the third statement, the mechanisms of the illustrative embodiments may determine that the statement refers to a "man" and that the name "John" in the first two statements is a male name indicating additional corroboration by the third statement. Moreover, the third statement is also referring to the "man" as being a driver of a vehicle. Through further analysis of John Smith's characteristics as may be present in association with the information concept object for John Smith, it may be determined that John Smith is in fact an African American and has a current age of 24. As a result, the third statement may be determined to be corroborating of the other two statements.

In looking at the sources of these statements, it may be determined that the first statement was made by a person that has no ascertainable relationship with John Smith and has previously given false statements, the second statement was made by a friend of John Smith who was present at the event, and the third statement was made a police officer that witnessed the event. From this information, the score associated with the first statement may be reduced due to the lack of credibility and reliability of the source of the first statement while the scores of the second and third statements may be increased due to the credibility and reliability of these sources and the corroboration of each of these statements with the other.

As noted above, the corroboration scores generated by the mechanisms of the illustrative embodiments may be used to influence the scores of the sub-links and hypothetical ontological link. In addition, or alternatively, the corroboration scores may be provided separately to the ontology modification engine 450 for inclusion in the GUI 480 that is output. In this way, not only is the user of the GUI 480 given information about the modifications to the ontology 482 but also may be given corroboration scores to indicate the level of trustworthiness in the hypothetical ontological link and its scoring.

Thus, when evaluating a hypothetical ontological link in accordance with illustrative embodiments set forth herein, in addition to the mechanisms described above, additional mechanisms are provided for evaluating the evidential statements, in the corpus of evidence used to evaluate the hypothetical ontological link, for corroboration by other evidential statements within the corpus. In some illustrative embodiments, this involves receiving a first evidential statement for which corroboration is sought, processing a corpus of evidence data to determine a measure of corroboration of the first evidential statement by other evidence data in the corpus of evidence data, generating an indication of trustworthiness of the first evidential statement based on the measure of corroboration of the first evidential statement by the other evidence data in the corpus of evidence data, and outputting a representation of the indication of the trustworthiness of the first evidential statement in association with the first evidential statement. The measure of corroboration quantifies an evaluation of an amount of evidence, by one or more sources other than a source of the first evidential statement, in the other evidence data, that describes a same or similar fact or conclusion as presented in the first evidential statement.

Processing the corpus of evidence data may further comprise analyzing the first evidential statement to identify one or more first characteristics of the first evidential statement, selecting a second evidential statement from the corpus of evidence data, analyzing the second evidential statement to identify one or more second characteristics of the second evidential statement, comparing the one or more first characteristics with the one or more second characteristics to determine a degree of matching of the one or more first characteristics with the one or more second characteristics, and generating a corroboration value based on the degree of matching. The one or more first characteristics comprise at least one of a sentence structure of the first evidential statement, a lexical answer type of the first evidential statement, a focus of the first evidential statement, a conclusion of the first evidential statement, or a time proximity of the first evidential statement.

Generating the corroboration value may further comprise determining if the corroboration value associated with the comparison of the first evidential statement and the second evidential statement is equal to or exceeds a predetermined threshold corroboration value and, in response to the corroboration value equaling or exceeding the predetermined threshold corroboration value, performing further analysis of the first evidential statement and second evidential statement to generate a modified corroboration value. Performing further analysis of the first evidential statement and second evidential statement to generate the modified corroboration value may comprise at least one of: grading a first source of the first evidential statement and grading a second source of the second evidential statement; determining a relevance of the first evidential statement and second evidential statement to a hypothetical ontological link of an ontology for which the first evidential statement is used as supporting evidence; evaluating a source type of the first source and a source type of the second source; or evaluating a time proximity of the first evidential statement with the second evidential statement.

Generating the indication of trustworthiness of the first evidential statement further may comprise evaluating a first source of the first evidential statement and a second source of the second evidential statement based on at least one of an occupation of a first person that is the first source and an occupation of a second person that is the second source, or a reputation of the first person and reputation of the second person. Generating the indication of trustworthiness of the first evidential statement may further comprise evaluating a relevance of the first evidential statement and second evidential statement to a hypothetical ontological link of an ontology for which the first evidential statement is used as supporting evidence. The relevance may be evaluated according to direct relationships, ownership characteristics, and containment characteristics within the first evidential statement and second evidential statement.

Processing the corpus of evidence data may comprise comparing the degree of matching to a first threshold to determine if the degree of matching is sufficient to indicate corroboration of the first evidential statement by the second evidential statement, and comparing the degree of matching to a second threshold to determine if the degree of matching indicates a copying of at least a portion of the first evidential statement by the second evidential statement or a portion of the second evidential statement by the first evidential statement. In response to the degree of matching being equal to or greater than the second threshold, the indication of trustworthiness of the first evidential statement is reduced.

Link Scoring Based on Certainty Statements

As mentioned above, in addition to the evaluation of the source of evidence and the corroboration of the evidence, an additional consideration performed during the scoring of the supporting evidence for a sub-link or hypothetical ontological link is to analyze the language of the evidence itself to determine a level of certainty in the language indicative of a trustworthiness or veracity of the facts/conclusions specified in the evidence. In so doing, the certainty logic 446 of the link scoring and analyzer engine 440 may perform natural language processing on the evidence 438 to identify patterns of terms in the evidence 438 that are recognizable as patterns indicative of various levels of certainty. For example, the use of terms such as "I saw" or "I heard" or the like may be indicative of a first-hand account and a higher level of certainty than other types of terms, such as "I think" or "may be" or "looked like". These latter terms may be recognizable patterns indicative of low certainty of the corresponding evidence and are referred to as "hedging" terms, phrases, or textual patterns since the source is equivocating the certainty of the facts or conclusions made in the statement.

The certainty logic 446 may have a database of patterns and terms that are matched to corresponding levels of certainty, e.g., certain, not certain, or undetermined certainty. The certainty logic 446 may perform pattern matching or term matching with the patterns and terms identified in the evidence 438 to determine if the scores associated with the evidence should be increased, decreased, or remain unmodified based on the determined degree of certainty in the evidence itself. If patterns or terms in the evidence 438 match patterns/terms recognized by the certainty logic 446 as high certainty patterns/terms, then the scores associated with that evidence may be increased by a certainty weighting factor corresponding to the particular certainty patterns/terms that are matched, e.g., one certainty pattern may have an associated first certainty weighting factor associated with it in the database of patterns/terms while another certainty pattern may have an associated second certainty weighting factor different from the first certainty weighting factor. If patterns or terms in the evidence 438 match patterns/terms recognized by the certainty logic 446 as low certainty patterns/terms, then the scores associated with that evidence may be decreased by a certainty weighting factor corresponding to the particular certainty patterns/terms that are matched. Other patterns/terms may result in no modification of the scores of the evidence.

Thus, looking at the example statements of Witness A-C above, Witness A's statement that "the driver of the car looked like John Smith" is indicative of a low certainty since the witness cannot state for a fact that it was John Smith that was driving the car, only that it looked liked John Smith. Thus, witness A's evidence scoring would be decreased by the certainty weight. Witness B's statement of "I saw John drive the truck" is much more certain in that it provides a first hand account with definitive statement that it was John that drove the truck. Thus, Witness B's statement would be modified to increase its scoring by the certainty weight. Witness C provides the statement "the car was driven by a young African American man" and does not use a pattern recognizable as providing certainty or non-certainty and would thus, not have its scoring modified by a certainty weighting. Hence in addition to the scoring of evidence based on veracity of the source and corroboration, the mechanisms of the illustrative embodiments may further factor into the scoring the intrinsic certainty of the evidence itself.

Thus, in addition to the mechanisms previously described links between information concept objects or entities may be further evaluated by evaluating the corpus of evidence data with regard to intrinsic certainty terms, phrases, or textual patterns so as to adjust the scoring of links based on a determined level of intrinsic certainty in the supporting evidence. For example, in some illustrative embodiments, when evaluating a link between information concept entities, the evaluation may comprise receiving a set of evidential data specifying a plurality of information concept entities, generating a link between at least two information concept entities in the set of evidential data, and evaluating the set of evidential data with regard to whether or not the set of evidential data supports or refutes the link. The evaluation of the set of evidential data may comprise analyzing language of natural language statements in the set of evidential data to identify certainty terms within the natural language statements. In addition, the evaluation of the link may comprise calculating a confidence value for the link based on results of the evaluation of the set of evidential data and generating a knowledge output based on the link and the confidence value associated with the link.

The certainty terms may comprise first-hand account terms or phrases indicative of a first-hand account being specified in the evidential data. Calculating the confidence value for the link based on results of the evaluation of the set of evidential data may comprise increasing a confidence value for the link in response to detecting first-hand account terms or phrases in the evidential data. Moreover, the certainty terms may comprise hedging terms or phrases indicative of a lack of certainty in the facts or conclusion specified in the evidential data. In such a case, calculating the confidence value for the link based on results of the evaluation of the set of evidential data comprises decreasing a confidence value for the link in response to detecting hedging terms or phrases in the evidential data.

A database of patterns of certainty terms and phrases may be maintained where each pattern in the database is associated with a corresponding level of certainty, and where evaluating the set of evidential data may further comprise matching patterns of terms or phrases in the evidential data to corresponding patterns in the database of patterns. The level of certainty for each of the patterns in the database, in one illustrative embodiment, may be one of the following levels of certainty: certain, not certain, or undetermined certainty. Each level of certainty is associated with a different certainty weighting factor. A certainty weighting factor associated with a level of certainty of a matching pattern in the database of patterns is applied to a confidence score associated with a portion of evidence in which the matching pattern is present to generate a modified confidence score for the portion of evidence. For example, if the level of certainty of the portion of evidence is certain, then the corresponding certainty weighting factor increases the confidence score associated with the portion of evidence. If the level of certainty of the portion of evidence is not certain, then the corresponding certainty weighting factor decreases the confidence score associated with the portion of evidence. If the level of certainty of the portion of evidence is undetermined certainty, the corresponding certainty weighting factor does not modify the confidence score associated with the portion of evidence.

As noted above, the evaluation of the link based on the intrinsic certainty of the supporting evidence may be used when evaluating a hypothetical ontological link in an ontology for inclusion in the ontology. This evaluation may be based on the knowledge output generated from the evaluation of the intrinsic certainty terms, phrases, and textual patterns in the supporting evidence. The evaluation of the hypothetical ontological link may be used to modify the ontology to include the hypothetical ontological link as an actual link in the ontology in response to the knowledge output indicating the hypothetical ontological link to be a valid link between information concept objects in the ontology.

Generating Different Lines of Questioning Based on Evaluation of Previous Line of Questioning As mentioned above, another aspect of the present invention is that once a hypothetical ontological link is determined to be sufficiently supported by the evidence is the corpora 470 to warrant a modification of the ontology 482 to include the hypothetical ontological link 412 into the ontology 482 as an actual link, follow-up lines of questioning and hypothetical ontological links may be identified and evaluated through the mechanisms of the illustrative embodiments to thereby generate new lines of questioning and potentially new links in the ontology 482. Moreover, additional lines of questioning may be generated in response to answers 434 received as a result of the processing of the question set 424, e.g., additional sub-links may be identified and evaluated. That is, an answer to a question in the question set 424 may spawn one or more additional follow-up questions to be submitted to the hypothetical link evaluation pipeline 430 for evaluation and use in generating additional answers 434, confidence scores 436, and evidence 438 for evaluation and scoring of the sub-links and hypothetical ontological link 412. This may include additional information concept objects 414 that may not have been previously subjects of the question set 424, for example.

To give a more clear picture of a scenario in which these mechanisms may operate, consider a scenario in which the user is investigating a robbery of Al's Electronics and the user wishes to determine whether John Smith and Jen Johnson robbed Al's Electronics. The user specifies the scenario as a hypothesis or question, e.g., "Did John Smith and Jen Johnson rob Al's Electronics?" Thus, the scenario in question is John and Jen robbed Al's Electronics. The mechanisms of the illustrative embodiments generates an initial set of equation templates in the manner described previously and prunes the set of question templates to generate a sub-set of question templates. The question templates in the sub-set of question templates are then used as a basis for populating instances of the question templates to thereby generate the question set 424 for the particular scenario. The question set 424 is then applied by the hypothetical link evaluation pipeline 430 to the corpora of evidence to determine evidence that supports and/or refutes the scenario or hypothesis.

During the process of evaluating the pruned set of questions 424, assume that evidence arises that John was present in Al's Electronics 2 days prior to the robbery but Jen has never been to Al's Electronics according to the set of evidence data. Thus, the original scenario in question, i.e. John and Jen robbing Al's Electronics, is likely to be determined to have lower evidential support since Jen has not visited to Al's Electronics.

However, through the mechanisms of the illustrative embodiments, it may be determined that there is an additional line of questioning that may be generated as to whether John has other acquaintances that have visited Al's Electronics on or about the time of the robbery since John was present at Al's Electronics at a close time to the robbery but Jen was not. Thus, a new line of questioning may be generated as to "Who are John's acquaintances?", "Have any of John's acquaintances been to Al's Electronics on or around the date of the robbery?", "Did John communicate with any of these acquaintances on or around the date of the robbery?", etc. Therefore, while the original scenario may not have involved these other acquaintances, the line of questioning has now expanded to encompass other concept entities that may not have been originally included in the defined scenario. As a result, the scenario itself is expanded by introducing new lines of questioning.

The additional lines of questioning may be determined based on link types that have a high relevance to the link type and activity of the hypothetical ontological link being evaluated. Moreover, additional lines of questioning may be determined based on information concepts that have a relevance to association with the particular link type and activity of the hypothetical ontological link, e.g., an activity of a "robbery" involves "person" information concepts and "location" information concepts and thus, additional lines of questioning should be of the type that present questions regarding persons and locations and in particular the persons and/or locations associated with the hypothetical ontological link. Thus, the additional line of questioning logic will take into consideration the particular scenario being evaluated, the particular link type of the hypothetical ontological link being evaluate, and the information concept types involved in the hypothetical ontological link.

In identifying the additional lines of questioning, question templates corresponding to combinations of link types and information concept types related to the hypothetical ontological link are retrieved and populated with information regarding specific information concepts associated with the hypothetical ontological link. For example, if the original hypothetical ontological link involves the information concept for "John", then the information for the information concept "John" may be used to populate an information concept object of the question template for the additional line of questioning. For example, in a scenario to establish complicit activities, a "knows" link for a person A to person B will trigger a set of communication and contact type link questions between person A and person B. Further if a location is involved, the set of questions generated would try to establish any link between persons A and/or B with the specified location.

The actual identification of additional lines of questioning may be based on configuration of the illustrative embodiment to identify information concept types and link types that are highly correlated with information concept types and link types of the particular hypothetical ontological link, or sub-link, being evaluated. For example, the logic for implementing the mechanisms of the illustrative embodiments may be configured recognize that a person information concept type is most often (e.g., 90% of the time) linked with another person information concept type or location information concept type. Similarly, a link type of "visits" may be most often linked with a location information concept type (e.g., 92% of the time) and to a lesser degree is linked with a person information concept type (e.g., 5% of the time) and an Internet address information concept type (e.g., 2% of the time). However, for a particular type of hypothetical ontological link and scenario involving wire fraud, the "visits" link type may instead be linked to an Internet address information concept type a majority of the time (e.g., 80% of the time). These configuration parameters for identifying highly correlated information concept types and link types may be learned over time using a machine learning approach, may be manually entered by a subject matter expert, or any combination of machine learning and manual entry.

Having identified the highly correlated information concept and link types for the particular information concepts and hypothetical ontological link or sub-link being evaluated, for the set of highly correlated information concept types and link types, a similar approach as discussed above for the hypothetical ontological link may be followed to retrieve a set of question templates, prune the set of question templates, populate fields of the question template with specific information from the particular highly correlated information concept objects and links, and process the resulting questions. Thus, mechanisms are provided for identifying and processing additional lines of questioning based on results generated by processing a previous set of questions directed to a particular link evaluation.

In other words, in accordance with one illustrative embodiment, mechanisms for generating different lines of questioning based on the evaluation of a previous line of questioning are provided that receive a set of evidential data specifying a plurality of concept entities and receive input specifying a scenario to be evaluated by the data processing system. The scenario specifies a hypothetical link between at least two of the concept entities. The mechanisms evaluate a first set of questions corresponding to the at least two information concept entities based on the set of evidential data and, based on results of evaluating the first set of questions, automatically generate a second set of questions to further expand upon and investigate the results of evaluating the first set of questions. The mechanisms process the second set of questions based on the set of evidential data and output an indication of the scenario and a corresponding measure of support for or against the scenario being a valid scenario involving the at least two concept entities based on results of evaluating the first set of questions and processing the second set of questions.

The second set of questions may be associated with one or more other links related to the hypothetical link. The second set of questions may be directed to at least one information concept entity different from the at least two information concept entities.

Automatically generating the second set of questions may comprise identifying at least one of an follow-up information concept entity type that is correlated with an information concept entity type of one of the at least two information concept entities, or a follow-up link type of another link that is correlated with a link type of the hypothetical link. Moreover, generating the second set of questions may further comprise retrieving, from a question template data structure, a set of question templates corresponding to the follow-up information concept entity type or follow-up link type. In addition, generating the second set of questions may comprise generating the second set of questions based on the retrieved set of question templates.

Identifying at least one of the follow-up information concept entity type or follow-up link type may comprise using at least one of machine learned or manually input configuration information specifying related information concept entity types and related link types. Automatically generating the second set of questions may be performed in response to the results of evaluating the first set of questions indicating that the hypothetical link has sufficient evidential support to be considered an actual link to be added to an ontology. Automatically generating the second set of questions may comprise evaluating the scenario, a link type of the hypothetical link, and information concept types of the at least two information concept entities to identify other information concept types and link types that are highly related to one or more of the scenario, the hypothetical link, or the at least two information concept entities.

Returning again to the basic operation of the illustrative embodiments, as noted above, the mechanisms of the illustrative embodiments evaluate the hypothetical ontological links to generate a score for the hypothetical ontological links which represent a measure of confidence or evidential support for the hypothetical ontological link being an actual link between information concepts in the ontology. The scoring takes into consideration the characteristics of the particular hypothetical ontological link including the type of the link the particular information concepts that are the subjects of the link, and the like. Evidence supporting or refuting the link is found in the corpus by processing a set of questions corresponding to these extracted features of the hypothetical ontological link to generate queries that are applied against the corpus to find evidence from the corpus that matches the queries. The resulting evidence is used to generate answers to the questions. In addition, in some illustrative embodiments, the evidence is collected for further evaluation when scoring the hypothetical ontological links based on the characteristics of the evidence and the characteristics of the particular hypothetical ontological links inferred by the evidence. That is, the evidence gathered by the QA system pipeline is further provided to the link scoring and analyzer engine 440 for evaluation. The link scoring and analyzer engine 440 not only combines the results of the answers generated from the various questions in the set of questions, but may further analyze the evidence with regard to various characteristics, e.g., timing of the evidence, locations corresponding to the evidence, activities associated with the evidence, and the like, to thereby categorize the type of the hypothetical ontological link so as to more specifically identify the type of link between the information concepts, e.g., person A "knows" person B on a "personal" basis or "professional" basis. The scoring of the sub-links that are aggregated to score the hypothetical ontological link, as well as the scoring of the hypothetical ontological link itself, may involve further evaluation of the supporting evidence with regard to grading of the sources of the evidence, corroboration, and certainty of the statements within the evidence.

To better illustrate the operation of the illustrative embodiments with regard to question generation for hypothetical ontological links, example scenarios are provided in FIGS. 5 and 6 illustrating hypothetical ontological link question generation in accordance with one illustrative embodiment. FIG. 5 shows an example of hypothetical ontological link question generation with regard to an information concept of a person, John, with the hypothetical ontological link being investigated being of the type "acquaintances." As a result of this input, the mechanisms of the illustrative embodiments determine that for the "acquaintance" type of hypothetical ontological link, associated with a person information concept, three possible hypothetical ontological sub-links are present including John calling another person information concept, John knowing another person information concept, and John visiting a particular location associated with another person information concept.

Corresponding question templates for these types of sub-links are retrieved based on the type of the sub-links and the type of the information concept, i.e. person information concept: John. Thus, for the combination of the sub-link type "know" and the person information concept, the question templates "Does <Person A> know <Person B>?" and "What type of relationship does <Person A> have with <Person B>?" where Person A is John and Person B is other person information concepts within the ontology, e.g., person information concepts Paul and Mary in the depicted example. Thus, instances of these questions are generated for each of the person information concepts Paul and Mary and submitted to a corresponding QA system pipeline for evaluation.

Similar to the above, question templates for the combination of the sub-link type "call" and the person information concept are retrieved. In the depicted example, this results in question templates of "Does <Person A> call <Person B>?" and "Does <Person B> call <Person A>?" For the combination of sub-link type "visit" and the person information concept, the question templates "Does <Person A> visit <Location A>?" and "How likely is <Person A> to visit <Location A>?" are retrieved. With these question templates, the Location A variable is replaced with locations present in the ontology, such as Times Square in the depicted example.

It should be noted that in the tables shown in FIGS. 5 and 6, the "route" column refers to the type of analysis required, e.g., simple or scenario. A simple analysis looks for direct evidential support for the particular type of link, e.g., direct evidence is likely to exist for answering the question "Does John call Mary?" in the form of telephone records or the like. However, other types of questions may require a more complex scoring and evidential support analysis to determine the answer to the question, e.g., the question "What type of relationship does John have with Mary?" will require that a variety of different evidence and characteristics of the evidence be evaluated to answer this question. Questions requiring more complex scoring and analysis are referred to as having a "scenario" route whereas questions that will likely have direct evidence for answering the question in the corpus are referred to as having a "simple" route.

FIG. 6 shows an example of hypothetical ontological link question generation with regard to an information concept of a location, Times Square. All valid hypothetical ontological links associated with the location and other information concepts in the ontology will be investigated and evaluated by the mechanisms of the illustrative embodiments in response to the selection of the location information concept of Times Square. In this case, having selected an information concept that has the type of a "location", various hypothetical ontological links between the location information concept and other information concepts are identified. In this depicted example, various hypothetical ontological links between the location and person information concepts are identified, e.g., a "visit" link, a "live" link, a "work" link, and a "call" link.

Corresponding question templates for these types of hypothetical ontological links are retrieved based on the type of the links and the type of the information concept, i.e. location information concept: Times Square. Thus, for the combination of the link type "work" and the location information concept, the question templates "Does <Person A> work in <Location A>?" and "Who are the people that work in <Location A>?" where Location A is Time Square and Person A is other person information concepts within the ontology, e.g., person information concepts John, Paul and Mary in the depicted example. In some illustrative embodiments, the set of question templates may comprise a large number of question templates that cover a wide range of possible types of information concepts and hypothetical ontological links or sub-links. Hence, a pruning operation, such as discussed above, may be implemented to prune the initial set of question templates into a set of question templates for the particular information concept instances (objects) and hypothetical ontological link or sub-link being evaluated.

Instances of the question templates in the pruned set of question templates are generated for each of the location information concept and person information concepts John, Paul and Mary, where appropriate, and submitted to a corresponding QA system pipeline for evaluation, e.g., a first instance of "Does John work in Times Square?" and a second instance of "Does Mary work in Time Square?" may be generated and evaluated by the QA system pipeline.

Similarly, question templates for the combination of the hypothetical ontological link type "call" and the person information concepts are retrieved. In the depicted example, this results in question templates of "Does <Person A> call <Person B> in <Location A>?" and "Does <Person B> call <Person A> in <Location A>?" For the combination of hypothetical ontological link type "visit" and the person information concept, the question templates "Does <Person A> visit <Location A>?" and "How likely is <Person A> to visit <Location A>?" are retrieved. Moreover, for the hypothetical ontological link type of "live," the question template of "Who are the people currently living in <Location A>?" is retrieved and used to submit a question to the QA system pipeline for evaluation.

It should be appreciated that in these examples shown in FIGS. 5 and 6, the questions are received from the question set database or repository that stores sets of questions in association with one or more information concept types and/or hypothetical ontological link types. Thus, for a hypothetical ontological link type of "location" there may be multiple sets of questions associated with this link type with each set being associated with a different type of information concept, e.g., a set of questions for person information concepts, a set of questions for event information concepts, etc. These sets of questions may be presented as templates that have variables or fields that are populated with the actual information from the selection of information concept and hypothetical ontological link type by the user or automated hypothetical ontological link identification engine, and/or information from the information concept objects and actual link objects in the ontology.

FIGS. 7-10 are provided hereafter to further illustrate the operation of the one illustrative embodiment of the present invention with regard to a particular scenario. It should be appreciated that FIGS. 7-10 utilize a simplified ontology for purposes of illustration. In actuality, ontologies may be very complex having many different information concepts and linkages between information concepts that are identified and evaluated using the mechanisms of the illustrative embodiments. FIGS. 7-10 are only intended to be examples and are not intended to state or imply any limitation with regard to the manner in which the mechanisms of the illustrative embodiments may be employed.

Figure 7:
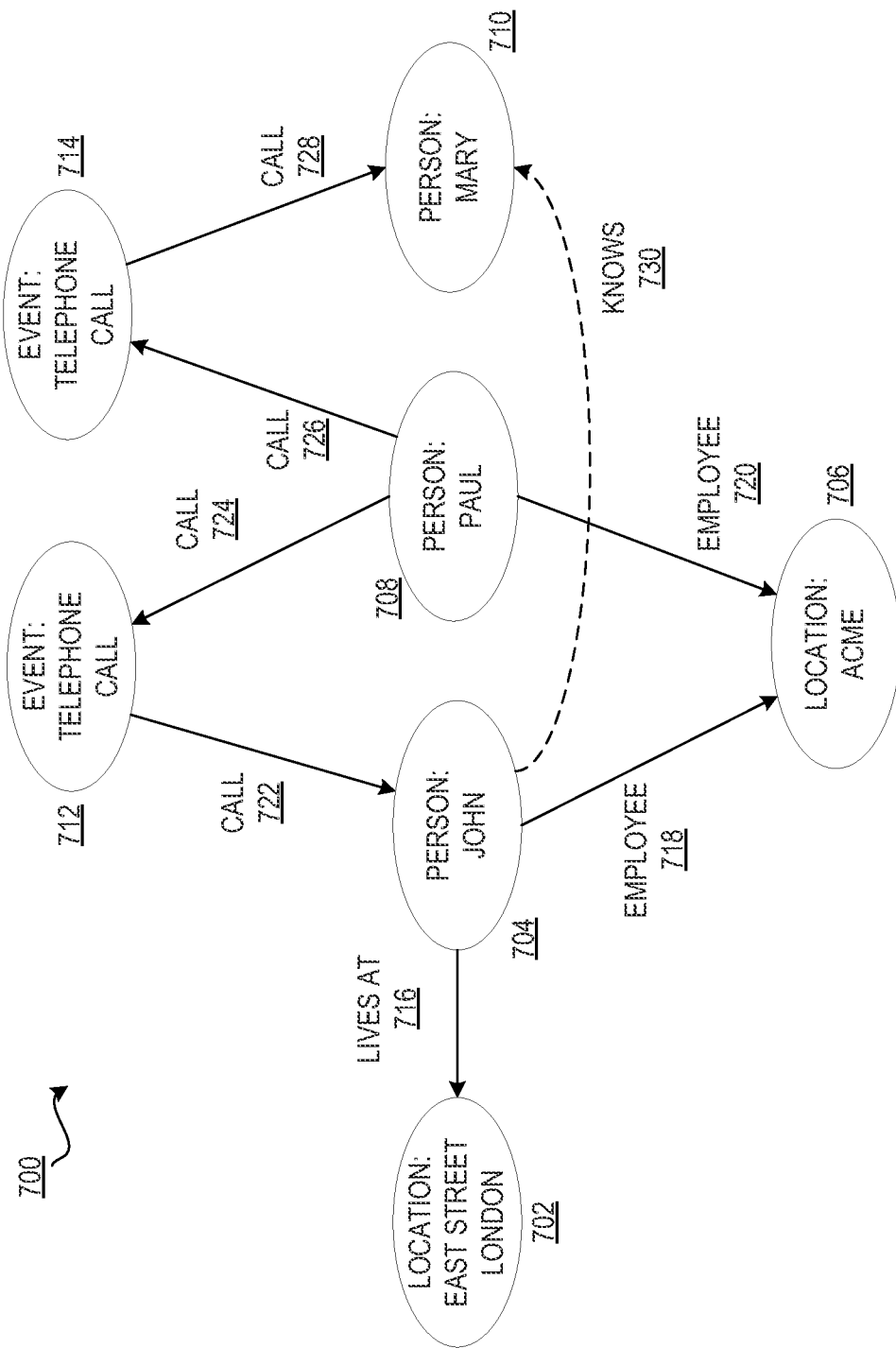
FIG. 7 is an example diagram illustrating a graphical representation of a simplified ontology having actual links between information concepts and a hypothetical ontological link for investigation by the mechanisms of the illustrative embodiments.

FIG. 7 is an example diagram illustrating a graphical representation of a simplified ontology having actual links between information concepts and a hypothetical ontological link for investigation by the mechanisms of the illustrative embodiments. As shown in FIG. 7, the ontology 700 comprises a plurality of information concept objects 702-714 of various types including locations, persons, and events. Various ontological links 716-728 exist between these information concept objects. This ontology 700 may be pre-constructed based on information already entered into the system to build the ontology 700 by specifying the various information concept objects 702-714 and their attributes as well as the ontological links 716-728 and their attributes including link type.

In the depicted example ontology 700, the person 704 "John" lives 716 at the location 702 "East Street London." The person 704 "John" also is an employee 718 at the location 706 "Acme". In addition, the person 708 "Paul" is also an employee 720 at the location 706 "Acme".

It is further noted that in this ontology 700, call events 712 and 714 are indicated. It can be seen from the ontology 700 that the person 708 "Paul" was involved with the person 704 "John" in an event 712 which was a telephone call. The event 712 may have various attributes specifying the date and time of the call, duration of the call, the direction of the call (who called whom), and the like. This leads to links 722 and 724 between the persons 704 and 708 with the event 712. Similarly, another person 710 "Mary" was involved in the event 714 with the person 708 "Paul" leading to links 726 and 728.

With this ontology 700 as a starting point, assume that an analyst wants to know whether the person 704 "John" knows the person 710 "Mary." It should be noted that, in the ontology 700, there is no pre-existing link between John 704 and Mary 710. Therefore, without investigating the hypothetical ontological link between John 704 and Mary 710, the ontology 700 on its face indicates that John 704 does not know Mary 710. Thus, the analyst may input to the mechanisms of the illustrative embodiments, a selection or specification of the person 704 "John" and a selection or specification of the person 710 "Mary". The analyst may also specify that the hypothetical ontological link 730 that is being asked about is of the type "knows." As a result, various possible sub-links between John 704 and Mary 710 may be identified as being sub-links of the hypothetical ontological link 730, e.g., call link, visits link, knows link, works with link, etc. For each of these possible sub-links a set of question templates may be retrieved to evaluate using appropriately trained QA system pipelines. For simplicity, it is assumed that the questions in the question set 740 that are submitted to the trained QA system pipeline include the questions "Does John know Mary?", "What type of relationship does John have with Mary?", "Does John work with Mary?", and "Does John call Mary?"

These questions are submitted to the QA system pipelines and the answers to these questions, the confidence scores, and the underlying supporting evidence is returned. This information is provided to a link scoring and analysis engine which evaluates the evidence and answers and generates a score for the sub-link. For example, one feature of the hypothetical ontological link between John 704 and Mary 710 is whether John 704 calls or is called by Mary 710. Through evaluation of the question "Does John call Mary?" it may be determined that while John 704 does not directly call Mary 710, John 704 does call Paul 708 directly and that Paul 708 calls Mary 710 directly at approximately the same time, duration, and on multiple occasions. This information may be collected by searching through the corpus to find who John does call, and then find out who the persons that John calls, in turn call. Correlating the telephone records in the corpus for such calls, the system may determine that at approximately the same time on a plurality of occasions, there was a call from John to Paul at approximately the same time and duration as a call from Paul to Mary. This is an indication that while two separate phone calls are logged in the corpus, they may in fact have been a single telephone conference conducted between John, Paul, and Mary. Thus, while the answer to the question "Does John call Mary?" may be "no" with a high confidence from analysis of the direct evidence within the corpus since there is no explicit evidence of an actual call directly from John to Mary, additional analysis by the link scoring and analyzer engine may determine that there is circumstantial evidence that supports a change in the scoring of the sub-link that John calls Mary.

Similarly, analysis of the question "Does John work with Mary?" may result in an answer of "no" since Mary does not have a link to the Acme location 706 indicating that Mary is an employee of Acme. However, there may be evidence in the corpus that Mary visited the Acme location 706 at some time thereby indicating a stronger possibility that John knows Mary. Other similar evidence showing connections between John and Mary, or John with other information concepts to which Mary has a connection as well, in the evidence of the corpus, may be evaluated and used to generate a supporting evidence score for the various sub-links for the hypothetical ontological link that John know Mary 730.

Thus, the link scoring and analyzer engine is configured with logic for looking at various characteristics of the supporting evidence in the corpus to determine if there is circumstantial evidence within the corpus that supports or refutes the sub-links and the hypothetical ontological link. Each of the evaluations of these characteristics may be combined to generate scores for the sub-links and then the scores for the sub-links may be combined to generate a score for the hypothetical ontological link 730 between John 704 and Mary 710 indicating that John 704 knows 730 Mary 710.

Moreover, the link scoring and analyzer engine may further evaluate the evidence with regard to the grading of the source of the evidence as discussed above with evidence coming from unreliable and/or non-credible sources being effectively discounted while evidence from sources that are reliable and credible being given greater weight. In addition, the link scoring and analyzer engine may further evaluate the evidence for corroboration from other sources of evidence and for certainty of the evidence based on the statements within the evidence itself. Each of these factors may be combined to modify the scoring of the evidence and ultimately the sub-links and hypothetical ontological link, such as in the manner previously discussed above.

Figure 8:
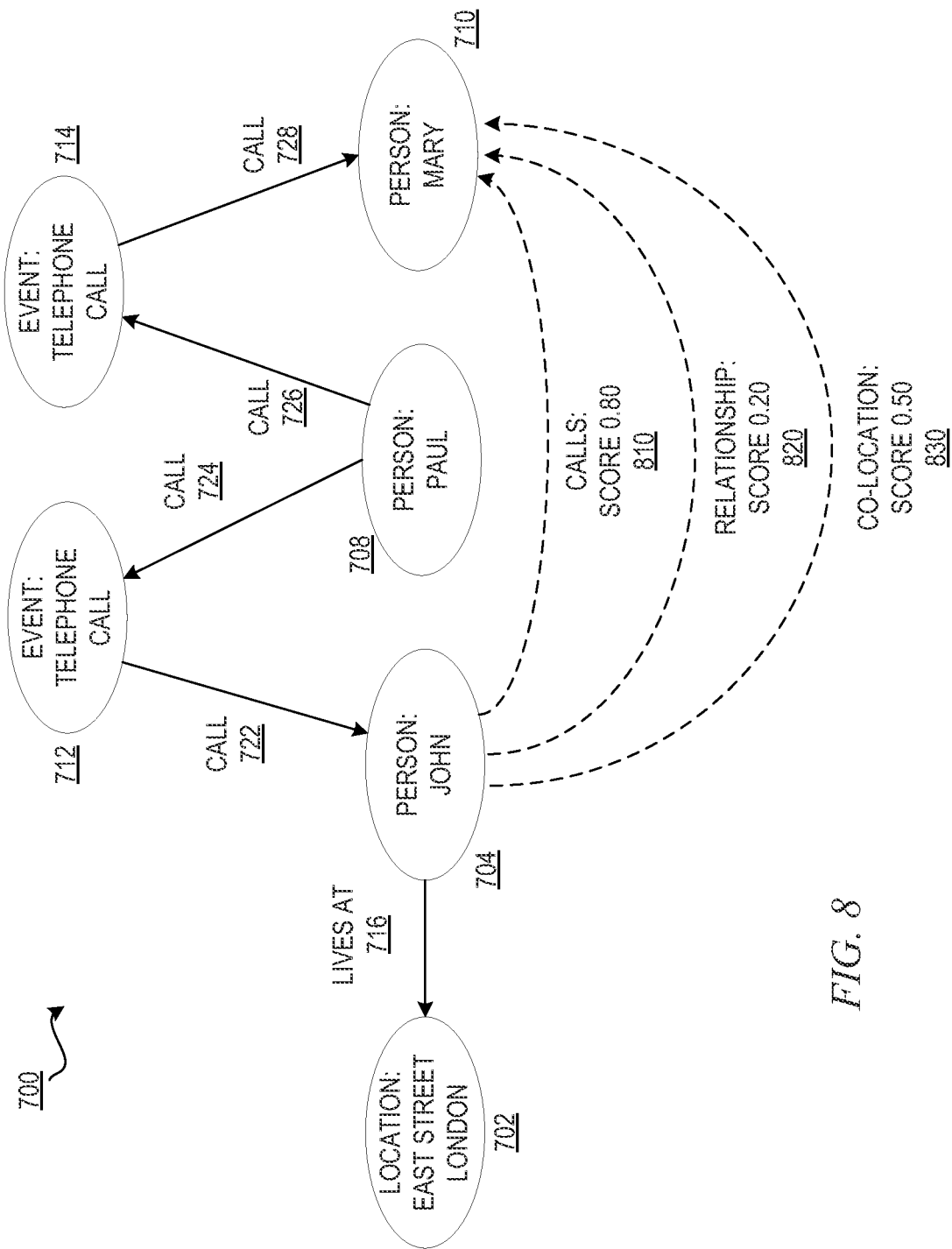
FIG. 8 is an example diagram illustrating the example simplified ontology of FIG. 7 with scoring of the hypothetical ontological link in accordance with one illustrative embodiment.

FIG. 8 is an example diagram illustrating the example simplified ontology of FIG. 7 with example scoring of the hypothetical ontological link in accordance with one illustrative embodiment. As with FIG. 7 above, it should be appreciated that while these examples make reference to "calls", these are only examples and are not intended to state or imply any limitation as to the types of interactions between information concepts that may be investigated and evaluated using the mechanisms of the illustrative embodiments. For example, rather than concentrating on call logs and information about telephone calls between persons as shown in the examples of FIGS. 7 and 8, other types of communications may be similarly evaluated by the mechanisms of the illustrative embodiments, e.g., chat sessions, instant messaging, electronic mail messaging, or the like. Any type of communication correspondence that can have characteristics that may be evaluated by the mechanisms of the illustrative embodiments may be the subject of the analysis performed by the mechanisms of the illustrative embodiments. Similarly, for other types of information concepts, any type of relationship having characteristics that may be analyzed and evaluated using the mechanisms of the illustrative embodiments is intended to be within the spirit and scope of the illustrative embodiments.

As shown in FIG. 8, through analysis of the supporting evidence retrieved when answering the questions associated with the sub-links, the link scoring and analysis engine determines various scores of the sub-links. For example, a first sub-link 810 may indicate that John calls Mary or Mary calls John. Through analysis of the telephone records in the corpus, it may be determined that John calls Paul and Paul calls Mary at the same time such that there is a moderate degree of likelihood that John is in fact indirectly calling Mary. Based on various characteristics of the evidence, e.g., time, frequency, duration, etc. of these calls, the numerical score for this link may be relatively high or low. For example, if such instances of indirect calling occur frequently, at a same or similar time, and last a same or similar duration, or above a predetermined duration, then a higher score indicative of John calling Mary is generated. If the frequency, time, and duration are relatively low, e.g., this has happened only once in the supporting evidence, then the score for the link indicative of John calling Mary will be relatively lower.

A second sub-link 820 may represent a relationship between John and Mary. Supporting evidence indicative of a work relationship, e.g. working at the same location, a family relationship, e.g., Mary is married to Paul and Paul is John's brother, or other types of evidence indicative of a friend, family, co-worker, or other type of relationship may be evaluated to generate a score for this second sub-link 810. If there is little or no supporting evidence for a relationship of one of these types between John and Mary, then the score will be relatively low while if there is strong evidence of a relationship, e.g., a marriage certificate, ancestry information, birth certificate, etc., then the score will be relatively high.

A third sub-link 830 may represent co-location of John and Mary. For example, supporting evidence may be provided that John is often seen at the same location as Mary. For example, if the supporting evidence shows that John was present at Acme 706 at the same time as Mary on a number of occasions, then there is a relatively higher score that John and Mary are often co-located. However, if there is relatively little or no evidence that shows that John and Mary are present at Acme 706 at the same time, then the score for this link may be relatively low.

For purposes of the depicted example, it is assumed that through analysis of telephone records in the corpus to identify supporting evidence for answering the question "Does John call Mary?" that strong evidence is found that, at least through an indirect manner via events 712 and 714, that John does call Mary and thus, a score of 0.80 is attributed to sub-link 810. Similarly, through analysis of the corpus, e.g., employment records, birth certificates, marriage certificates, tax records, or any other source of information indicative of family, friend, co-worker, etc., relationships, it may be determined that there is a relatively low amount of evidence indicating that John and Mary have some sort of direct relationship and thus, the score for sub-link 820 is 0.20. Moreover, through analysis of the corpus, e.g., GPS data, cellular network data, and the like, it may be determined that there is a relatively moderate amount of evidence indicating that John and Mary have been present at the same location at approximately the same time and thus, the score for sub-link 830 may be 0.50.

These scores may be combined using any suitable calculation, with each other and/or with the confidence scores generated by the answering of the questions by the QA system pipeline, to generate a confidence score for the hypothetical ontological link 730 as a whole. For example, a weighted function of the confidence scores of the answers to the various questions, as well as the scores of the sub-links, may be utilized in which the weights for the various components of the calculation may be learned through training and machine learning or by way of human intervention to set the weights. For example, higher weights may be given to sub-links directed to actual relationships (family, friends, co-workers) between the persons, e.g., sub-link 820, with relatively lower weights being given to sub-links directed to co-location. Similarly, different weights may be given to the confidence scores of answers to different types of questions in the set of questions. Thus, for example, one may calculate an aggregate confidence score for the hypothetical ontological link 730 using the above scores for the sub-links 810-830 utilizing the following mathematical relationships:

$$\left(\sum_{i=0}^{n} f(k_i)\right) / j \quad (1)$$

In this relationship, n is the number of times a connection/link between information concept A and B are initiated, i is a particular link number, j is a number of link scores, and f(ki) is the link score for link i.

To further explain this relationship, assume that d is a duration of the interaction or connection/link between information concept A and information concept B, with n being the number of times the connection/link is initiated. Further assume that l is the type of interaction or connection/link, s is the simultaneous occurrence of the connection/link, t is the time of day, r is the direction of the connection/link from information concept A to information concept B (e.g., a call), and c is the direction of the connection/link from information concept B to information concept A (e.g., a callback). A duration score f(ds)=d*f(t), where f(t) is a normalizing function based on the connection/link type l and the time of day t.

Let Ti be the time of day assigned value, where Ti is designated based on ranges in the day, e.g., 7-12 a.m. (morning) value=5; 12-5 p.m. (afternoon) value=6; 5-9 p.m. (evening) value=8; 9 p.m.-12 a.m. (night) value=12; 12 a.m.-7 a.m. (early morning) value=15. Let f(lt) be a factor based on the link type l for time of day t. This is pulled from a mapping table. For example, for a link type l=Telephone call, the following f(lt) factors may be utilized:
f(lt)=0.25 where t is morning
f(lt)=0.40 where t is afternoon
f(lt)=1.20 where t is evening
f(lt)=1.7 where t is night
f(lt)=2.0 where t is early morning The normalizing function f(t) may be set equal to the value of Ti*f(lt). In this example, the direction of interaction score f(i)=sum of r (0.25 load factor)+Sum of c (1.25 load factor when callback).

Using these relations, a link score may be determined as the sum of the number of connections/links, normalized by the time of day per link type, plus the sum of the duration score and the sum of the simultaneous occurrence score, normalized by the link type factor, plus the number of connections/links per direction normalized by the link type factor, plus the direction interaction score:

Link Score f(k)=(Sum of n)/f(t)+[f(ds)+Sum of s]/f(lt)+Sum of r/[2*f(lt)]+f(i), also written as equation (2) below:

$$(\Sigma n)/f(t)+[f(ds)+\Sigma s]/f(lt)+(\Sigma r)/2*f(lt))+f(i) \quad (2)$$

Now, letting j be the number of link scores and f(k) be each link score, aggregating the link scores, e.g., (\sum f(k))/j, one obtains the aggregate of the links as noted above in equation (1).

In addition, the aggregate confidence score associated with the hypothetical ontological link may take into consideration factors of source grading, corroboration, and certainty in the evidence supporting the sub-links and hypothetical ontological links as discussed above. Thus, the scoring of particular sub-links 810-830 may be modified based on the veracity of the sources of the evidence supporting/refuting these sub-links 810-830, the intrinsic certainty of the evidence supporting/refuting these sub-links 810-830, and the corroboration of the facts/conclusions specified in the evidence by other evidence. Based on the source grading and corroboration of information, a follow up question may be generated to gather more information on the sub-links due to the source. An unreliable source Z may trigger a different line of questioning where the source will be guaranteed to be different from source Z. For example, a parking ticket violation correspondence for person A provides evidence that person A visited a location X, however that source is unreliable as someone else may drive the car. This will trigger a different line of questioning of person A performing an activity of a type of link that will be more reliable. For example, a question directed to whether person A patronizes the location X within the same timeframe, looking for evidence of credit card payments at the location X, or the like. Further, person A may have made a call from location X and thus, questions directed to whether person A was involved in a call while at location X may be identified and used to find evidence to further confirm they used their personal phone at location X. Other related lines of questioning may further be identified for obtaining evidence that tends to support or refute the hypothetical ontological link without departing from the spirit and scope of the illustrative embodiments.

Figure 9:
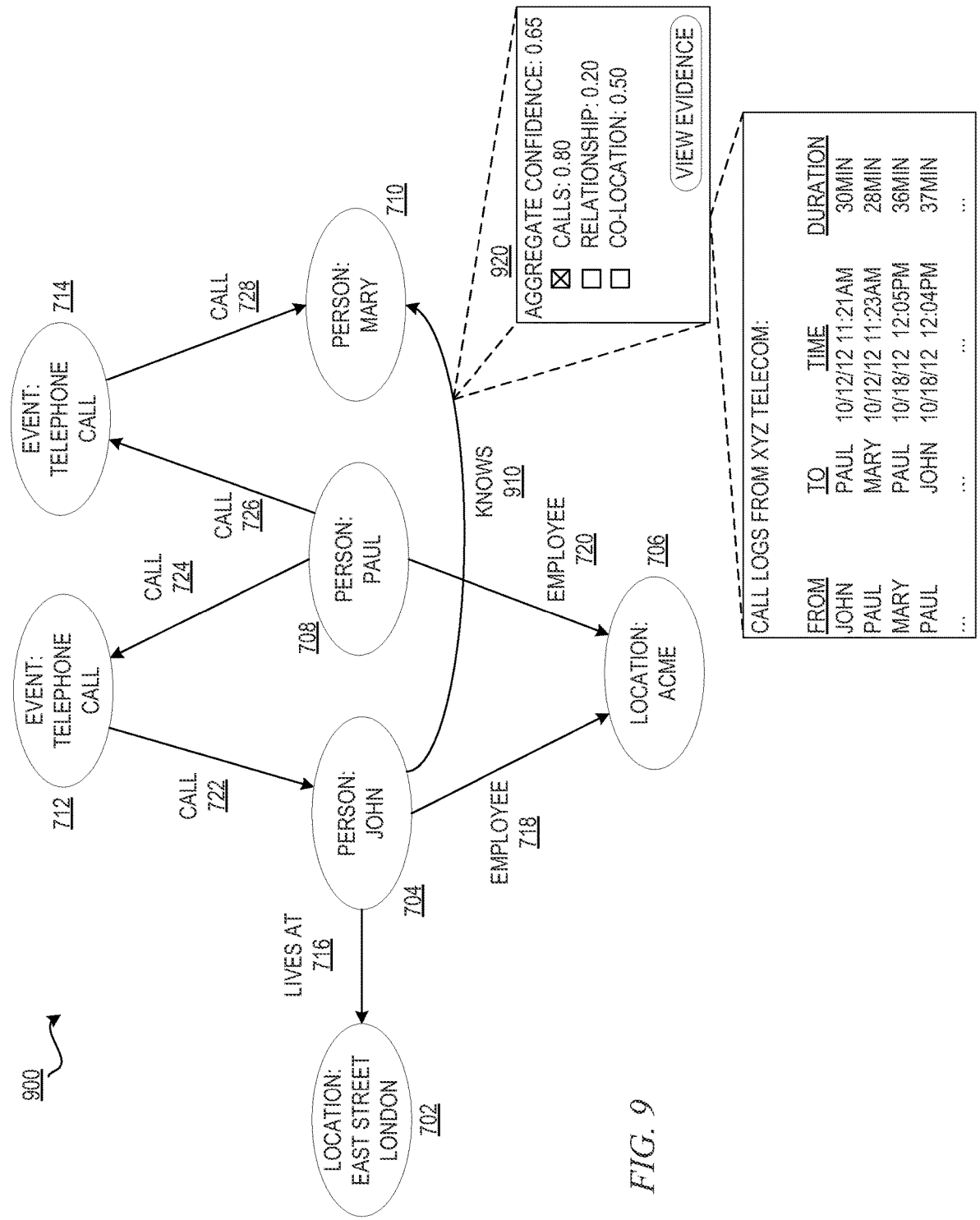
FIG. 9 is an example diagram illustrating a graphical output of a modified ontology generated in response to the scoring of the hypothetical ontological link in accordance with one illustrative embodiment.

FIG. 9 is an example diagram illustrating a graphical output of a modified ontology generated in response to the scoring of the hypothetical ontological link in accordance with one illustrative embodiment. As shown in FIG. 9, due to a comparison of the aggregate confidence score for the hypothetical ontological link 730 to a pre-determined threshold indicative of a minimum confidence score (e.g., 0.6) for inclusion of the hypothetical ontological link 730 as an actual link in the ontology 700, the hypothetical ontological link 730 is converted to an actual link 910 in the modified or updated ontology 900. The resulting ontology 900 may be presented to a user via a graphical user interface or other output indicating the ontology 900 and providing a user interface through which a user may view the supporting evidence and features of the various links between information concept objects in the ontology 900. Thus, for example, a user may select the newly added link 910 and be presented with information 920 indicating the aggregate confidence score for the link 910, the component scores that were used to generate the aggregate confidence score, as well as user interface elements for viewing the supporting evidence 930 or at least statistics regarding the supporting evidence 930 giving rise to the various components of the aggregate confidence score. In the depicted example, the user selects the "calls" sub-link, e.g., by selecting the GUI box next to the sub-link, and selects the "View Evidence" GUI button to view the supporting evidence 930 that shows a listing of calls and their attributes, e.g., time of day, duration, direction of call, etc., that provide supporting evidence for the scoring of the sub-link "calls". It should be appreciated that various and multiple levels of drilling down into the data used as a basis for generating the new link 910 may be provided.

As mentioned above, a hypothetical ontological link may be comprised of a plurality of sub-links of various types. In addition the evidence supporting these various types of sub-links and hypothetical ontological links may provide additional evidence for categorizing the links into one of a plurality of different categories for the particular type of link. Taking the "relationship" sub-link 820 discussed above, the result of the evaluation of this sub-link 820 may indicate that there is a relationship between John and Mary, for example. However, in addition to simply determining that there is a relationship, the type of relationship may also be determined and used to categorize the sub-link 820. For example, the relationships may be of various categories such as "co-worker", "family", or "friend" and various types of evidence may be used to evaluate the likelihood that the relationship is one of these various categories. The category may then be associated with the sub-link 820 and the hypothetical ontological link 730 such that the category may be presented to the user along with the ontology, such as when the user drills down into the characteristics of the link 910 to see the underlying supporting evidence, confidence scores, and the like. For example, the user may click on the link 910 and be presented with information about sub-links 810-830. Amongst this sub-link information may be the categories associated with these sub-links, e.g., relationship link 820 is a family relationship between John and Mary due to supporting evidence including a marriage certificate between Mary and Paul and ancestry information indicating that Paul is the brother of John.

It should be noted that various types of circumstantial evidence may be evaluated to determine a category of a link or sub-link. The evaluation of the combination of this circumstantial evidence may give rise to a final determination as to the category from amongst a plurality of possible categories.

Figure 10:
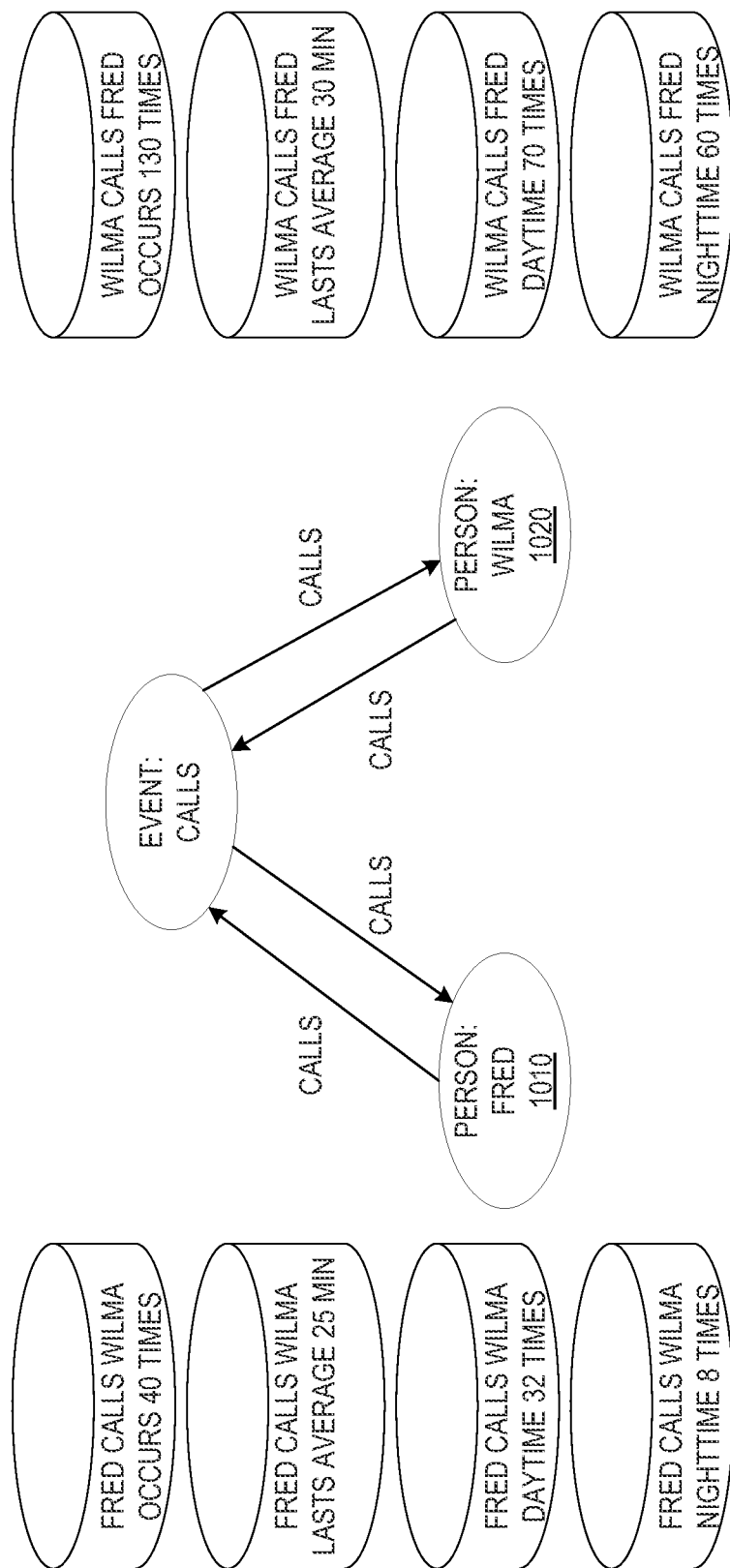
FIG. 10 is an example diagram illustrating an example scenario for evaluating various characteristics of links for categorizing a link hypothetical ontological link between information concept entities.

FIG. 10 is an example diagram illustrating an example scenario for evaluating various characteristics of links for categorizing a link hypothetical ontological link between information concept entities. As shown in FIG. 10, through analysis of a corpus of evidence information when investigating a hypothetical ontological link between Fred and Wilma, it may be determined that there are 40 instances in the corpus of evidential information where Fred 1010 calls Wilma 1020 and 130 instances of Wilma 1020 calling Fred 1010. In addition, the evidence may indicate that the average duration of calls from Fred 1010 to Wilma 1020 is approximately 25 minutes. Similarly, the average duration of calls from Wilma 1020 to Fred 1010 30 minutes. Moreover, it may be determined through analysis of the evidence in the corpus that Fred 1010 calls Wilma 1020 during the day 32 times but calls Wilma 1020 during the nighttime only 8 times. Furthermore, it may be determined that Wilma 1020 calls Fred 1010 during night time hours 60 times and during daytime hours 70 times.

The evidence may be scored to determine a likelihood that the relationship between Fred and Wilma is either a family relationship, co-worker relationship, or a friend (acquaintance) relationship, i.e. the evidence may be scored to determine a category of the hypothetical ontological link between Fred and Wilma. The scoring may look at the pattern of evidence to evaluate the nature of the evidence. For example, since it appears that Wilma calls Fred approximately the same amount of times during day and nighttime hours, Fred calls Wilma mostly during the day, that there is relatively frequent calls between Fred and Wilma, and that the calls last approximately the same amount of time going either direction, that more likely the relationship between Fred and Wilma is one of a friend or acquaintance. If the occurrence of calls from Wilma to Fred mostly happened during the daytime hours it may be more indicative of a family relationship. Other types of patterns may be evaluated to identify other types of categories of relationships between persons. For example, in some illustrative embodiments, call patterns at a fixed scheduled time, day and duration may be determined to indicate a professional relationship type, including evaluations as to whether the call patterns are present during the day time, or day time of at least one of the participant's time zones. A frequent sporadic, lengthy duration for a call is likely indicative of a personal relationship type, especially if some of those calls is outside the normal work hours for the information concepts. Short or long very infrequent calls or communications during normal hours and weekends may be indicative of acquaintances, where "infrequent" may be once every two to three weeks or a month depending on the information concepts involved. Essentially, any definable pattern that may be identified in the evidence may be correlated with a particular category of link between information concepts. The resulting category identification may then be associated with the corresponding link or sub-link and returned with results when evaluating the hypothetical ontological link.

Thus, the mechanisms of the illustrative embodiments provide facilities for identifying hypothetical ontological links, evaluating these hypothetical ontological links with regard to evidence provided within one or more corpora, and modifying an ontology based on the evaluation of the hypothetical ontological links. In addition, notifications of the results of such evaluations may be presented to a user so that the user is informed of newly discovered relationships between information concepts within an ontology for use in determining areas of further investigation.

The mechanisms of the illustrative embodiments may be implemented in many different domains. In some illustrative embodiments, the mechanisms of the illustrative embodiments are implemented in the domain of intelligence gathering and crime investigation. For example, law enforcement personnel may utilize the mechanisms of the illustrative embodiments to input an ontology representing one or more events, locations, suspects, witnesses, known associates of suspects and witnesses, weapons used during the crime, tools used during the crime, or any other information concept that represents information about the crime under investigation. The resulting ontology may then be used as a source of input to the mechanisms of the illustrative embodiments for the law enforcement personnel to investigate various theories or scenarios regarding the crime to thereby identify hypothetical ontological links between the information concepts in the ontology, e.g., suspect A committed the robbery of Al's Electronics. From the theory or scenario, various possible sub-links of the hypothetical ontological link of suspect A committing the robbery of Al's Electronics, may be identified and used as a basis for selecting sets of questions to be submitted to the QA system pipelines for evaluation. Moreover, characteristics of the information concept objects themselves may be utilized, e.g., questions regarding the robbery of an electronics store may have different templates than questions regarding the cyber-robbery of a bank since physical assets are generally the target in the former and electronic assets are the target in the latter.

The questions may be evaluated based on a large corpus or set of corpora representing various sources of information useful for criminal investigations. This is a wide range of possible information sources including criminal records, residency information, location information, communication information, bank records, vehicle registration and location information, or any other source of information that a criminal investigator may generally look to for gathering information about persons, locations, or events associated with a crime. Based on evaluation of the questions using the evidence information obtained from the one or more corpora, various links between information concepts, e.g., suspects, witnesses, locations, events, etc., may be identified and scored. These links may then be evaluated to determine an aggregate score for the hypothetical ontological link that suspect A committed the robbery of Al's Electronics. The result of this evaluation may be notified to the criminal investigator along with a graphical user interface representing the ontology that allows the criminal investigator to drill down into the supporting evidence and scores associated with the links, sub-links, and the like. Moreover, the categorization of the links may also be viewed. Thus, for example, it may not have been previously known that suspect A is related to witness B and thus, now that it is known through evaluation by the mechanisms of the illustrative embodiments, the statements made by witness B may be brought into question as to their veracity.

Other uses and implementations of the mechanisms of the illustrative embodiments will become apparent to those of ordinary skill in the art in view of the present description. Any implementation of the mechanisms of the illustrative embodiments to identify and evaluate a hypothetical ontological link in a given ontology is intended to be within the spirit and scope of the present invention.

Figure 11:
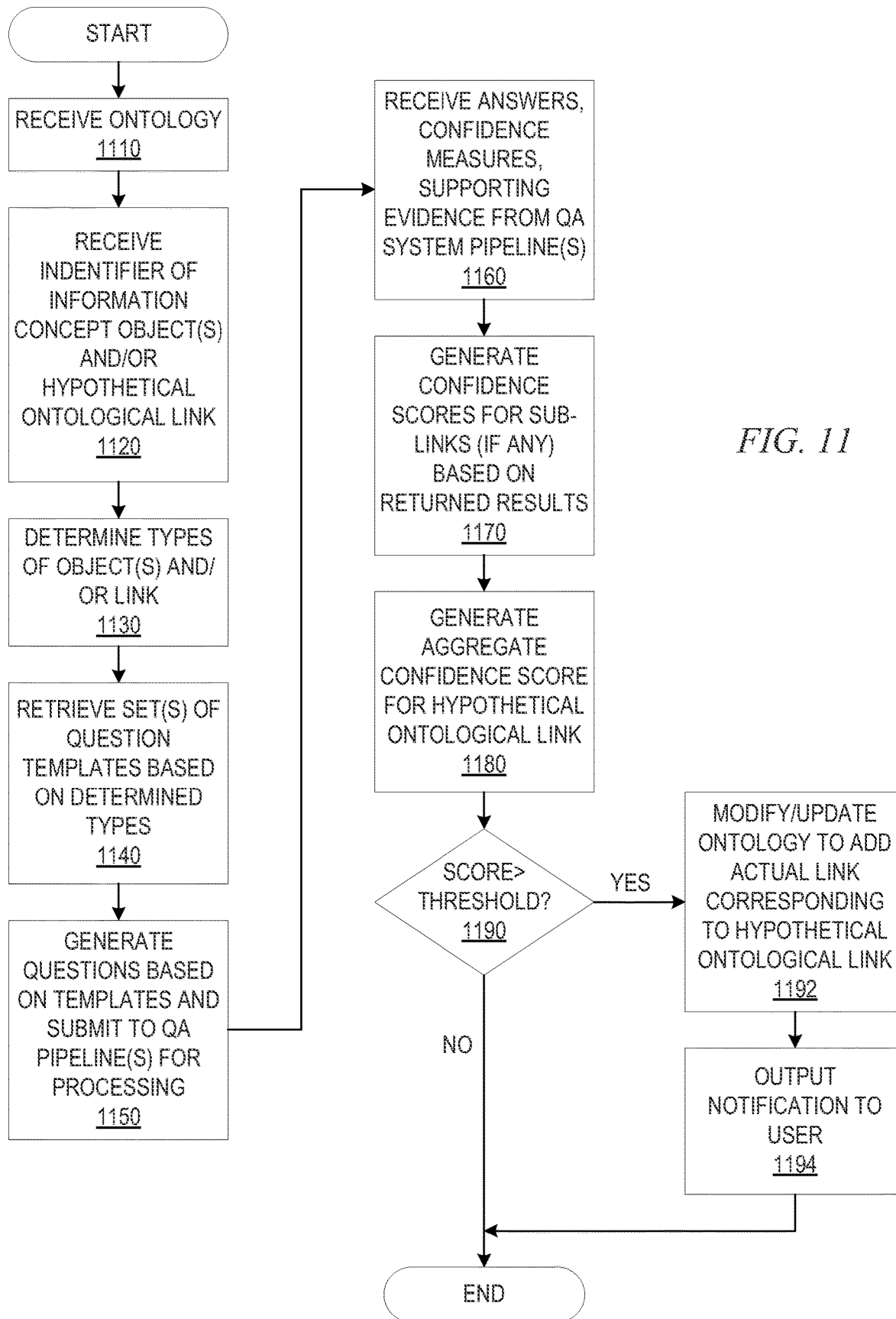
FIG. 11 is a flowchart outlining an example operation for identifying and evaluating hypothetical ontological links in an ontology in accordance with one illustrative embodiment.

FIG. 11 is a flowchart outlining an example operation for identifying and evaluating hypothetical ontological links in an ontology in accordance with one illustrative embodiment. As shown in FIG. 11, the operation starts with the receipt of an ontology (step 1110). The ontology may be built using any suitable data input mechanism for defining information concept objects and their associations (or links). For example, a graphical user interface may be provided that provides one or more interfaces through which a user may define various types of information concept objects, e.g., persons, places, things, events, etc., and various types of linkages between information concept objects.

An indication of at least one of an information concept object and a type of hypothetical ontological link to be investigated is received (step 1120). This indication may be received via user input or through an automated mechanism that analyzes the ontology and identifies possible hypothetical ontological links for further evaluation. For example, in one illustrative embodiment, the user may be presented with a graphical representation of the ontology and may select one or more information concept objects from the graphical representation of the ontology for use in evaluating hypothetical ontological links associated with the selected one or more information concept objects. Moreover, the user may select, such as from a menu of options, the type of hypothetical ontological link associated with the one or more information concept objects that the user wishes to further investigate or evaluate. Alternatively, an automated mechanism may determine these inputs through analysis and determination of probabilities of linkages between information concept objects based on the actual linkages present in the ontology, e.g., if person A has a link to person B and person B has a link to person C, then there is a probability that person A is also linked to person C in some way.

The types of the identified information concept object(s) and hypothetical ontological link are determined (step 1130) and one or more sets of question templates are retrieved from the question template database or repository based on the determined types (step 1140). It should be noted that in retrieving the one or more sets of question templates, the hypothetical ontological link may be correlated to one or more sub-links having their own identifiable types and a separate set of question templates may be retrieved for each of the sub-links. Thus, for example, if the hypothetical ontological link is of the type "knows", then sub-links of "calls", "visits," "knows", "is related to", and the like may be identified and corresponding sets of question templates retrieved.

The fields of the question templates are populated with information from the ontology to generate instances of the question templates which are then submitted to appropriately trained QA system pipelines for answer generation, confidence measure calculation, and supporting evidence retrieval (step 1150). The resulting answers to the questions, their confidence measures, and supporting evidence are received (step 1160) and evaluated to generate scores for each of the sub-links (if any) of the hypothetical ontological link (step 1170). An aggregate confidence score for the hypothetical ontological link is then calculated based on the scores for each of the sub-links (if any) (step 1180). The aggregate confidence score is compared to a predetermined threshold to determine if modification of the ontology is warranted (step 1190) and if so, then the ontology is modified or updated to reflect that the hypothetical ontological link is an actual link within the ontology (step 1192) and appropriate notification and user interface output is generated for the user to interact with a representation of the modified ontology to obtain additional information regarding the hypothetical ontological link and its place within the ontology (step 1194). The operation then terminates.

Figure 12:
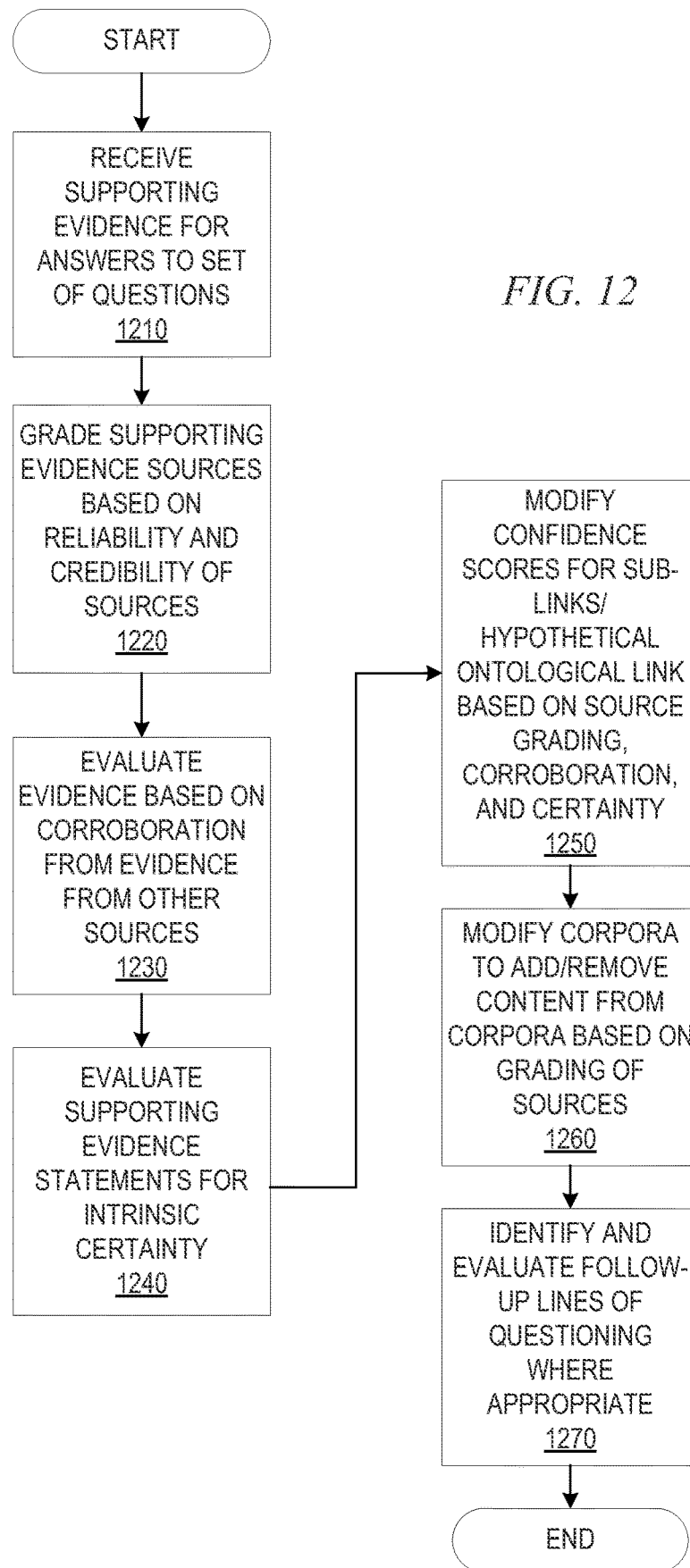
FIG. 12 is a flowchart outlining an example operation for scoring links based on source grading, corroboration, and certainty in accordance with one illustrative embodiment.

FIG. 12 is a flowchart outlining an example operation for scoring supporting evidence for a link in accordance with one illustrative embodiment. The operation outlined in FIG. 12 may be implemented, for example, by the link scoring and analyzer engine 440 in FIG. 4, for example. As shown in FIG. 12, the operation starts with receiving supporting evidence for answers to a set of questions for a evaluating a hypothetical ontological link (step 1210). The sources of the supporting evidence are graded based on a determination of their reliability and credibility (step 1220). The supporting evidence is further evaluated to determine if there is other supporting evidence of other sources that corroborate the evidence (step 1230). The supporting evidence is further evaluated to identify intrinsic statements of certainty, or lack thereof (step 1240). The confidence scores for the sub-links and/or hypothetical ontological link are modified according to the results of evaluating the source grading, the corroboration of the evidence, and the intrinsic certainty of the evidence (step 1250). The corpora may then be modified to add or remove content based on the grading of the sources (step 1260) and follow-up lines of questioning are identified and evaluated where appropriate (step 1270). The operation then terminates.

Figure 13:
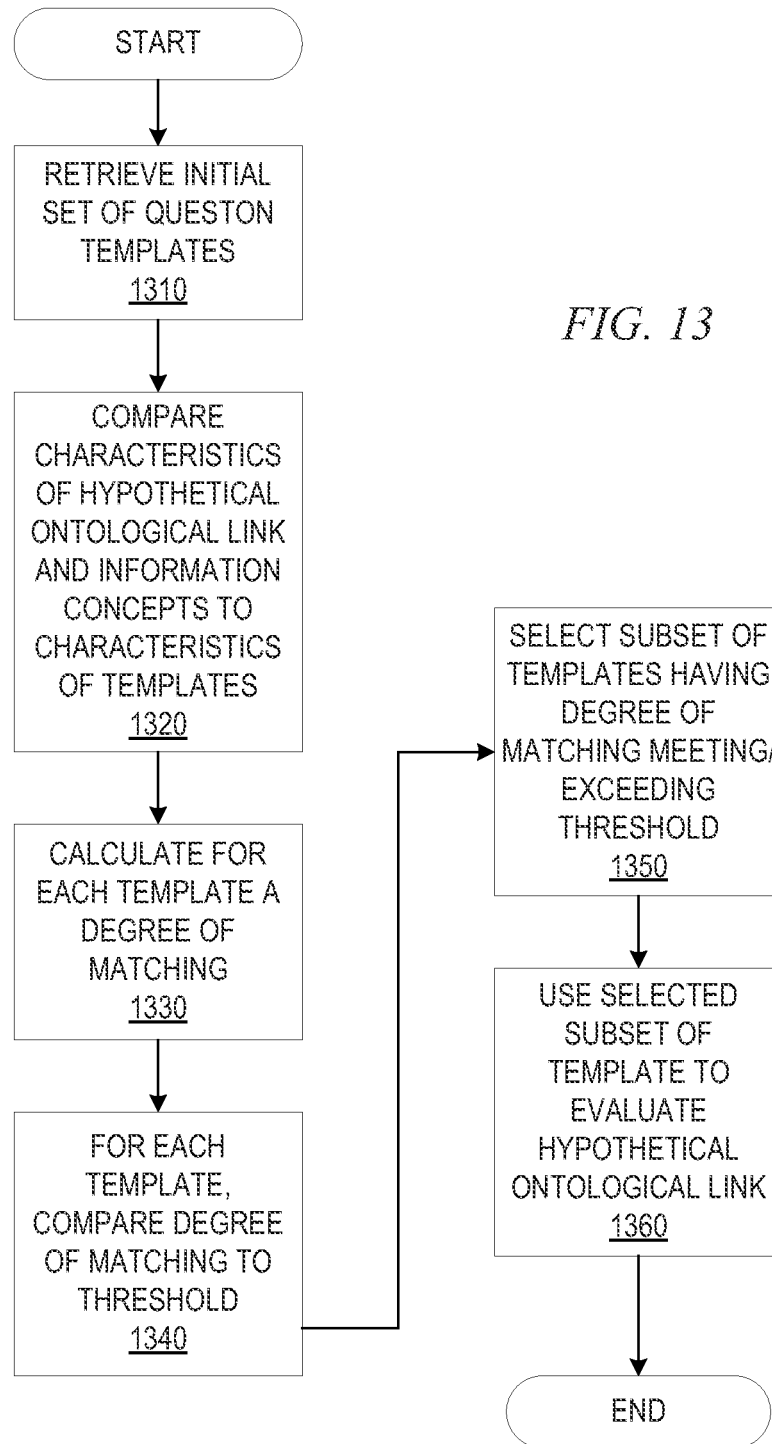
FIG. 13 is a flowchart outlining an example operation for performing question template set pruning in accordance with one illustrative embodiment.

FIG. 13 is a flowchart outlining an example operation for performing question template set pruning in accordance with one illustrative embodiment. As shown in FIG. 13, the operation starts with the retrieval of an initial set of question templates for the hypothetical ontological link based on an evaluation of the link type and information concept types (step 1310). Characteristics of the hypothetical ontological link and information concept objects are compared to the characteristics associated with the templates in the initial set of question templates (step 1320). For each question template in the set of question templates, a degree of matching is calculated for specifying how closely the characteristics of the hypothetical ontological link and information concept objects match the characteristics of the question template (step 1330). Then, for each question template, the degree of matching is compared to a selection threshold value to determine if the degree of matching meets or exceeds the selection threshold value (step 1340).

Those question templates whose degree of matching value meets or exceeds the selection threshold value are included in a selected subset of question templates (step 1350). The selected subset of question templates are then populated with information from the hypothetical ontological link and information concept objects to generate actual questions that are evaluated to evaluate the hypothetical ontological link (step 1360). The operation then terminates.

Figure 14:
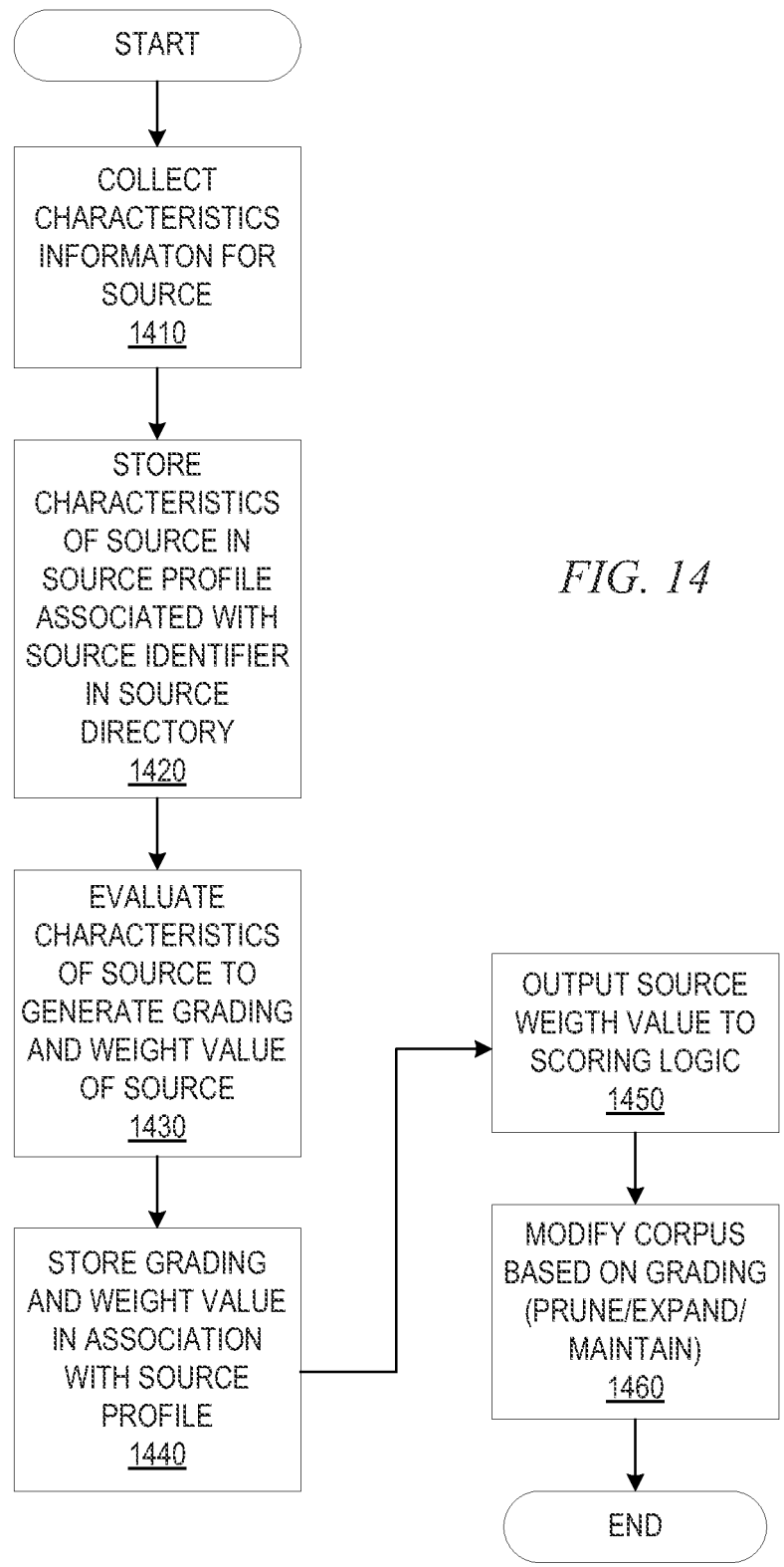
FIG. 14 is a flowchart outlining an example operation for performing source grading in accordance with one illustrative embodiment.

FIG. 14 is a flowchart outlining an example operation for performing source grading in accordance with one illustrative embodiment. As shown in FIG. 14, the operation starts by collecting characteristics information for a source (step 1410). The characteristics of the source are stored in a source profile of a source directory in association with a source identifier (step 1420). The characteristics of the source are evaluated to generate a grading and weight value associated with the source (step 1430). The grading and weight values are stored in association with the source profile (step 1440). The source weight value is output to the scoring logic for use in modifying scores associated with evidence from the source (step 1450). The grading of the source is used to modify a corpus of evidence by either expanding, reducing, or maintaining an amount of evidence from the source that is part of the corpus of evidence (step 1460). The operation then terminates.

Figure 15:
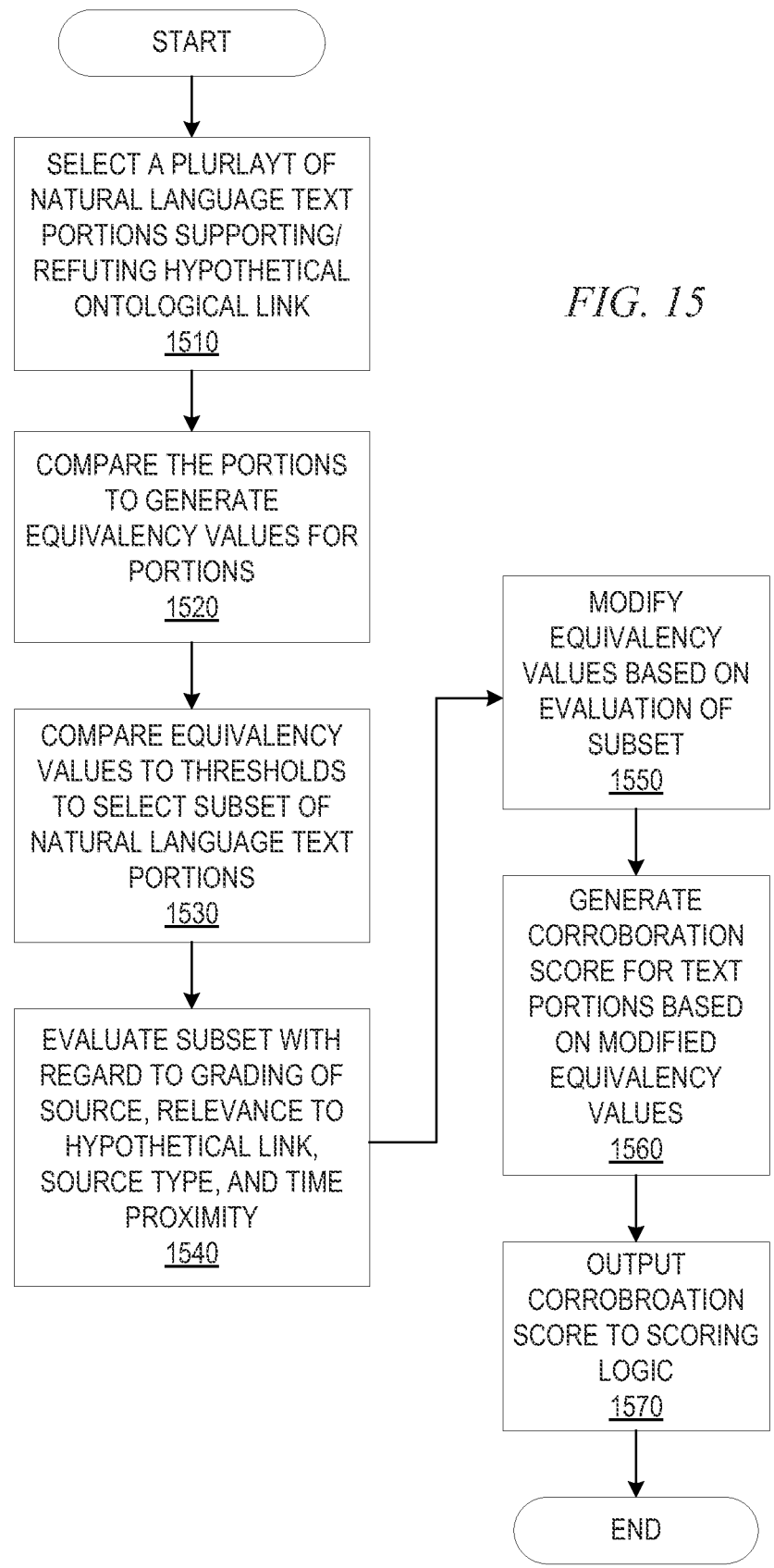
FIG. 15 is a flowchart outlining an example operation for performing corroboration scoring in accordance with one illustrative embodiment.

FIG. 15 is a flowchart outlining an example operation for performing corroboration scoring in accordance with one illustrative embodiment. As shown in FIG. 15, the operation starts by selecting a plurality of natural language evidential text portions that support/refute a hypothetical ontological link (step 1510). The evidential text portions are compared to generate equivalency values for each evidential text portion indicative of a level of equivalency between the evidential text portions with regard to the facts/conclusions specified in the evidential text portions (step 1520). The equivalency values are compared to first and second thresholds to select a subset of natural language evidential text portions whose equivalency values meet or exceed a first threshold indicative of corroboration of the evidence but do not exceed a second threshold indicative of a copying of evidence (step 1530).

The subset of natural language evidential text portions are further evaluated with regard to source grading, relevance of the evidential text portions to the hypothetical ontological link, source type, and time proximity (step 1540). The equivalency values associated with the natural language text portions in the subset are modified based on the evaluation in step 1540 to generate modified equivalency values (step 1550). A corroboration score is calculated for each evidential text portion based on the modified equivalency value corresponding to the evidential text portion (step 1560). The corroboration scores for the evidential text portions are output for use in generating answer results for questions in the set of questions used to evaluate the hypothetical ontological link (step 1570). The operation then terminates.

Figure 16:
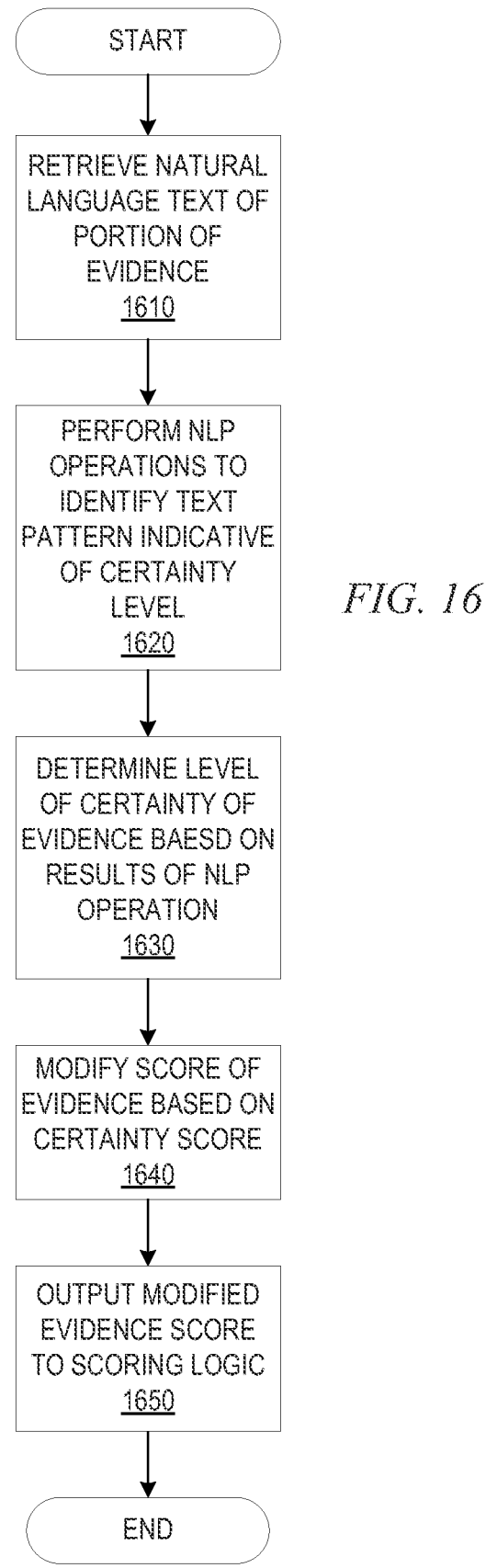
FIG. 16 is a flowchart outlining an example operation for performing certainty scoring in accordance with one illustrative embodiment.

FIG. 16 is a flowchart outlining an example operation for performing certainty scoring in accordance with one illustrative embodiment. As shown in FIG. 16, the operation starts with receiving a portion of natural language evidential text (step 1610). Natural language processing (NLP) operations are performed on the text to identify text patterns within the text indicative of a level of certainty (step 1620). A level of certainty for the evidential text portion is determined based on results of the NLP operations (step 1630). The score associated with the evidential text portion is modified based on the level of certainty of the evidential text portion to generate a modified score for the evidential text portion (step 1640). The modified score for the evidential text portion is output to the scoring logic for use in evaluating answers to questions in the set of questions used to evaluate the hypothetical ontological link (step 1650). The operation then terminates.

Figure 17:
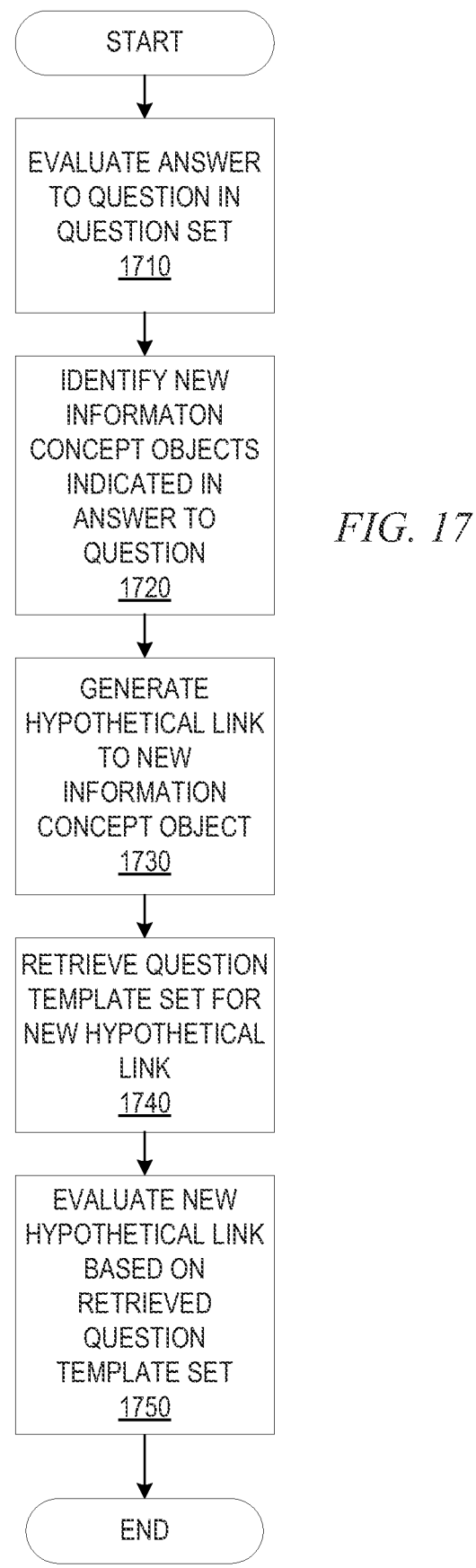
FIG. 17 is a flowchart outlining an example operation for performing additional lines of questioning evaluations in accordance with one illustrative embodiment.

FIG. 17 is a flowchart outlining an example operation for performing additional lines of questioning evaluations in accordance with one illustrative embodiment. As shown in FIG. 17, the operation starts by evaluating an answer to a question in a set of questions used to evaluate the hypothetical ontological link (step 1710). A new information concept object indicated in the answer to the question is identified (step 1720). A new hypothetical ontological link for the new information concept object is generated (step 1730). A set of question templates corresponding to the new hypothetical ontological link is retrieved (step 1740) and used to evaluate the new hypothetical ontological link in a similar manner as previously described above (step 1750). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for evaluating an evidential statement in a corpus of evidence, the method comprising:
   automatically generating, by a hypothetical link identification engine of the data processing system, a hypothetical ontological link data structure representing a hypothetical ontological link between at least two entities of an ontology data structure at least by automatically analyzing the ontology data structure to identify potential ontological relationships between entities that do not have existing links to each other in the ontology data structure, and automatically generating the hypothetical ontological link data structure, defining a data representation of a potential relationship between at least two entities in the ontology data structure that do not have existing links to each other, based on results of the analysis;
   automatically generating, by a hypothetical link evaluation pipeline, a first evidential statement data structure specifying a first evidential statement for which corroboration is sought at least by automatically processing, via a question answering computer system pipeline, a question corresponding to the hypothetical ontological link data structure, wherein the question is automatically processed by the question answering computer system pipeline at least by parsing the question to decompose the question into one or more database queries, and applying the one or more database queries to one or more computer databases storing one or more corpora of evidence data, wherein the first evidential statement is associated with an answer to the question automatically generated by the question answering computer system pipeline based on a processing of results returned by the application of the one or more database queries to the one or more computer databases, and is an evidential statement for supporting or refuting the hypothetical ontological link represented by the hypothetical ontological link data structure;
   automatically processing, by a link scoring and analyzer engine of the data processing system, a corpus of evidence data to determine a measure of corroboration of the first evidential statement by other evidence data in the corpus of evidence data at least by performing computerized natural language processing of the first evidential statement and the other evidence data in the corpus of evidence data and comparing one or more natural language processing extracted first characteristics of natural language content of the first evidential statement to one or more natural language processing extracted second characteristics of natural language content of the evidence data in the corpus of evidence data to calculate a corroboration value indicating an equivalency of facts or conclusions specified in the evidence data and the first evidential statement, wherein the measure of corroboration is determined based on the corroboration value;
   generating, by the link scoring and analyzer engine of the data processing system, an indication of trustworthiness of the first evidential statement based on the measure of corroboration of the first evidential statement by the other evidence data in the corpus of evidence data; and
   generating, by an ontology modification engine, a modified ontology data structure, at least by adding the hypothetical ontological link to the ontology data structure as an actual ontological link to generate the modified ontology data structure, in response to the indication of the trustworthiness of the first evidential statement indicating the first evidential statement to be trustworthy.

2. The method of claim 1, wherein processing the corpus of evidence data comprises:
   analyzing the first evidential statement data structure at least by executing the computerized natural language processing on the first evidential statement data structure to extract, from the natural language content of the first evidential statement data structure, the one or more natural language processing extracted first characteristics of the first evidential statement;
   selecting a second evidential statement data structure, representing a second evidential statement, from the corpus of evidence data;
   analyzing the second evidential statement data structure at least by executing the computerized natural language processing on the first evidential statement to extract, from the natural language content of the second evidential statement data structure, the one or more natural language processing extracted second characteristics of the second evidential statement;
   comparing the one or more natural language processing extracted first characteristics with the one or more natural language processing extracted second characteristics to determine a degree of matching of the one or more natural language processing extracted first characteristics with the one or more natural language processing extracted second characteristics; and
   generating the corroboration value based on the degree of matching.

3. The method of claim 2, wherein the one or more first characteristics comprises at least one of a sentence structure of the first evidential statement, a lexical answer type of the first evidential statement, a focus of the first evidential statement, a conclusion of the first evidential statement, or a time proximity of the first evidential statement.

4. The method of claim 2, wherein generating the corroboration value further comprises:

determining if the corroboration value associated with the comparison of the one or more first characteristics of the first evidential statement and the one or more second characteristics of the second evidential statement is equal to or exceeds a predetermined threshold corroboration value; and in response to the corroboration value equaling or exceeding the predetermined threshold corroboration value, performing further analysis of the first evidential statement and second evidential statement to generate a modified corroboration value.

5. The method of claim 4, wherein performing further analysis of the first evidential statement and second evidential statement to generate the modified corroboration value comprises at least one of:

grading a first source of the first evidential statement and grading a second source of the second evidential statement;

determining a relevance of the first evidential statement and second evidential statement to the hypothetical ontological link of the hypothetical ontological link data structure;

evaluating a source type of the first source and a source type of the second source;

or evaluating a time proximity of the first evidential statement with the second evidential statement.

6. The method of claim 2, wherein generating the indication of trustworthiness of the first evidential statement further comprises evaluating a first source of the first evidential statement and a second source of the second evidential statement based on at least one of an occupation of a first person that is the first source and an occupation of a second person that is the second source, or a reputation of the first person and reputation of the second person.

7. The method of claim 2, wherein generating the indication of trustworthiness of the first evidential statement further comprises evaluating a relevance of the first evidential statement and second evidential statement to the hypothetical ontological link of the hypothetical ontological link data structure, and wherein the relevance is evaluated according to direct relationships, ownership characteristics, and containment characteristics within the first evidential statement and second evidential statement.

8. The method of claim 2, wherein processing the corpus of evidence data comprises:

comparing the degree of matching to a first threshold to determine if the degree of matching indicates corroboration of the first evidential statement by the second evidential statement; and comparing the degree of matching to a second threshold to determine if the degree of matching indicates a copying of at least a portion of the first evidential statement by the second evidential statement or a portion of the second evidential statement by the first evidential statement.

9. The method of claim 8, further comprising, in response to the degree of matching being equal to or greater than the second threshold, reducing a value of the indication of trustworthiness of the first evidential statement.

10. A computer program product comprising a non-transitory computer readable medium having a computer readable program stored therein, wherein the computer readable program, when executed on a data processing system, causes the data processing system to:

automatically generate, by a hypothetical link identification engine of the data processing system, a hypothetical ontological link between at least two entities of an ontology data structure at least by automatically analyzing the ontology data structure to identify potential ontological relationships between entities that do not have existing links to each other in the ontology data structure, and automatically generating the hypothetical ontological link data structure, defining a data representation of a potential relationship between at least two entities in the ontology data structure that do not have existing links to each other, based on results of the analysis;

automatically generate, by a hypothetical link evaluation pipeline, a first evidential statement for which corroboration is sought at least by automatically processing, via a question answering computer system pipeline, a question corresponding to the hypothetical ontological link data structure, wherein the question is automatically processed by the question answering computer system pipeline at least by parsing the question to decompose the question into one or more database queries, and applying the one or more database queries to one or more computer databases storing one or more corpora of evidence data, wherein the first evidential statement is associated with an answer to the question automatically generated by the question answering computer system pipeline based on a processing of results returned by the application of the one or more database queries to the one or more computer databases, and is an evidential statement for supporting or refuting the hypothetical ontological link;

automatically process, by a link scoring and analyzer engine, a corpus of evidence data to determine a measure of corroboration of the first evidential statement by other evidence data in the corpus of evidence data at least by performing computerized natural language processing of the first evidential statement and the other evidence data in the corpus of evidence data and comparing one or more natural language processing extracted first characteristics of natural language content of the first evidential statement to one or more natural language processing extracted second characteristics of natural language content of the evidence data in the corpus of evidence data to calculate a corroboration value indicating an equivalency of facts or conclusions specified in the evidence data and the first evidential statement, wherein the measure of corroboration is determined based on the corroboration value;

generate, by the link scoring and analyzer engine, an indication of trustworthiness of the first evidential statement based on the measure of corroboration of the first evidential statement by the other evidence data in the corpus of evidence data; and generate, by an ontology modification engine, a modified ontology data structure, at least by adding the hypothetical ontological link to the ontology data structure as an actual ontological link to generate the modified ontology data structure, in response to the indication of the trustworthiness of the first evidential statement indicating the first evidential statement to be trustworthy.

11. The computer program product of claim 10, wherein the computer readable program further causes the processor to process the corpus of evidence data at least by:

analyzing the first evidential statement data structure at least by executing the computerized natural language processing on the first evidential statement data structure to extract, from the natural language content of the first evidential statement data structure, the one or more natural language processing extracted first characteristics of the first evidential statement;

selecting a second evidential statement data structure, representing a second evidential statement, from the corpus of evidence data;

analyzing the second evidential statement data structure at least by executing the computerized natural language processing on the first evidential statement to extract, from the natural language content of the second evidential statement data structure, the one or more natural language processing extracted second characteristics of the second evidential statement;

comparing the one or more natural language processing extracted first characteristics with the one or more natural language processing extracted second characteristics to determine a degree of matching of the one or more natural language processing extracted first characteristics with the one or more natural language processing extracted second characteristics; and generating the corroboration value based on the degree of matching.

12. The computer program product of claim 11, wherein the one or more first characteristics comprises at least one of a sentence structure of the first evidential statement, a lexical answer type of the first evidential statement, a focus of the first evidential statement, a conclusion of the first evidential statement, or a time proximity of the first evidential statement.

13. The computer program product of claim 11, wherein the computer readable program further causes the processor to generate the corroboration value at least by:

determining if the corroboration value associated with the comparison of the one or more first characteristics of the first evidential statement and the one or more second characteristics of the second evidential statement is equal to or exceeds a predetermined threshold corroboration value; and in response to the corroboration value equaling or exceeding the predetermined threshold corroboration value, performing further analysis of the first evidential statement and second evidential statement to generate a modified corroboration value.

14. The computer program product of claim 13, wherein the computer readable program further causes the processor to perform further analysis of the first evidential statement and second evidential statement to generate the modified corroboration value at least by at least one of:

grading a first source of the first evidential statement and grading a second source of the second evidential statement;

determining a relevance of the first evidential statement and second evidential statement to the hypothetical ontological link of the hypothetical ontological link data structure;

evaluating a source type of the first source and a source type of the second source;

or evaluating a time proximity of the first evidential statement with the second evidential statement.

15. The computer program product of claim 11, wherein the computer readable program further causes the processor to generate the indication of trustworthiness of the first evidential statement at least by evaluating a first source of the first evidential statement and a second source of the second evidential statement based on at least one of an occupation of a first person that is the first source and an occupation of a second person that is the second source, or a reputation of the first person and reputation of the second person.

16. The computer program product of claim 11, wherein the computer readable program further causes the processor to generate the indication of trustworthiness of the first evidential statement at least by evaluating a relevance of the first evidential statement and second evidential statement to the hypothetical ontological link of the hypothetical ontological link data structure, and wherein the relevance is evaluated according to direct relationships, ownership characteristics, and containment characteristics within the first evidential statement and second evidential statement.

17. The computer program product of claim 11, wherein the computer readable program further causes the processor to process the corpus of evidence data at least by:

comparing the degree of matching to a first threshold to determine if the degree of matching indicates corroboration of the first evidential statement by the second evidential statement; and comparing the degree of matching to a second threshold to determine if the degree of matching indicates a copying of at least a portion of the first evidential statement by the second evidential statement or a portion of the second evidential statement by the first evidential statement, wherein, in response to the degree of matching being equal to or greater than the second threshold, the indication of trustworthiness of the first evidential statement is reduced.

18. An apparatus comprising:

a processor; and a memory coupled to the processor, wherein the memory comprises instructions which, when executed by the processor, cause the processor to:

automatically generate, by a hypothetical link identification engine of the data processing system, a hypothetical ontological link between at least two entities of an ontology data structure at least by automatically analyzing the ontology data structure to identify potential ontological relationships between entities that do not have existing links to each other in the ontology data structure, and automatically generating the hypothetical ontological link data structure, defining a data representation of a potential relationship between at least two entities in the ontology data structure that do not have existing links to each other, based on results of the analysis;

automatically generate, by a hypothetical link evaluation pipeline, a first evidential statement for which corroboration is sought at least by automatically processing, via a question answering computer system pipeline, a question corresponding to the hypothetical ontological link data structure, wherein the question is automatically processed by the question answering computer system pipeline at least by parsing the question to decompose the question into one or more database queries, and applying the one or more database queries to one or more computer databases storing one or more corpora of evidence data, wherein the first evidential statement is associated with an answer to the question automatically generated by the question answering computer system pipeline based on a processing of results returned by the application of the one or more database queries to the one or more computer databases, and is an evidential statement for supporting or refuting the hypothetical ontological link;

automatically process, by a link scoring and analyzer engine, a corpus of evidence data to determine a measure of corroboration of the first evidential statement by other evidence data in the corpus of evidence data at least by performing computerized natural language processing of the first evidential statement and the other evidence data in the corpus of evidence data and comparing one or more natural language processing extracted first characteristics of natural language content of the first evidential statement to one or more natural language processing extracted second characteristics of natural language content of the evidence data in the corpus of evidence data to calculate a corroboration value indicating an equivalency of facts or conclusions specified in the evidence data and the first evidential statement, wherein the measure of corroboration is determined based on the corroboration value;

generate, by the link scoring and analyzer engine, an indication of trustworthiness of the first evidential statement based on the measure of corroboration of the first evidential statement by the other evidence data in the corpus of evidence data; and generate, by an ontology modification engine, a modified ontology data structure, at least by adding the hypothetical ontological link to the ontology data structure as an actual ontological link to generate the modified ontology data structure, in response to the indication of the trustworthiness of the first evidential statement indicating the first evidential statement to be trustworthy.

19. The method of claim 5, wherein the hypothetical ontological link is a link that does not exist in the ontology as a valid link between entities of the ontology.

20. The method of claim 1, further comprising:

retrieving a question template set, comprising at least one question template, from a question template repository based on a link type associated with the hypothetical ontological link, wherein the question template repository stores different question template sets for different link types; and automatically generating, by an automated question generator, the question based on the retrieved question template set.

21. The method of claim 1, wherein:

the hypothetical ontological link has a link type, and wherein the hypothetical ontological link has a plurality of associated sub-links, each sub-link having an associated sub-link type corresponding to the link type of the hypothetical ontological link, the automatic generation of the first evidential statement for which corroboration is sought, and the automatic processing of the corpus of evidence are executed with regard to each associated sub-link in the plurality of associated sub-links, and generating the indication of trustworthiness comprises accumulating measures of corroboration generated for each of the sub-links in the plurality of associated sub-links to generate a score for the hypothetical ontological link.

\* \* \* \* \*